US012485119B2

(12) United States Patent
Maresta et al.

(10) Patent No.: US 12,485,119 B2
(45) Date of Patent: Dec. 2, 2025

(54) METHODS OF TREATING PULMONARY ARTERIAL HYPERTENSION

(71) Applicant: ACTELION PHARMACEUTICALS LTD, Allschwil (CH)

(72) Inventors: Alessandro Maresta, Allschwil (CH); Loïc Perchenet, Allschwil (CH)

(73) Assignee: Actelion Pharmaceuticals Ltd, Allschwil (CH)

( * ) Notice: Subject to any disclaimer, the term of this patent is extended or adjusted under 35 U.S.C. 154(b) by 751 days.

(21) Appl. No.: 17/780,064

(22) PCT Filed: Nov. 27, 2020

(86) PCT No.: PCT/EP2020/083593
§ 371 (c)(1),
(2) Date: May 26, 2022

(87) PCT Pub. No.: WO2021/105331
PCT Pub. Date: Jun. 3, 2021

(65) Prior Publication Data
US 2023/0032813 A1    Feb. 2, 2023

Related U.S. Application Data

(60) Provisional application No. 63/076,149, filed on Sep. 9, 2020, provisional application No. 63/023,452, filed on May 12, 2020, provisional application No. 62/941,910, filed on Nov. 29, 2019.

(51) Int. Cl.
*A61K 31/506* (2006.01)
*A61K 9/00* (2006.01)
*A61K 31/496* (2006.01)
*A61K 31/4965* (2006.01)
*A61K 31/4985* (2006.01)
*A61K 31/505* (2006.01)
*A61K 31/519* (2006.01)
*A61P 9/12* (2006.01)
*A61P 11/00* (2006.01)

(52) U.S. Cl.
CPC .......... *A61K 31/506* (2013.01); *A61K 9/0053* (2013.01); *A61K 31/496* (2013.01); *A61K 31/4965* (2013.01); *A61K 31/4985* (2013.01); *A61K 31/505* (2013.01); *A61K 31/519* (2013.01); *A61P 9/12* (2018.01); *A61P 11/00* (2018.01)

(58) Field of Classification Search
CPC .. A61K 31/506; A61K 9/0053; A61K 31/496; A61K 31/4985; A61K 31/4965; A61K 31/505; A61K 31/519; A61P 9/12; A61P 11/00
USPC ........................................................ 514/243
See application file for complete search history.

(56) References Cited

U.S. PATENT DOCUMENTS

| | | | |
|---|---|---|---|
| 7,094,781 B2 | 8/2006 | Bolli et al. | |
| 7,205,302 B2 | 4/2007 | Asaki et al. | |
| 8,367,685 B2 | 2/2013 | Adesuyi et al. | |
| 8,791,122 B2 | 7/2014 | Itou | |
| 9,265,762 B2 | 2/2016 | Adesuyi et al. | |
| 9,284,280 B2 | 3/2016 | Itou | |
| 9,340,516 B2 | 5/2016 | Itou | |
| 9,440,931 B2 | 9/2016 | Nakamichi et al. | |
| 11,234,980 B2 * | 2/2022 | Csonka | A61P 11/00 |
| 11,464,777 B2 * | 10/2022 | Csonka | A61P 11/00 |
| 2007/0197544 A1 | 8/2007 | Santel | |
| 2017/0089924 A1 * | 3/2017 | Shimokawa | G01N 33/6893 |
| 2018/0117039 A1 | 5/2018 | Zisman | |

FOREIGN PATENT DOCUMENTS

| | | |
|---|---|---|
| EP | 3136101 A1 | 3/2017 |
| WO | 2002/088084 A1 | 11/2002 |
| WO | 2008/026156 A2 | 3/2008 |
| WO | 2010/018549 A2 | 2/2010 |
| WO | 2010/150865 A1 | 12/2010 |
| WO | 2011/024874 A1 | 3/2011 |
| WO | 2012/051559 A2 | 4/2012 |
| WO | 2016/114993 A1 | 7/2016 |

OTHER PUBLICATIONS

Marco Cardiology in Review, 2006, 14(6) 312-318 (Year: 2006).*
Lajoie et al Pulmonary Circulation 2017 7(2) 312-325 (Year: 2017).*
Lajoie AC et al, "Combination therapy in pulmonary arterial hypertension: recent accomplishments and future challenges," Pulmonary Circulation Apr.-Jun. 2012, vol. 7, No. 2, Jun. 1, 2017, pp. 312-325.
Berge, "Pharmaceutical Salts", J. Pharm. Sci., 1977, 66 , 1-19.
Sitbon, O., et al., "Upfront triple combination therapy in pulmonary arterial hypertension: a pilot study," European Respiratory Journal, vol. 43, No. 6, Jun. 2014, pp. 1691-1697.
"ATS Stats", Retrieved from https://web.archive.org/web/20250118062525/https://news.thoracic.org/stat/05-06-20.php, May 6, 2020, p. 1.
"Guideline on clinical development of fixed combination medicinal products", European Medicines Agency, Mar. 23, 2017, pp. 1-12.
"Initial Combination Therapy with Macitentan and Tadalafil in Newly Diagnosed Patients with Pulmonary Arterial Hypertension: Results from the Optima Trial", American Journal of Respiratory and Critical Care Medicine, 2017, vol. 195, A2297, pp. 1-3.
"New Opsumit® (macitentan) Data Show Initial Combination Therapy with Tadalafil Improved Hemodynamic Clinical and Functional Parameters in Patients with Pulmonary Arterial Hypertension", Oct. 21, 2019, p. 5.

(Continued)

*Primary Examiner* — Yevgeny Valenrod
(74) *Attorney, Agent, or Firm* — BakerHostetler

(57) ABSTRACT

The disclosure relates to methods of reducing the risk of disease progression in a patient with pulmonary arterial hypertension (PAH), comprising administering to a patient in need thereof, an initial triple combination therapy of an endothelin receptor antagonist (ERA), a phosphodiesterase type 5 (PDE-5) inhibitor, and a prostacyclin receptor agonist (IP receptor agonist).

14 Claims, 27 Drawing Sheets

(56) References Cited

OTHER PUBLICATIONS

Adcirca FDA Label, May 2003, p. 18.
Belge et al., "Treatment of pulmonary arterial hypertension with the dual endothelin receptor antagonist macitentan: clinical evidence and experience", Therapeutic Advances in Respiratory Disease, 2019, vol. 13, pp. 1-13.
Besinque et al., "The myth of the stable pulmonary arterial hypertension patient", Am J Manag Care, Mar. 2019, vol. 25, No. 3, pp. S47-S52.
Burks et al., "Pulmonary Arterial Hypertension: Combination Therapy in Practice", Am J Cardiovasc Drugs, 2018, vol. 18, pp. 249-257.
Chin et al., "Efficacy and Safety of Initial Triple Oral Versus Initial Double Oral Combination Therapy in Patients with Newly Diagnosed Pulmonary Arterial Hypertension (PAH): Results of the Randomized Controlled Triton Study", American Journal of Respiratory and Critical Care Medicine, 2020, vol. 201, A2928, pp. 1-2.
Coghlan et al., "Selexipag in the management of pulmonary arterial hypertension: an update", Drug, Healthcare and Patient Safety, vol. 11, 2019, pp. 55-64.
Coghlan et al., "Targeting the Prostacyclin Pathway with Selexipag in Patients with Pulmonary Arterial Hypertension Receiving Double Combination Therapy: Insights from the Randomized Controlled Griphon Study", Am J Cardiovasc Drugs, Jan. 6, 2018, vol. 18, pp. 37-47.
Galie et al., "2015 ESC/ERS Guidelines for the diagnosis and treatment of pulmonary hypertension", ESC/ERS Guidelines, European Heart Journal, vol. 37, 2016, pp. 67-119.
Galie et al., "Long-term outcomes in newly diagnosed pulmonary arterial hypertension (PAH) patients receiving initial triple oral combination therapy: insights from the randomised controlled Triton study", European Heart Journal, vol. 41, Issue Supplement_2, Aug. 29-Sep. 1, 2020, p. 1.
Galie et al., 2015 ESC/ERS Guidelines for the diagnosis and treatment of pulmonary hypertension—web addenda, 2015, 1-13.
Ghofrani et al., "The role of combination therapy in managing pulmonary arterial hypertension", Eur Respir Rev., 2014, vol. 23, No. 134, pp. 469-475.
Jansa et al., "Macitentan in Pulmonary Arterial Hypertension: A Focus on Combination Therapy in the Seraphin Trial", Am J Cardiovasc Drugs, 2018, vol. 18, pp. 1-11.
Mclaughlin et al., "Effect of Selexipag on Morbidity/Mortality in Pulmonary Arterial Hypertension: Results of the Griphon Study", A1538, JACC, Mar. 17, 2015, vol. 65, Issue 10S, p. 1.
Opsumit FDA Label, Oct. 2013, pp. 1-22.
Sitbon et al., "Beyond a single pathway: combination therapy in pulmonary arterial hypertension", Eur Respir Rev., 2016, vol. 25, pp. 408-417.
Sitbon et al., "Initial dual oral combination therapy in pulmonary arterial hypertension", ERJ Express, Mar. 17, 2016, pp. 1-10.
Sitbon et al., "Initial Treatment Combination With Macitentan and Tadalafil in Patients With Pulmonary Arterial Hypertension: Results From the Optima Study", Chest Annual Meeting, Oct. 2019, vol. 156, No. 45, pp. 870A-871A.
Sitbon et al., "Selexipag for the Treatment of Pulmonary Arterial Hypertension", N Engl J Medicine, 2015, vol. 373, pp. 2522-2533, including Protocol published as Supplementary Appendix, pp. 610.
The Efficacy and Safety of Initial Triple Versus Initial Dual Oral Combination Therapy in Patients with Newly Diagnosed Pulmonary Arterial Hypertension (Triton), ClinicalTrials.gov Archive—Archive History for NCT02558231, Version 12, Aug. 26, 2020, pp. 59.
The Efficacy and Safety of Initial Triple Versus Initial Dual Oral Combination Therapy in Patients with Newly Diagnosed Pulmonary Arterial Hypertension (Triton), ClinicalTrials.gov Archive—Archive History for NCT02558231, Version 9, Sep. 4, 2019, pp. 22.
Uptravi FDA Label, Dec. 2015, pp. 21.

\* cited by examiner

METHODS OF TREATING PULMONARY ARTERIAL HYPERTENSION

CROSS-REFERENCE TO RELATED APPLICATIONS

This application is the U.S. national stage of International Patent Application No. PCT/EP2020/083593, filed Nov. 27, 2020, which claims the benefit of the priority of U.S. Provisional Patent Application No. 63/076,149, filed Sep. 9, 2020, U.S. Provisional Patent Application No. 63/023,452, filed May 12, 2020, and U.S. Provisional Patent Application No. 62/941,910, filed Nov. 29, 2019, the disclosures of which are incorporated by reference herein in their entireties.

TECHNICAL FIELD

The disclosure relates to methods of treating pulmonary arterial hypertension (PAH), including methods of reducing the risk of disease progression in a patient with PAH. The methods comprise administering to a patient in need thereof an initial triple combination therapy of an endothelin receptor antagonist (ERA), a phosphodiesterase type 5 (PDE-5) inhibitor, and a prostacyclin receptor agonist (IP receptor agonist).

BACKGROUND

Pulmonary arterial hypertension (PAH) is a serious chronic disorder of the pulmonary circulation of diverse etiologies and pathogeneses. It is characterized by progressive increase in pulmonary vascular resistance (PVR) and pulmonary artery pressure (PAP), and decrease in cardiac output (CO), which ultimately leads to right heart failure and death. The complex pathogenesis of PAH involves dysfunction in three key pathways: the prostacyclin, endothelin and nitric oxide pathways.

PAH is defined hemodynamically as a resting mean pulmonary artery pressure of ≥25 mmHg with normal pulmonary artery wedge pressure (or left ventricular end-diastolic pressure) of ≤15 mmHg and PVR>240 dyn·sec/cm$^5$ (or 3 Wood unit). It is further classified clinically into 4 subgroups, based on clinical presentation, pathology, pathophysiology, prognosis and therapeutic approach: 1) in the absence of a demonstrable cause (idiopathic), 2) in a familial setting (heritable), 3) as the result of the use of certain drugs and toxins, and 4) associated with a connective tissue disease, HIV infection, portal hypertension, congenital heart disease, or schistosomiasis.

The current ESC/ERS Guidelines for the treatment of PAH recommend initial double combination therapy or sequential combination therapy in patients with an inadequate clinical response to initial monotherapy. In patients at high risk, initial combination therapy including i.v. epoprostenol is recommended. More recently, the Proceedings from the 6th World Symposium on Pulmonary Hypertension propose initial oral combination therapy with an endothelin receptor antagonist (ERA) and a phosphodiesterase type 5 inhibitor (PDE-5i) in patients with low or intermediate risk of 1-year mortality, and initial combination therapy including i.v. prostacyclin in high risk patients.

SUMMARY

In some embodiments, the invention relates to methods of reducing the risk of disease progression in a patient with pulmonary arterial hypertension (PAH). These methods comprise administering to a patient in need thereof, an initial triple combination therapy of an endothelin receptor antagonist (ERA), a phosphodiesterase type 5 (PDE-5) inhibitor, and a prostacyclin receptor agonist (IP receptor agonist).

DETAILED DESCRIPTION OF ILLUSTRATIVE EMBODIMENTS

Figure 1:
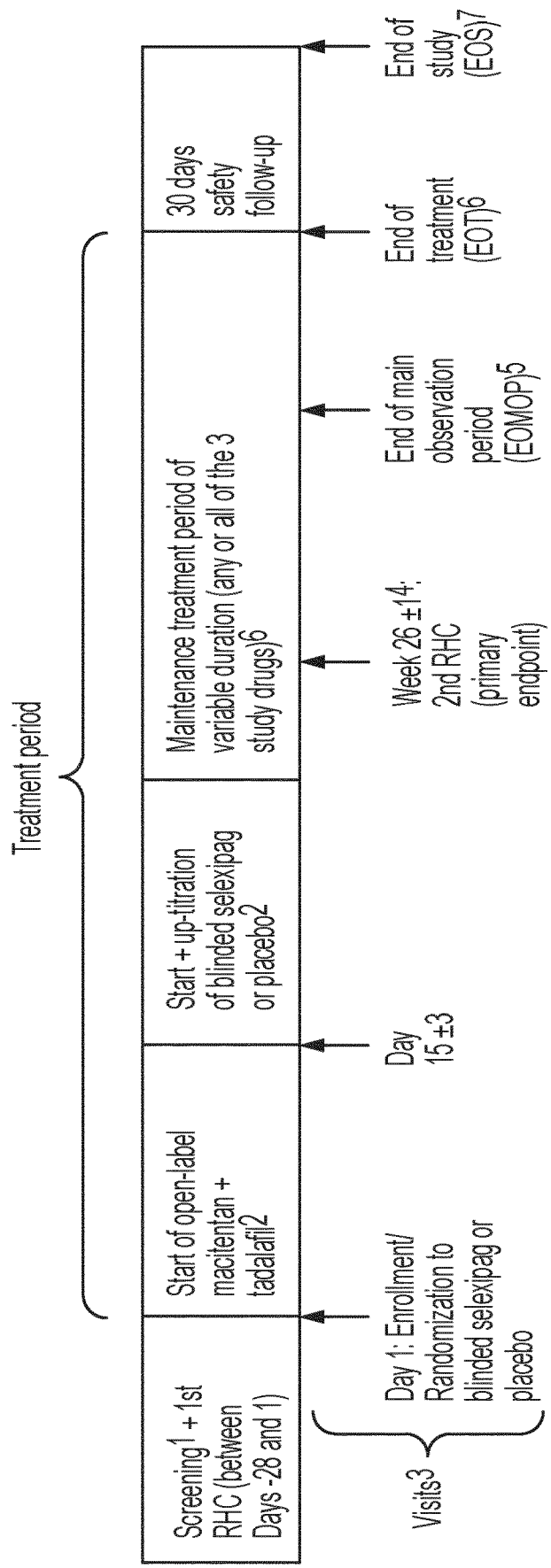
FIG. 1 is a schematic showing the study periods at the subject level.

In the present disclosure the singular forms "a", "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" or "substantially" it will be understood that the particular value forms another embodiment. In general, use of the term "about" or "substantially" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about" or "substantially". In other cases, the gradations used in a series of values may be used to determine the intended range available to the term "about" or "substantially" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiments and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

As used herein, unless otherwise noted, the terms "treating", "treatment" and the like, shall include the management and care of a patient for the purpose of combating a disease, condition, or disorder. The terms "treating" and "treatment" also include the administration of the compounds or pharmaceutical compositions as described herein to (a) alleviate one or more symptoms or complications of the disease, condition or disorder; (b) prevent the onset of one or more symptoms or complications of the disease, condition or disorder; and/or (c) eliminate one or more symptoms or complications of the disease, condition, or disorder.

The terms "subject" and "patient" are interchangeably used herein to refer to a human, who has been the object of treatment, observation or experiment. Preferably, the patient has experienced and/or exhibited at least one symptom of the disease or disorder to be treated and/or prevented.

The term "amount" as used herein, means that amount of active compound or pharmaceutical agent that elicits the biological or medicinal response in a human that is being sought by a researcher, medical doctor or other clinician, which includes alleviation of one or more symptoms of the disease or disorder being treated.

The term "disease progression" as used herein is categorized by a number of factors as would be understood by one skilled in the art. In some embodiments, a disease has progressed if a death occurs. In other embodiments, a disease has progressed if a patient is hospitalized for worsening of PAH. In further embodiments, a disease has progressed if a patient's PAH has worsened and it is necessary to initiate administration of an agent to reduce worsening of PAH, such as a prostacyclin, prostacyclin analog, or prostacyclin receptor agonist. In yet other embodiments, a disease is considered as progressing if the patient has clinical worsening.

The term "clinical worsening" as used herein refers to a post-baseline decrease in 6MWD by >15% from the highest 6MWD obtained at or after baseline, accompanied by WHO FC III or IV (both conditions confirmed at two consecutive post-baseline evaluations separated by 1-21 days).

Initial Triple Combination Therapy

The methods described herein are directed to reducing the risk of disease progression in a patient with pulmonary arterial hypertension (PAH). The methods include administering to a patient in need thereof an initial triple combination therapy of an endothelin receptor antagonist (ERA), a phosphodiesterase type 5 (PDE-5) inhibitor, and a prostacyclin receptor agonist (IP receptor agonist).

As described herein, the initial triple combination therapy reduces a patient's risk of disease progression, including, for example, the risk of hospitalization. In certain embodiments, the risk is reduced relative to a patient population with PAH, such as a population at substantially the same level of disease progression as the patient, that receives an initial double combination therapy of an ERA and PDE-5 inhibitor, i.e., absent an IP receptor agonist. Such a relative analysis is disclosed in Example 1. In some embodiments, the methods reduce the risk of disease progression by at least about 20% relative to a patient population receiving an initial double combination therapy. In other embodiments, the methods reduce the risk of disease progression by about 20 to about 50%, and more preferably about 30% to about 40%, relative to an initial double combination therapy. In further embodiments, the methods reduce the risk of disease progression by about 25 to about 45%, about 30 to about 45%, about 35 to about 50%, or about 40 to about 50%, relative to an initial double combination therapy. In still other embodiments, the methods reduce the risk of disease progression by at least about 30%, including about 30%, relative to an initial double combination therapy. In still other embodiments, the methods reduce the risk of disease progression by at least about 40%, including about 40%, relative to an initial double combination therapy. In still other embodiments, the methods reduce the risk of disease progression by at least about 50%, including about 50%, relative to an initial double combination therapy.

The term "triple combination therapy" as used herein refers to the treatment protocol disclosed herein using all three of an ERA, PDE-5 inhibitor, and IP receptor agonist. All three of the ERA, PDE-5 inhibitor, and IP receptor agonist may be administered at the same time or at different times (e.g. sequentially) in a treatment method. Similarly, the term "double combination therapy" refers to the treatment protocol and methods in the art using an ERA and PDE-5 inhibitor, in the absence of an IP receptor agonist.

The term "initial" when referencing the "triple combination therapy" means an upfront combination treatment of an ERA, PDE-5, and IP receptor agonist. An "initial" triple combination therapy (or an "initial" double combination therapy) comprises the components being initiated within a short period of time of each other, and thereafter with each being administered as prescribed by a physician or other healthcare provider. For example, in an initial triple combination therapy, each of the ERA, PDE-5 inhibitor, and IP receptor agonist may be initiated on the same day. In other embodiments, treatment with each of the components may be initiated within a short period of time from each other, for example, within 1 week, within 2 weeks, within 3 weeks, or within 4 weeks of each other. The order and timing of the start of each component (for initial triple or initial double combination therapy) may be altered, for example, based on the direction of a physician or other healthcare provider. In some embodiments, one or two of the IP receptor agonist, ERA, or PDE-5 inhibitor are administered on day 1 at the start of the combination therapy and one or two of the IP receptor agonist, ERA, or PDE-5 inhibitor are administered within about one week to about 3 weeks after day 1. For example, as in the example section herein, the ERA and PDE-5 inhibitor are started on Day 1, with the IP receptor agonist started on Day 15±3 days.

The term "initial" when referencing the "triple combination therapy" is in contrast to a sequential therapy where one or two of the components is added based on a patient's clinical response to a previous treatment, such as a monotherapy or a double combination therapy. For example, an initial triple combination therapy of an ERA, PDE-5, and IP receptor agonist comprises an upfront treatment regimen including all three components as opposed to a sequential triple combination therapy wherein an initial double combination therapy of an ERA and PDE-5 inhibitor is supplemented with an IP receptor agonist after a patient is assessed to have an inadequate clinical response to the initial double combination therapy of an ERA and PDE-5 inhibitor. The initial triple combination therapy could also be administered independent of a patient's clinical response to a monotherapy of one of the components, such as an ERA or PDE-5 inhibitor. Likewise, an initial double combination therapy comprises an upfront treatment of two of the components, typically an ERA and PDE-5 inhibitor, as opposed to a sequential therapy where one the components is added based on a patient's clinical response to a previous initial monotherapy with one of the other components.

As used herein and in the art, the terms "pulmonary arterial hypertension" and "PAH" are interchangeable and define a condition where the patient has high blood pressure in the lungs. PAH occurs when the very small arteries throughout the lungs narrow in diameter, which increases the resistance to blood flow through the lungs. In some embodiments, the underlying cause of the narrowing is not known, i.e., idiopathic pulmonary hypertension. PAH also is classified into subgroups including (i) familial, or heritable PAH, (ii) PAH caused by drugs or toxins, (iii) PAH associated with other conditions such as connective tissue diseases (scleroderma or lupus), congenital heart problems, high blood pressure in the liver, HIV, infections (schistosomiasis), and sickle cell anemia, (iv) PAH caused by rare blood conditions (e.g. pulmonary capillary hemangiomatosis), or (v) PAH in babies (persistent pulmonary hypertension of the newborn). Severity of PAH in a patient is generally evaluated by a classification system, i.e., the World Health Organization (WHO) class system. See, Table A.

TABLE A

WHO Class System for PAH Patients

| Class | Patient's Symptoms |
|---|---|
| I | No limitations on physical activity. Ordinary physical activity does not cause undue dyspnea of fatigue, chest pain, or near syncope. |
| II | Slight limitation of physical activity. Comfortable at rest. Ordinary physical activity causes undue dyspnea or fatigue, chest pain, or near syncope. |
| III | Marked limitation of physical activity. Comfortable at rest. Less than ordinary activity causes undue dyspnea or fatigue, chest pain or near syncope. |
| IV | Inability to carry out any physical activity without symptoms. Manifest signs of right heart failure. Dyspnea and/or fatigue may be present at rest. Discomfort is increased by any physical activity. |

In general, a higher PAH class indicates a more severe disease state and/or greater urgency for a patient to be accurately diagnosed and started on PAH therapy. Thus, the methods reduce the risk of a patient progressing from a lower WHO PAH class to a higher WHO PAH class. In some embodiments, the methods reduce the risk of a PAH patient progressing from a WHO class I to a WHO class II, WHO class I to a WHO class III, WHO class I to a WHO class IV, WHO class II to a WHO class III, WHO class II to a WHO class IV, or WHO class III to a WHO class IV.

The methods may also, or in addition, reduce PAH disease progression by preventing or limiting PAH-related hospitalization, clinical worsening of PAH, initiation of an agent to reduce worsening of PAH, or death. In some embodiments, the methods reduce the risk of patient hospitalization, e.g., for worsening of PAH. In other embodiments, the methods reduce the risk of clinical worsening of PAH. In further embodiments, the methods reduce the risk of patient death. In other embodiments, the methods avoid having to initiate administration of an agent to reduce worsening of PAH, such as a prostacyclin, prostacyclin analog, or prostacyclin receptor agonist. For example, Table 13 in the example section herein includes an evaluation of certain disease progression events.

In certain embodiments, the patient is treatment naïve for PAH, however, patients previously or currently on a treatment regimen for PAH may also benefit from the methods disclosed herein. The term "treatment naïve" as used herein refers to a patient who has not been treated for PAH prior to initiating treatment according to the methods described herein. In some embodiments, the patient hasn't taken an endothelin receptor antagonist (ERA) prior to initiating treatment according to the methods described herein. In other embodiment, the patient hasn't taken a phosphodiesterase type 5 (PDE-5) inhibitor prior to initiating treatment according to the methods described herein. In further embodiments, the patient hasn't taken a prostacyclin receptor agonist (IP receptor agonist) prior to initiating treatment according to the methods described herein. In yet other embodiments, the patient hasn't taken an endothelin receptor antagonist (ERA), a phosphodiesterase type 5 (PDE-5) inhibitor, and a prostacyclin receptor agonist (IP receptor agonist) prior to initiating treatment according to the methods described herein.

In other embodiments, the patient is also, or in addition to being treatment naïve, newly diagnosed with PAH. For example, an initial PAH diagnosis of the patient is made within about six months of the start of the initial triple combination therapy. In some embodiments, the initial PAH diagnosis made within about 6, about 5, about 4, about 3, about 2, or about 1 month of the start of the initial triple combination therapy.

The methods described herein are also effective in normalizing and/or improving one or more of mean pulmonary arterial hypertension (mPAP), pulmonary arterial wedge pressure (PAWP), and pulmonary vascular resistance (PVR). In some embodiments, the methods are effective in lowering abnormally elevated levels of one or more of a mPAP, or PVR. Thus, the mPAP, and/or PVR may be elevated at the time of commencing therapy and are lowered using the initial triple combination therapy methods disclosed herein.

At the start of the initial triple combination thereof, the patient may have an mPAP of greater than or equal to about 25 mmHg at rest. Typically, the initial triple combination therapy may reduce mPAP levels in the patient. In some embodiments, the methods result in lowering mPAP levels by about 5 mmHg, about 10 mmHg, about 15 mmHg, or about 20 mmHg.

The patient may also have a mean PAWP of less than or equal to about 15 mmHg at the start of the initial triple combination therapy. In some embodiments, patients may have a mean pulmonary arterial wedge pressure of less than about 15, about 14, about 13, about 12, about 11, about 10, about 9, about 8, about 7, about 6, about 5, about 4, about 3, about 2, or about 1 mmHg at the start of the initial triple combination therapy.

The patient may also have a PVR of greater than or equal to about 240 dyn·sec/cm$^5$ at the start of the initial triple combination therapy. In other embodiments, the patient has a PVR of greater than or equal to about 480 dyn·sec/cm$^5$ at the start of the initial triple combination therapy The methods result in lowering the PVR of the patient.

It also is contemplated that the patient has a 6-minute walk distance (6MWD) of greater than or equal to about 50 meters at the start of the initial triple combination therapy. For example, typically the 6MWD of a newly diagnosed patient ranges from about 150 to 500 meters. However, in other embodiments, the patient has a 6MWD of less than 50 meters at the start of the initial therapy. The initial triple combination therapy disclosed herein is effective in increasing 6MWD levels.

The Endothelin Receptor Antagonist

The methods described herein include administering an amount of an ERA. The "endothelin receptor antagonist" or "ERA" may be selected by a physician or other healthcare provider. In some embodiments, the ERA is macitentan, bosentan, or ambrisentan, or a pharmaceutically acceptable salt thereof. In other embodiments, the ERA is macitentan. In further embodiments, the ERA is bosentan. In yet other embodiments, the ERA is ambrisentan.

In some embodiments, the amount of the ERA is less than about 15 mg. In further embodiments, the amount of the ERA is about 1 mg, about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, or about 15 mg. In other embodiments, the amount of the ERA is about 1 to about 15 mg, about 1 to about 10 mg, about 1 to about 5 mg, about 5 to about 15 mg, about 5 to about 10 mg, or about 10 to about 15 mg. In yet further embodiments, the amount of the ERA is about 5 to about 15 mg. In yet further embodiments, the amount of the ERA is about 10 mg. The amount of the ERA may be the same throughout the treatment method or may be altered. In some embodiments, the amount of the ERA is increased. In other embodiments, the amount of the ERA is decreased. Desirably, the ERA is taken by the patient at the same time during the day. Thus, in some embodiments, the ERA is taken in the morning. In other embodiments, the ERA is taken in the evening. The amount of the ERA may be taken as a single dose or broken up into two or more doses as determined by a physician or other healthcare provider. Preferably, the ERA is taken as a single dose.

As used herein, unless otherwise noted, the term "macitentan" refers to N-[5-(4-Bromophenyl)-6-[2-[(5-bromo-2-pyrimidinyl)oxy]ethoxy]-4-pyrimidinyl]-N'-propylsulfamide of formula (I).

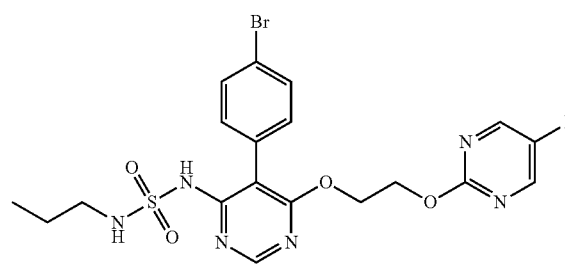

(I)

In other embodiments, macitentan refers to stereoisomers of macitentan, such as enantiomers and diastereomers as pure or substantially pure forms. Macitentan also refers to racemic mixtures thereof. As used herein, "macitentan" also refers to amorphous or crystalline forms of macitentan. In some embodiments, the macitentan is a crystalline form. In other embodiments, the macitentan is an amorphous form. The crystallinity may be determined by those skilled in the art using one or more techniques such as, e.g., single crystal x-ray diffraction, powder x-ray diffraction, differential scanning calorimetry, melting point, among others. "Macitentan" as used herein includes anhydrous forms or hydrates thereof. In certain embodiments, the macitentan is in an anhydrous form. In other embodiments, the macitentan is a hydrate thereof. "Macitentan" as used herein further refers to solvates thereof. Such solvates include a molecule of a solvent bound through intermolecular forces or chemical bonds to one or more locations of the macitentan molecule. As used herein, "macitentan" may also refer to polymorphs thereof. Such polymorphs of macitentan include crystalline forms of the molecule, having variations to the crystal lattices of each polymorph. The term "macitentan" may also include pharmaceutically acceptable salts thereof, which may readily be selected by those skilled in the art. The expression pharmaceutically acceptable salts encompasses either salts with inorganic acids or organic acids like hydrohalogenic acids, e.g. hydrochloric or hydrobromic acid; sulfuric acid, phosphoric acid, nitric acid, citric acid, formic acid, acetic acid, maleic acid, tartaric acid, methylsulfonic acid, p-toluolsulfonic acid and the like or in case the compound of formula I is acidic in nature with an inorganic base like an alkali or earth alkali base, e.g. sodium hydroxide, potassium hydroxide, calcium hydroxide and the like. Macitentan is commercially available as understood to those skilled in the art. For example, macitentan is available as OPSUMIT®. Macitentan is an endothelin receptor antagonist and may be prepared according to the process as disclosed in U.S. Pat. No. 7,094,781, which is incorporated by reference herein.

The present invention also contemplates the administration of macitentan metabolites or pharmaceutically acceptable salts thereof. Desirably, the macitentan metabolite is metabolically active compound. Thus, in certain embodiments, the macitentan metabolite is of formula I-M1 to I-M7. In some embodiments, the macitentan metabolite is of formula I-M6; I-M6 is also known under the code name ACT-132577 and the International non-proprietary name aprocitentan.

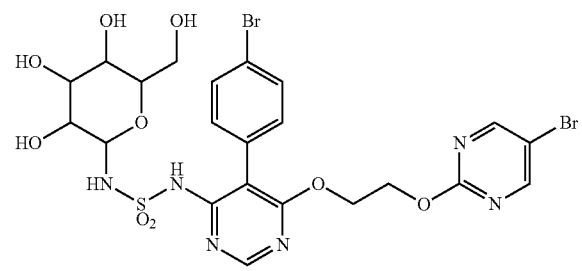

(I-M1)

(I-M2)

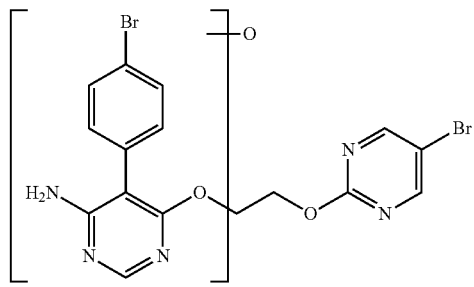

(I-M3)

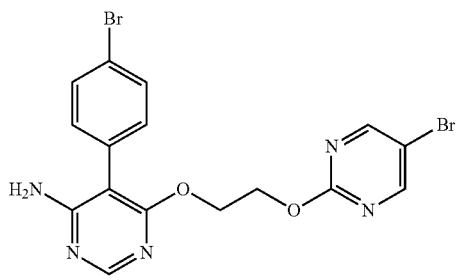

(I-M4)

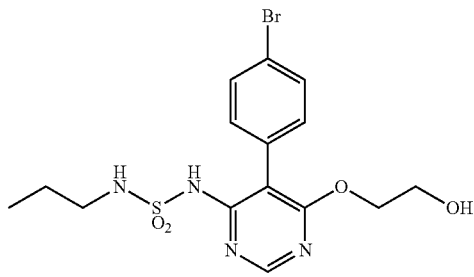

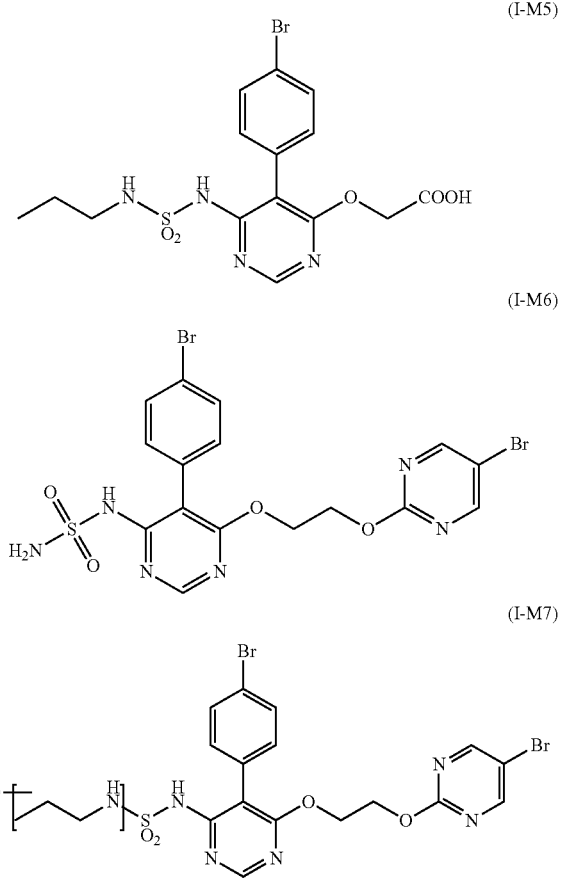

Prostacyclin Receptor Agonist

The methods described herein also include administration of a prostacyclin receptor agonist (IP receptor agonist). One skilled in the art would be able to select a IP receptor agonist. In some embodiments, the IP receptor agonist is selexipag, 4-[(5,6-diphenylpyrazin-2-yl)(isopropyl)amino]butoxy}acetic acid (MRE-269), or ralinepag, or a pharmaceutically acceptable salt thereof. In addition, a prostacyclin analogue (or prostanoid) can be substituted for the IP receptor agonist in connection with the methods disclosed herein. Examples of a prostacyclin analogue (or prostanoid) include epoprostenol, treprostinil, beraprost or iloprost, or a pharmaceutically acceptable salt thereof. The disclosure herein concerning the IP receptor agonist also applies to a prostacyclin analogue (or prostanoid).

Treatment with the IP receptor agonist in the initial triple combination may commence at the same time as the ERA and PDE-5 inhibitor, but typically commences after initial treatment with the PDE-5 inhibitor and ERA is started. Typically, the starting dose of the IP receptor agonist is administered to the patient about 10 to about 20 days after day 1 of the initial triple combination therapy. In some embodiments, the starting dose of the IP receptor agonist is administered about 12 to about 18, about 13 to about 17, about 14 to about 16, about 13 to about 18, about 13 to about 17, about 13 to about 16, about 13 to about 15, about 14 to about 18, about 14 to about 17, about 14 to about 16, about 15 to about 18, about 15 to about 17, about 15 to about 16, about 16 to about 18, about 16 to about 17, or about 17 to about 18 days after day 1 of the initial triple combination therapy. In other embodiments, the starting dose of the IP receptor agonist is administered about 12 days after day 1 of the initial triple combination therapy. In further embodiments, the starting dose of the IP receptor agonist is administered about 13 days after day 1 of the initial triple combination therapy. In yet other embodiments, the starting dose of the IP receptor agonist is administered about 14 days after day 1 of the initial triple combination therapy. In still further embodiments, the starting dose of the IP receptor agonist is administered about 15 days after day 1 of the initial triple combination therapy. In other embodiments, the starting dose of the IP receptor agonist is administered about 16 days after day 1 of the initial triple combination therapy. In further embodiments, the starting dose of the IP receptor agonist is administered about 17 days after day 1 of the initial triple combination therapy. In still other embodiments, the starting dose of the IP receptor agonist is administered about 18 days after day 1 of the initial triple combination therapy.

The amount of the IP receptor agonist may be selected by a physician or other health care provider based on factors such as severity of the disease, physical characteristics of the patient, among others. In some embodiments, the amount of the IP receptor agonist is at least about 10 μg. In some embodiments, the amount of the IP receptor agonist is at least about 100, about 200, about 300, about 400, about 500, about 600, about 700, about 800, about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, about 3400, or about 3500 μg.

The daily dose of IP receptor agonist may be administered once daily, twice daily, or thrice daily, preferably twice daily. In some embodiments, the dose is administered twice daily. In other embodiments, the dose is administered once before mid-day and once after mid-day. In further embodiments, the daily dose is administered once daily.

Desirably, the dose of IP receptor agonist does not exceed about 1600 μg twice daily, i.e., 3200 μg per day. In some embodiments, the dose of the IP receptor agonist, twice daily, is about 100 to about 3500 μg, about 200 to about 3200, about 200 to about 3000, about 200 to about 2800, about 200 to about 2600, about 200 to about 2400, about 200 to about 2200, about 200 to about 2000, about 200 to about 1800, about 200 to about 1600, about 200 to about 1400, about 200 to about 1200, about 200 to about 1000, about 200 to about 800, about 200 to about 600, about 200 to about 400, about 400 to about 3200, about 400 to about 3000, about 400 to about 2800, about 400 to about 2600, about 400 to about 2400, about 400 to about 2200, about 400 to about 2000, about 400 to about 1800, about 400 to about 1600, about 400 to about 1400, about 400 to about 1200, about 400 to about 1000, about 400 to about 800, about 400 to about 600, about 600 to about 3200, about 600 to about 3000, about 600 to about 2800, about 600 to about 2600, about 600 to about 2400, about 600 to about 2200, about 600 to about 2000, about 600 to about 1800, about 600 to about 1600, about 600 to about 1400, about 600 to about 1200, about 600 to about 1000, about 600 to about 800, about 800 to about 3200, about 800 to about 3000, about 800 to about 2800, about 800 to about 2600, about 800 to about 2400, about 800 to about 2200, about 800 to about 2000, about 800 to about 1800, about 800 to about 1600, about 800 to about 1400, about 800 to about 1200, about 800 to about 1000, about 1000 to about 3200, about 1000 to about 3000, about 1000 to about 2800, about 1000 to about 2600, about 1000 to about 2400, about 1000 to about 2200, about 1000 to about 2000, about 1000 to about 1800, about 1000 to about 1600, about 1000 to about 1400, about 1000 to about 1200, about 1200 to about 3200, about 1200 to about 3000, about 1200 to about 2800, about 1200 to about 2600, about 1200 to about 2400, about 1200 to about 2200, about 1200 to about 2000, about 1200 to about 1800, about 1200 to about 1600, about 1200 to about 1400, about 1400 to about 3200, about 1400 to about 3000, about 1400 to about 2800, about 1400 to about 2600, about 1400 to about 2400, about 1400 to about 2200, about 1400 to about 2000, about 1400 to about 1800, about 1400 to about 1600, about 1600 to about 3200, about 1600 to about 3000, about 1600 to about 2800, about 1600 to about 2600, about 1600 to about 2400, about 1600 to about 2200, about 1600 to about 2000, about 1600 to about 1800, about 1800 to about 3200, about 1800 to about 3000, about 1800 to about 2800, about 1800 to about 2600, about 1800 to about 2400, about 1800 to about 2200, about 1800 to about 2000, about 2000 to about 3200, about 2000 to about 3000, about 2000 to about 2800, about 2000 to about 2600, about 2000 to about 2400, about 2000 to about 2200, about 2200 to about 3200, about 2200 to about 3000, about 2200 to about 2800, about 2200 to about 2600, about 2200 to about 2400, about 2400 to about 3200, about 2400 to about 3000, about 2400 to about 2800, about 2400 to about 2600, about 2600 to about 3200, about 2600 to about 3000, about 2600 to about 2800, about 2800 to about 3200, about 2800 to about 3000, or about 3000 to about 3200 μg. In further embodiments, the dose of IP receptor agonist, on a twice daily basis, is about 200 to about 1600 μg. In other embodiments, the dose of IP receptor agonist, on a twice daily basis, is about 200 μg to about 1600 μg. In yet further embodiments, the dose of IP receptor agonist, on a twice daily basis is about 1200 μg to about 1600 μg twice daily.

Typically, the starting, daily amount of the IP receptor agonist is about 400 μg. This can be administered to the patient in one dose (400 μg) or, preferably, in two doses (200 μg/dose). When administered to a patient in two doses, the doses are taken at the same time or staggered. In some embodiments, the first 200 μg dose may be taken in the morning and the second 200 μg dose is taken in the evening. In other embodiments, a 400 μg starting dose is taken in the morning. In further embodiments, a 400 μg starting dose is taken in the evening.

Desirably, the amount of the IP receptor agonist is adjusted to provide the maximum tolerable dose, as determined by a physician or other healthcare provider. The dose of the IP receptor agonist is increased from the initial dose of the IP receptor agonist at regular intervals, depending on patient tolerability, until a maximum tolerable dose (MTD). Typically, the MTD is 1600 μg twice daily or until the patient experiences adverse pharmacological effects that cannot be tolerated and/or medically managed. The regular intervals may be daily or weekly, but the dosing is typically increased at weekly intervals.

In certain embodiments, the IP receptor agonist is selexipag. As used herein, unless otherwise noted, the term "selexipag" refers to 2-{4-[(5,6-diphenylpyrazin-2-yl)(propan-2-yl)amino]butoxy}-N-(methanesulfonyl)acetamide of formula (II).

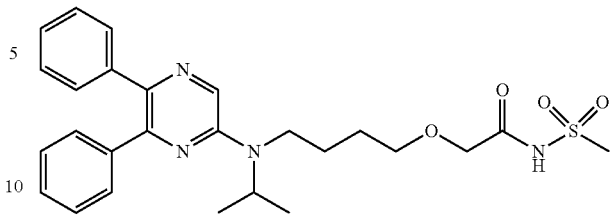

(II)

As used herein, "selexipag" also refers to amorphous or crystalline forms of selexipag, such as polymorphs thereof. In some embodiments, the selexipag is a crystalline form, such as a polymorph. In other embodiments, the selexipag is an amorphous form. In other embodiments, the selexipag is the Form I as described in U.S. Pat. Nos. 8,791,122 and 9,284,280, Form II as described in U.S. Pat. No. 9,340,516, or Form III as described in U.S. Pat. No. 9,440,931, all of which are incorporated by reference herein. The crystallinity may be determined by those skilled in the art using one or more techniques such as, e.g., single crystal x-ray diffraction, powder x-ray diffraction, differential scanning calorimetry, melting point, among others. "Selexipag" as used herein includes anhydrous or hydrates thereof. In certain embodiments, the selexipag is an anhydrous form. In other embodiments, the selexipag is a hydrate thereof. "Selexipag" as used herein further refers to solvates thereof. Such solvates include a molecule of a solvent bound through intermolecular forces or chemical bonds to one or more locations of the selexipag molecule.

The term "selexipag" may also include pharmaceutically acceptable salts thereof, which may readily be selected by those skilled in the art. A "pharmaceutically acceptable salt" is intended to mean a salt of selexipag that is non-toxic, biologically tolerable, or otherwise biologically suitable for administration to the subject. See, e.g., Berge, "Pharmaceutical Salts", J. Pharm. Sci., 1977, 66:1-19, and Handbook of Pharmaceutical Salts, Properties, Selection, and Use, Stahl and Wermuth, Eds., Wiley-VCH and VHCA, Zurich, 2002, which are incorporated herein by reference. Selexipag can be used in the form of a free base or acid, but can also be used after forming into a pharmaceutically acceptable salt by a known method. When the selexipag is basic, examples of "salt" include salts of inorganic acids such as hydrochloric acid, sulfuric acid, nitric acid, phosphoric acid, hydrofluoric acid and hydrobromic acid, and salts of organic acids such as acetic acid, tartaric acid, lactic acid, citric acid, fumaric acid, maleic acid, succinic acid, methanesulfonic acid, ethanesulfonic acid, benzenesulfonic acid, p-toluenesulfonic acid, naphthalenesulfonic acid and camphorsulfonic acid. When the selexipag is acidic, examples of "salt" include alkali metal salts such as sodium salt and potassium salt, and alkali earth metal salts such as calcium salt. Geometrical isomers (Z form and E form) of selexipag or mixtures thereof are also contemplated. Selexipag is commercially available as understood to those skilled in the art. See, e.g., U.S. Pat. No. 7,205,302, which is incorporated by reference herein. For example, selexipag is available as Uptravi® and also is known as ACT-293987 or NS-304. Selexipag is an agonist of the prostacyclin receptor and may be prepared according to a process as disclosed in U.S. Pat. No. 7,205, 302.

The present disclosure also contemplates the administration of selexipag metabolites. Desirably, the selexipag metabolite is metabolically active compound. Thus, in certain embodiments, the selexipag metabolite is of formula II-M1, 4-[(5,6-diphenylpyrazin-2-yl)(isopropyl)amino]butoxy}acetic acid. II-M1 is also known under the code name ACT-333679 or MRE-269. The preparation of selexipag is described in WO-2002/088084 (incorporated herein by reference). The preparation of polymorphic forms, i.e. the crystalline forms I, II, and III of the free base is disclosed in WO-2010/150865 (incorporated herein by reference); polymorphic forms of pharmaceutically acceptable salts are disclosed in WO-2011/024874 (incorporated herein by reference).

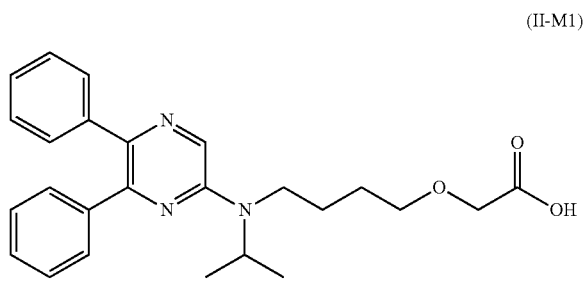 [SMILES: CC(C)N(CCCCOCC(=O)O)c1cnc(-c2ccccc2)c(-c2ccccc2)n1]

(II-M1)

Phosphodiesterase Type 5 Inhibitor

The methods described herein also include administration of a phosphodiesterase type 5 (PDE-5) inhibitor. A physician or other healthcare provider would be able to select a suitable (PDE-5) inhibitor. In some embodiments, the (PDE-5) inhibitor is tadalafil, sildenafil, vardenafil, or udenafil, or a pharmaceutically acceptable salt thereof. In other embodiments, the PDE-5 inhibitor is tadalafil. In other embodiments, the PDE-5 inhibitor is sildenafil. In further embodiments, the PDE-5 inhibitor is vardenafil. In still other embodiments, the PDE-5 inhibitor is udenafil.

The daily dose of PDE-5 inhibitor may be administered once daily, twice daily, or thrice daily, preferably twice daily. In some embodiments, the dose is administered once daily. The amount of the PDE-5 inhibitor may be selected by a physician or other healthcare provider based on factors such as severity of the disease, physical characteristics of the patient, among others. In some embodiments, the amount of the PDE-5 inhibitor is at least about 5 mg. In some embodiments, the amount of the PDE-5 inhibitor is about 5 to about 100 mg, about 10 to about 100 mg, about 10 to about 90 mg, about 10 to about 80 mg, about 10 to about 70 mg, about 10 to about 60 mg, about 10 to about 50 mg, about 10 to about 40 mg, about 10 to about 30 mg, about 10 to about 20 mg, about 20 to about 100 mg, about 20 to about 90 mg, about 20 to about 80 mg, about 20 to about 70 mg, about 20 to about 60 mg, about 20 to about 50 mg, about 20 to about 40 mg, about 20 to about 30 mg, about 30 to about 100 mg, about 30 to about 90 mg, about 30 to about 80 mg, about 30 to about 70 mg, about 30 to about 60 mg, about 30 to about 50 mg, about 30 to about 40 mg, about 40 to about 100 mg, about 40 to about 90 mg, about 40 to about 80 mg, about 40 to about 70 mg, about 40 to about 60 mg, about 40 to about 50 mg, about 50 to about 100 mg, about 50 to about 90 mg, about 50 to about 80 mg, about 50 to about 70 mg, about 50 to about 60 mg, about 60 to about 100 mg, about 60 to about 90 mg, about 60 to about 80 mg, about 60 to about 70 mg, about 70 to about 100 mg, about 70 to about 90 mg, about 70 to about 80 mg, about 80 to about 100 mg, about 80 to about 90 mg, about 90 to about 100 mg. In further embodiments, the dose of the PDE-5 inhibitor is about 20 to about 40 mg. In yet other embodiments, the dose of the PDE-5 inhibitor is about 20 mg. In further embodiments, the dose of the PDE-5 inhibitor is about 40 mg.

It is desirable that the maximum tolerable dose (MTD) of the PDE-5 inhibitor is attained during the initial triple combination therapy. As such, the amount of the PDE-5 inhibitor may be the same throughout the treatment method or be altered. In some embodiments, the amount of the PDE-5 inhibitor is increased from an initial dose. In other embodiments, the amount of the PDE-5 inhibitor is decreased from an initial dose. The dose of the PDE-5 inhibitor may be adjusted depending on a number of factors including, without limitation, renal and hepatic impairment. Thus, in some embodiments, the initial dose of the PDE-5 inhibitor is increased by at about 20 mg during the initial triple combination therapy. For example, the initial dose of the PDE-5 inhibitor is about 20 mg and is later increased to about 40 mg, depending on patient tolerability. The dose of the PDE-5 inhibitor is adjusted after day 1 of the initial triple combination therapy. In some embodiments, the dose of the PDE-5 inhibitor is adjusted at least about 5 days after day 1 of the initial triple combination therapy. In other embodiments, the dose of the PDE-5 inhibitor is adjusted at least about 8 days after day 1 of the initial triple combination therapy. In further embodiments, the dose of the PDE-5 inhibitor is adjusted at least about 11 days after day 1 of the initial triple combination therapy. In some embodiments, the dose of the PDE-5 inhibitor agonist is adjusted about 5 to about 15 days, about 5 to about 11 days, about 5 to about 8 days, about 6 to about 15 days, about 6 to about 11 days, about 6 to about 8 days, about 7 to about 15 days, about 7 to about 11 days, about 7 to about 8 days, about 8 to about 15 days, or about 8 to about 11 days, after day 1 of the initial triple combination therapy. Preferably, the initial dose of the PDE-5 inhibitor is about 20 mg and the dose is increased in about 5 to about 11 days to a dose of about 40 mg thereafter.

Desirably, the PDE-5 inhibitor is taken by the patient at the same time during the day. Thus, in some embodiments, the PDE-5 inhibitor is taken in the morning. In other embodiments, the PDE-5 inhibitor is taken in the evening. The amount of the PDE-5 inhibitor may be taken as a single dose or broken up into two or more doses as determined by one skilled in the art. Preferably, the PDE-5 inhibitor is taken as a single dose.

As used herein, unless otherwise noted, the term "tadalafil" refers to pyrazino[1',2';1,6]pyrido[3,4-b]indole-1,4-dione, 6-(1,3-benzodioxol-5-yl)2,3,6,7,12,12a-hexahydro-2-methyl-, (6R,12aR)- of formula (III).

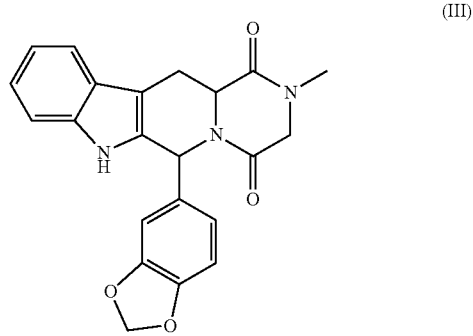 [SMILES: CN1CC(=O)N2C(Cc3c([nH]c4ccccc34)C2c2ccc3c(c2)OCO3)C1=O]

(III)

The term "tadalafil" may also include pharmaceutically acceptable salts thereof, which may readily be selected by those skilled in the art. A "pharmaceutically acceptable salt" is intended to mean a salt of tadalafil that is non-toxic, biologically tolerable, or otherwise biologically suitable for administration to the subject. See, e.g., Berge, "Pharmaceutical Salts", J. Pharm. Sci., 1977, 66:1-19, and Handbook of Pharmaceutical Salts, Properties, Selection, and Use, Stahl and Wermuth, Eds., Wiley-VCH and VHCA, Zurich, 2002, which are incorporated herein by reference. Tadalafil can be used in the form of a free base or acid, but can also be used after forming into a pharmaceutically acceptable salt by a known method. When the tadalafil is basic, examples of "salt" include salts of inorganic acids such as hydrochloric acid, sulfuric acid, nitric acid, phosphoric acid, hydrofluoric acid and hydrobromic acid, and salts of organic acids such as acetic acid, tartaric acid, lactic acid, citric acid, fumaric acid, maleic acid, succinic acid, methanesulfonic acid, ethanesulfonic acid, benzenesulfonic acid, p-toluenesulfonic acid, naphthalenesulfonic acid and camphorsulfonic acid. When the tadalafil is acidic, examples of "salt" include alkali metal salts such as sodium salt and potassium salt, and alkali earth metal salts such as calcium salt. Tadalafil is commercially available as Adcirca™.

Maintenance Treatment Period

The treatment period of the initial triple combination therapy typically includes a maintenance period. The maintenance period may be determined by a physician or other healthcare provider. The maintenance period typically begins following a time sufficient to determine the maximum tolerable dose (MTD) for one or more of the ERA, PDE-5 inhibitor, and IP receptor agonist. In particular embodiments, the maintenance period begins following the determination of the MTD of the IP receptor agonist. Accordingly, the time from the start of initial triple combination therapy until the start of the maintenance phase may vary from, for example, about 4 weeks to about 30 weeks. Typically, the treating physician will evaluate the patient to assess the need to maintain therapy on all of the ERA, PDE-5 inhibitor, and IP receptor agonist or to discontinue use of one or more of the ERA, PDE-5 inhibitor, or IP receptor agonist. In some embodiments, the patient continues therapy with the ERA, PDE-5 inhibitor, and IP receptor agonist during the maintenance treatment period. In other embodiments, the patient continues therapy with the ERA and PDE-5 inhibitor during the maintenance treatment period. In further embodiments, the patient continues therapy with the ERA and IP receptor agonist during the maintenance treatment period. In yet other embodiments, the patient continues therapy with the PDE-5 inhibitor and IP receptor agonist during the maintenance treatment period. In still further embodiments, the patient continues therapy with the ERA during the maintenance treatment period. In other embodiments, the patient continues therapy with the PDE-5 inhibitor during the maintenance treatment period. In further embodiments, the patient continues therapy with the IP receptor agonist during the maintenance treatment period.

The dosing amount and frequency of the one or more of ERA, PDE-5 inhibitor, or IP receptor agonist during the maintenance treatment period will be determined by the attending physician. The dosing frequency and amount of the ERA, PDE-5 inhibitor, and/or IP receptor agonist during the maintenance treatment period is the minimum frequency and amount to reduce the risk of disease progression in the patient. In some embodiments, the maintenance treatment period is at least about 4 weeks, about 5 weeks, about 6 weeks, about 7 weeks, about 8 weeks, about 9 week, about 10 weeks, about 11 weeks, about 12 weeks, about 13 weeks, about 17 weeks, about 18 weeks, about 19 weeks, about 20 weeks, about 6 months, about 7 months, about 8 months, about 9 months, about 10 months, about 11 months, 1 year, or about 2 years. In some embodiments, the maintenance treatment period is at least six months. In other embodiments, the maintenance treatment period is at least one year.

The maintenance treatment period may include longer periods of time depending on the patient's condition. In some embodiments, those longer periods may be at least about 3 years, about 4 years, about 5 years, about 6 years, about 7 years, about 8 years, about 9 years, about 10 years, or more than about 10 years, including indefinitely. The patient will remain on the maintenance treatment period until the patient no longer exhibits PAH symptoms, the PAH symptoms continue to decrease, the PAH symptoms do not worsen, and/or the patient fails to respond to the treatment.

The amount of the ERA, PDE-5 inhibitor, or IP receptor agonist administered to the patient during the maintenance treatment period is an amount that elicits the biological or medicinal response resulting in elimination of one or more PAH symptoms or a reduction of one or more PAH symptoms. In some embodiments, the amount of the one or more of ERA, PDE-5 inhibitor, or IP receptor agonist will be the same as any amount administered prior to the maintenance period. In other embodiments, the amount for one or more of the ERA, PDE-5 inhibitor, or IP receptor agonist may be increased or decreased as needed.

At any stage of the treatment period, i.e., before or during the maintenance treatment period, the patient's response to the treatment may be assessed. This assessment may be performed until the patient is considered by a physician or other healthcare provider to have achieved a suitable response to the initial triple combination therapy.

Administration Regimens

In the methods described herein, the amounts/doses of the PDE-5 inhibitor, ERA, and IP receptor agonist are safe, effective, or safe and effective. As used herein, unless otherwise noted, the term "safe" shall mean without undue adverse side effects (such as toxicity, irritation, or allergic response), commensurate with a reasonable benefit/risk ratio when used in the manner of this invention. Similarly, unless otherwise noted, the term "effective" means the efficacy of treatment has been demonstrated for the treatment of patients with pulmonary arterial hypertension when dosed in a therapeutically effective dose. In certain embodiments, the methods described herein are safe. In other embodiments, the methods described herein are effective. In further embodiments, the methods described herein are safe and effective. In yet other embodiments, the therapeutically effective amounts of the PDE-5 inhibitor, ERA, and IP receptor agonist are safe. In still further embodiments, the therapeutically effective amounts of the PDE-5 inhibitor, ERA, and IP receptor agonist are effective. In other embodiments, the therapeutically effective amounts of the PDE-5 inhibitor, ERA, and IP receptor agonist are safe and effective.

As used herein, unless otherwise noted, the term "clinically proven" (used independently or to modify the terms "safe" and/or "effective") shall mean that proof has been proven by a Phase III or IV clinical trial that are sufficient to meet approval standards of U.S. Food and Drug Administration or similar study for market authorization by EMEA. Preferably, an adequately sized, randomized, double-blinded controlled study is used to clinically prove the effects of the PDE-5 inhibitor, ERA, and IP receptor agonist as compared to a placebo with the patient's condition assessed by techniques described herein.

As used herein, unless otherwise noted, the term "clinically proven effective" means the efficacy of treatment has been proven by a Phase III or IV clinical trial as statistically significant i.e., the results of the clinical trial are not likely to be due to chance with an alpha level less than 0.05 or the clinical efficacy results are sufficient to meet approval standards of U.S. Food and Drug Administration or similar study for market authorization by EMEA. For example, selexipag, macitentan, and tadalafil were each, independently, clinically proven effective for the treatment of patients with pulmonary arterial hypertension in therapeutically effective doses as described herein, and as specifically set forth in the examples.

As used herein, unless otherwise noted, the term "clinically proven safe" means the safety of treatment has been proven by a Phase III or IV clinical trial by analysis of the trial data and results establishing that the treatment is without undue adverse side effects and commensurate with the statistically significant clinical benefit (e.g., efficacy) sufficient to meet approval standards of U.S. Food and Drug Administration or similar study for market authorization by Europe, the Middle East, and Africa (EMEA). For example, selexipag, macitentan, and tadalafil were each, independently, clinically proven safe for the treatment of patients with pulmonary arterial hypertension when dosed in therapeutically effective doses as described herein, and as specifically set forth in the examples.

In certain aspects, methods of selling a drug product comprising the PDE-5 inhibitor, ERA, and IP receptor agonist are also provided. The terms "sale" or "selling" as used herein refers to transferring a drug product, e.g., a pharmaceutical composition or a dosage form, from a seller to a buyer. Thus, the methods include selling a drug product comprising the PDE-5 inhibitor, ERA, and IP receptor agonist, wherein the method comprises selling the drug product. In some embodiments, a drug product label for a reference listed drug for the drug product includes instructions for treating PAH. The methods also include offering for sale a drug product comprising the PDE-5 inhibitor, ERA, and IP receptor agonist. The term "offering for sale," as used herein, refers to the proposal of a sale by a seller to a buyer for a drug product, e.g., a pharmaceutical composition or a dosage form. These methods comprise offering the drug product for sale.

In some embodiments, the present disclosure provides pharmaceutical drug products comprising clinically proven safe and clinically proven effective amounts of PDE-5 inhibitor, ERA, and IP receptor agonist wherein the pharmaceutical product is packaged and wherein the package includes a label that identifies PDE-5 inhibitor, ERA, and IP receptor agonist as regulatory approved chemical entities and includes instructions for treating PAH.

The term "drug product" refers to a product that contains an active pharmaceutical ingredient that has been approved for marketing by a governmental authority, e.g., the Food and Drug Administration or the similar authority in other countries. In some embodiments, the drug product comprises a PDE-5 inhibitor, ERA, and IP receptor agonist.

Similarly, "label" or "drug product label" refers to information provided to a patient which provides relevant information regarding the drug product. Such information includes, without limitation, one or more of the description of the drug, clinical pharmacology, indications (uses for the drug product), contraindication (who should not take the drug product), warnings, precautions, adverse events (side effects), drug abuse and dependence, dosage and administration, use in pregnancy, use in nursing mothers, use in children and older patients, how the drug is supplied, safety information for the patient, or any combination thereof. In certain embodiments, the label or drug product label provides instructions for treating PAH. In further embodiments, the label or drug product label identifies the PDE-5 inhibitor, ERA, and IP receptor agonist as regulatory approved chemical entities.

The term "reference listed drug" or "RLD" as used herein refers to a drug product to which new generic versions are compared to show that they are bioequivalent. It is also a medicinal product that has been granted marketing authorization by a member state of the European Union or by the Commission on the basis of a completed dossier, i.e., with the submission of quality, pre-clinical and clinical data in accordance with Articles 8(3), 10a, 10b or 10c of Directive 2001/83/EC and to which the application for marketing authorization for a generic/hybrid medicinal product refers, by demonstration of bioequivalence, usually through the submission of the appropriate bioavailability studies.

In certain embodiments, the drug product is an ANDA drug product, a supplemental New Drug Application drug product, or a 505(b)(2) drug product. In the United States, a company seeking approval to market a generic equivalent must refer to the RLD in its Abbreviated New Drug Application (ANDA). For example, an ANDA applicant relies on the FDA's finding that a previously approved drug product, i.e., the RLD, is safe and effective, and must demonstrate, among other things, that the proposed generic drug product is the same as the RLD in certain ways. Specifically, with limited exceptions, a drug product for which an ANDA is submitted must have, among other things, the same active ingredient(s), conditions of use, route of administration, dosage form, strength, and (with certain permissible differences) labeling as the RLD. The RLD is the listed drug to which the ANDA applicant must show its proposed ANDA drug product is the same with respect to active ingredient(s), dosage form, route of administration, strength, labeling and conditions of use, among other characteristics. In the electronic Orange Book, there is a column for RLDs and a column for reference standards. In the printed version of the Orange Book, the RLDs and reference standards are identified by specific symbol.

In Europe, Applicants identify in the application form for its generic/hybrid medicinal product, which is the same as an ANDA or supplemental NDA (sNDA) drug product, the reference medicinal product (product name, strength, pharmaceutical form, marketing authorization holder (MAH, first authorization, Member State/Community), which is synonymous with a RLD, as follows:

1. The medicinal product that is or has been authorized in the European Economic Area (EEA), used as the basis for demonstrating that the data protection period defined in the European pharmaceutical legislation has expired. This reference medicinal product, identified for the purpose of calculating expiry of the period of data protection, may be for a different strength, pharmaceutical form, administration route or presentation than the generic/hybrid medicinal product.

2. The medicinal product, the dossier of which is cross-referred to in the generic/hybrid application (product name, strength, pharmaceutical form, MAH, marketing authorization number). This reference medicinal product may have been authorized through separate procedures and under a different name than the reference medicinal product identified for the purpose of calculating expiry of the period of data protection. The product information of this reference medicinal product will, in principle, serve as the basis for the product information claimed for the generic/hybrid medicinal product.

3. The medicinal product (product name, strength, pharmaceutical form, MAH, Member State of source) used for the bioequivalence study(ies) (where applicable).

The different abbreviated approval pathways for drug products under the Food, Drug, and Cosmetics (FD&C) Act are the abbreviated approval pathways described in sections 505(j) and 505(b)(2) of the FD&C Act (21 U.S.C. 355(j) and 21 U.S.C. 355(b)(2), respectively).

According to the FDA ("Determining Whether to Submit an ANDA or a 505(b)(2) Application Guidance for Industry," U.S. Department of Health and Human Services, October 2017, pp. 1-14, the contents of which is incorporated herein by reference), NDAs and ANDAs can be divided into the following four categories:

(1) A "stand-alone NDA" is an application submitted under section 505(b)(1) and approved under section 505(c) of the FD&C Act that contains full reports of investigations of safety and effectiveness that were conducted by or for the applicant or for which the applicant has a right of reference or use.

(2) A section 505(b)(2) application is an NDA submitted under section 505(b)(1) and approved under section 505(c) of the FD&C Act that contains full reports of investigations of safety and effectiveness, where at least some of the information required for approval comes from studies not conducted by or for the applicant and for which the applicant has not obtained a right of reference or use.

(3) An ANDA is an application for a duplicate of a previously approved drug product that was submitted and approved under section 505(j) of the FD&C Act. An ANDA relies on the FDA's finding that the previously approved drug product, i.e., the reference listed drug (RLD), is safe and effective. An ANDA generally must contain information to show that the proposed generic product (a) is the same as the RLD with respect to the active ingredient(s), conditions of use, route of administration, dosage form, strength, and labeling (with certain permissible differences) and (b) is bioequivalent to the RLD. An ANDA may not be submitted if studies are necessary to establish the safety and effectiveness of the proposed product.

(4) A petitioned ANDA is a type of ANDA for a drug product that differs from the RLD in its dosage form, route of administration, strength, or active ingredient (in a product with more than one active ingredient) and for which FDA has determined, in response to a petition submitted under section 505(j)(2)(C) of the FD&C Act (suitability petition), that studies are not necessary to establish the safety and effectiveness of the proposed drug product.

A scientific premise underlying the Hatch-Waxman Act is that a drug product approved in an ANDA under section 505(j) of the FD&C Act is presumed to be therapeutically equivalent to its RLD. Products classified as therapeutically equivalent can be substituted with the full expectation that the substituted product will produce the same clinical effect and safety profile as the prescribed product when administered to patients under the conditions specified in the labeling. In contrast to an ANDA, a section 505(b)(2) application allows greater flexibility as to the characteristics of the proposed product. A section 505(b)(2) application will not necessarily be rated therapeutically equivalent to the listed drug it references upon approval The methods may also comprise, consist of, or consist essentially of placing the PDE-5 inhibitor, ERA, and IP receptor agonist into the stream of commerce. In certain embodiments, the PDE-5 inhibitor, ERA, and IP receptor agonist includes a package insert that contains instructions for treating PAH.

In further aspects, described herein are methods of selling pharmaceutical compositions, independently, containing the PDE-5 inhibitor, ERA, and IP receptor agonist comprising, consisting of, or consisting essentially of placing the pharmaceutical compositions into the stream of commerce. In certain embodiments, the pharmaceutical composition includes a package insert that contains instructions for treating PAH.

In still further aspects, described herein are methods of offering for sale the PDE-5 inhibitor, ERA, and IP receptor agonist comprising, consisting of, or consisting essentially of offering to place the PDE-5 inhibitor, ERA, and IP receptor agonist into the stream of commerce. In certain embodiments, the PDE-5 inhibitor, ERA, and IP receptor agonist includes a package insert that contains instructions for treating PAH.

Formulations/Compositions

Pharmaceutical compositions independently containing one or more of the IP receptor agonist, PDE-5 inhibitor, or ERA as the active ingredient can be prepared by intimately mixing the compound or compounds with a pharmaceutical carrier according to conventional pharmaceutical compounding techniques. As used herein, the terms "composition" and "formulation" are used interchangeably and encompass a product comprising the specified ingredients in the specified amounts, as well as any product, such as a pharmaceutical product, which results, directly or indirectly, from combinations of the specified ingredients in the specified amounts. A summary of pharmaceutical compositions can be found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999), herein incorporated by reference for such disclosure. For example, formulations comprising macitentan are disclosed in U.S. Pat. Nos. 8,367,685 and 9,265,762, incorporated by reference herein.

Desirably, the IP receptor agonist, PDE-5 inhibitor, and ERA are, independently, formulated into compositions as discussed herein, although one or more of the IP receptor agonist, ERA, and PDE-5 inhibitor may be in a single formulation. Such compositions may be administered to a patient neat or in a mixture with a pharmaceutically acceptable non-toxic inert carrier, for example, as a pharmaceutical composition containing the compound at a level of 0.1% to 99.5 wt %, preferably 0.5% to 90%, based on the total weight of the composition. As a carrier, one or more of auxiliary agents for formulations such as solid, semi-solid and liquid diluent, filler and other auxiliary agents for drug formulations may be used. It is desirable that a pharmaceutical composition is administered as a unit dosage form.

The IP receptor agonist, PDE-5 inhibitor, and/or ERA may be, independently, administered by a number of routes as determined by those skilled in the art. Preferably, the IP receptor agonist, PDE-5 inhibitor, and/or ERA are, independently, administered by route that is suitable for the IP receptor agonist. In some embodiments, the IP receptor agonist, PDE-5 inhibitor, and/or ERA are, independently, administered orally, parenterally, or any combination thereof. In other embodiments, the IP receptor agonist, PDE-5 inhibitor, or ERA are, independently, administered orally. In further embodiments, the IP receptor agonist, PDE-5 inhibitor, or ERA are, independently, administered orally in the form of one or more tablets. The term "independently administered" as used herein refers to each of the IP receptor agonist, PDE-5 inhibitor, and ERA being present in separate formulations, i.e., one unit dose/formulation contains the IP receptor agonist, one unit dose/formulation contains the PDE-5 inhibitor, and one unit dose/formulation contains the ERA. However, such independent formulations may be administered at the same time, i.e., the unit dose containing the IP receptor, the unit dose/formulation containing the PDE-5 inhibitor, and the unit dose/formulation containing the ERA may be administered at the same time or at different times as described herein. In other embodiments, the ERA and PDE-5 inhibitor are administered orally together in the form of a single tablet, and the IP receptor agonist is administered orally in the form of one or more separate tablets.

In some embodiments, the IP receptor agonist, PDE-5 inhibitor, and/or ERA are, independently, administered as injections or infusions such as intravenous injections. For intravenous administration, the IP receptor agonist, PDE-5 inhibitor, and/or ERA or pharmaceutical product is a sterile solution. Injectable suspensions or solutions may be prepared utilizing aqueous carriers along with appropriate additives. For intravenous administration, the carrier will usually consist of sterile water and other ingredients which increase solubility or preservation. Suitable dispersing or suspending agents for aqueous suspensions, include synthetic and natural gums such as tragacanth, acacia, alginate, dextran, sodium carboxymethylcellulose, methylcellulose, polyvinyl-pyrrolidone or gelatin. Isotonic preparations which may contain suitable preservatives are employed when intravenous administration is desired. In some embodiments, the carrier used in intravenous formulations comprises sterile water.

For oral administration, each preparation may be solid or liquid. Preferably, the oral forms of the IP receptor agonist, PDE-5 inhibitor, and ERA as described herein are solids. Examples of solid formulations include, for example, pastilles, thin films, pastes, lozenges, granules, powders, capsules, pills such as caplets, gelcaps, tablets, and capsules (each including immediate release, timed release and sustained release pills). Preferably, the oral compositions are administered as tablets, i.e., desirably, the pharmaceutical product comprises a tablet. If desired, tablets or caplets may be sugar coated or enteric coated by standard techniques or otherwise compounded to provide a dosage form affording the advantage of prolonged action. For preparing solid compositions such as tablets, the principal active ingredient (e.g., IP receptor agonist, PDE-5 inhibitor, or ERA) is mixed with a pharmaceutical carrier/additive such as starches, sweeteners such as sugars, diluents, coloring agents, granulating agents, preservatives, lubricants, flavoring agents, binders, disintegrating agents and the like. For tablets, conventional tableting ingredients such as corn starch, lactose, sucrose, sorbitol, talc, stearic acid, magnesium stearate, dicalcium phosphate or gums, and other pharmaceutical diluents, e.g., water, ethanol, glycerol, or the like, may be used. Suitable binders include, without limitation, starch, gelatin, natural sugars such as glucose or beta-lactose, corn sweeteners, natural and synthetic gums such as acacia, tragacanth or sodium oleate, sodium stearate, magnesium stearate, sodium benzoate, sodium acetate, sodium chloride and the like. Disintegrating agents include, without limitation, starch, methyl cellulose, agar, bentonite, xanthan gum and the like. The liquid forms in which the compositions of the present disclosure may be incorporated for administration by injection include, aqueous solutions, suitably flavored syrups, aqueous or oil suspensions, and flavored emulsions with edible oils such as cottonseed oil, sesame oil, coconut oil or peanut oil, as well as elixirs and similar pharmaceutical vehicles. The liquid oral preparations independently contain the IP receptor agonist, PDE-5 inhibitor, and/or ERA and one or more of suitable carriers/additives such as water, glycols, oils, alcohols, flavoring agents, preservatives, stabilizers, coloring agents and the like.

To prepare pharmaceutical compositions of the present disclosure, the IP receptor agonist, PDE-5 inhibitor, or ERA, as the active ingredient, may be intimately admixed with a pharmaceutical carrier according to conventional pharmaceutical compounding techniques, which carrier may take a wide variety of forms depending of the form of preparation desired for administration (e.g., oral or parenteral). Suitable pharmaceutically acceptable carriers are well known in the art. Descriptions of some of these pharmaceutically acceptable carriers may be found in The Handbook of Pharmaceutical Excipients, published by the American Pharmaceutical Association and the Pharmaceutical Society of Great Britain, the disclosure of which is hereby incorporated by reference.

Methods of formulating pharmaceutical compositions have been described in numerous publications such as Pharmaceutical Dosage Forms: Tablets, Second Edition, Revised and Expanded, Volumes 1-3, edited by Lieberman et al; Pharmaceutical Dosage Forms: Parenteral Medications, Volumes 1-2, edited by Avis et al; and Pharmaceutical Dosage Forms: Disperse Systems, Volumes 1-2, edited by Lieberman et al; published by Marcel Dekker, Inc., the disclosures of which are hereby incorporated by reference.

Aspects

Aspect 1. A method of reducing the risk of disease progression in a patient with pulmonary arterial hypertension (PAH), comprising administering to a patient in need thereof, an initial triple combination therapy of an endothelin receptor antagonist (ERA), a phosphodiesterase type 5 (PDE-5) inhibitor, and a prostacyclin receptor agonist (IP receptor agonist).

Aspect 2. The method of Aspect 1, wherein the reduced risk of disease progression is relative to a patient population with PAH that receives an initial double combination therapy of the ERA and the PDE-5 inhibitor.

Aspect 3. The method of Aspect 1 or 2, wherein the ERA is macitentan, bosentan, or ambrisentan, or a pharmaceutically acceptable salt thereof; the PDE-5 inhibitor is tadalafil, sildenafil, vardenafil, or udenafil, or a pharmaceutically acceptable salt thereof; and the IP receptor agonist is selexipag, 4-[(5,6-diphenylpyrazin-2-yl)(isopropyl)amino] butoxy}acetic acid (MRE-269), or a pharmaceutically acceptable salt thereof.

Aspect 4. The method of Aspect 3, wherein the ERA is macitentan, the PDE-5 inhibitor is tadalafil, and the IP receptor agonist is selexipag.

Aspect 5. The method of any one of the preceding Aspects, wherein the patient is treatment naïve for PAH.

Aspect 6. The method of any one of the preceding Aspects, wherein an initial PAH diagnosis of the patient is made within six months of the start of the initial triple combination therapy.

Aspect 7. The method of any one of the preceding Aspects, wherein the patient has a mean pulmonary arterial hypertension (mPAP) of greater than or equal to about 25 mmHg at rest, a mean pulmonary arterial wedge pressure (PAWP) of less than or equal to about 15 mmHg, and a pulmonary vascular resistance (PVR) of greater than or equal to about 240 dyn·sec/cm$^5$ at the start of the initial triple combination therapy.

Aspect 8. The method of any one of the preceding Aspects, wherein the patient has a 6-minute walk distance (6MWD) of greater than or equal to about 50 meters at the start of the initial triple combination therapy.

Aspect 9. The method of any one of Aspects 4-8, wherein the macitentan is administered in an amount of about 10 mg once daily.

Aspect 10. The method of any one of Aspects 4-9, wherein the tadalafil is administered in an amount of from about 20 mg to about 40 mg once daily.

Aspect 11. The method of any one of Aspects 4-10, wherein the tadalafil is administered in an amount of about 40 mg once daily Aspect 12. The method of any one of Aspects 4-11, wherein the selexipag is administered in an amount of from about 200 μg to about 1600 μg twice daily.

Aspect 13. The method of any one of Aspects 4-12, wherein each of the macitentan, the tadalafil, and the selexipag are administered orally in the form of one or more tablets.

Aspect 14. The method of any one of Aspects 4-12, wherein the macitentan and the tadalafil are administered orally in the form of a single tablet, and the selexipag is administered orally in the form of one or more separate tablets.

Aspect 15. The method of any one of Aspects 2-14, wherein the initial triple combination therapy reduced the risk of disease progression by about 30 to 40% relative to the initial double combination therapy.

Aspect 16. The method of any one of the preceding Aspects, wherein the disease progression comprises hospitalization for worsening of PAH, clinical worsening of PAH, or death.

| Abbreviations | |
|---|---|
| 6MWD | 6-minute walk distance |
| AE | Adverse event |
| ALT | Alanine aminotransferase |
| ANCOVA | Analysis of covariance |
| AST | Aspartate aminotransferase |
| BMI | Body mass index |
| BP | Blood pressure |
| CI | Confidence interval |
| CL | Confidence limit |
| CO | Cardiac output |
| CV | Coefficient of variation |
| CYP3A4 | Cytochrome P450 3A4 |
| DLCO | Diffusing capacity of the lung for carbon monoxide |
| d/sSAP | Diastolic/systolic systemic arterial pressure |
| EOMOP | End of main observation period |

| Abbreviations | |
|---|---|
| EOS | End of study |
| EOT | End of treatment |
| ERA | Endothelin receptor antagonist |
| FAS | Full Analysis Set |
| FC | Functional class |
| FEV1 | Forced expiratory volume in 1 second |
| FVC | Forced vital capacity |
| GM | Geometric means |
| HIV | Human immunodeficiency virus |
| HR | Heart rate |
| LS | Least Square Mean |
| MedDRA | Medical Dictionary for Regulatory Activities |
| mRAP | Mean right atrial pressure |
| NT-proBNP | N-terminal pro B-type natriuretic peptide |
| OR | Odds ration |
| PAH | Pulmonary arterial hypertension |
| PAWP | Pulmonary arterial wedge pressure |
| PDE-5 | Phosphodiesterase-5 |
| PDE-5i | Phosphodiesterase-5 inhibitor |
| PH | Pulmonary hypertension |
| PI | Principal investigator |
| PVR | Pulmonary vascular resistance |
| RHC | Right heart catheterization |
| SAE | Serious adverse event |
| SD | Standard deviation |
| SOC | System organ class |
| th | therapy |
| ULN | Upper limit of the normal range |
| WHO | World Health Organization |
| WU | Wood Units |

EXAMPLES

Example 1

This was a prospective, multi-center, double-blind, randomized, placebo-controlled, parallel-group, Phase 3b study, comparing an initial triple oral combination therapy (macitentan 10 mg, tadalafil 40 mg and selexipag 200-1600 mg b.i.d.) with an initial dual oral combination therapy (macitentan 10 mg, tadalafil 40 mg and placebo) in newly diagnosed, treatment-naïve subjects with PAH. This study used a group sequential design, with one interim analysis (futility only) planned when approximately 33% of the subjects had completed their Week 26 PVR assessment (primary endpoint) or prematurely discontinued the study.

Randomization: Subjects were randomized in a 1:1 ratio to triple or dual therapy (selexipag/placebo double-blind and open label macitentan and tadalafil), stratified by region (North America versus rest of the world) and WHO FC at baseline (I/II versus III/IV).

Figure 2:
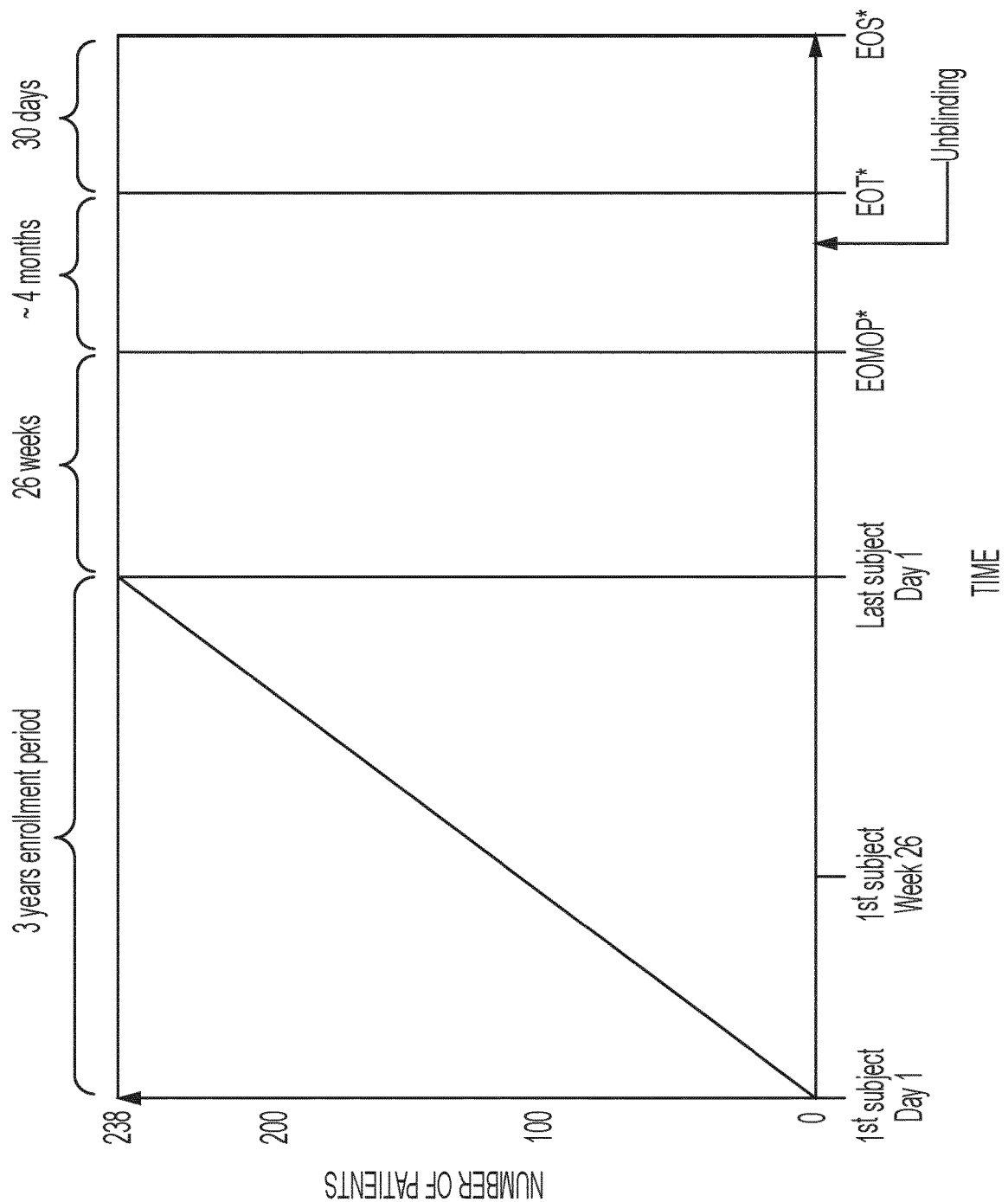
FIG. 2 is a schematic showing the planned duration at the study level.

Study/treatment duration: The treatment period consisted of 2 weeks of open-label macitentan and tadalafil followed by a double-blind phase (+ open-label macitentan and tadalafil) with up-titration of selexipag/placebo until Week 12 and a maintenance treatment period that lasts up to the EOT visit. At the time the last subject completed the Week 26 visit, all patients who were still in the study returned for the EOMOP visit. The EOMOP visit was the individual cut-off date for the primary database lock. Subjects are followed-up until EOS, i.e. 30 days after EOT, regardless of whether they are receiving any study treatment or not. See, FIGS. 1 and 2 for the study design. The following are referenced in FIG. 1: [1]Signed written informed consent is required prior to any study-mandated procedure; right heart catheterization [RHC] data obtained at the study site before informed consent signature but within 28 days prior to Day 1 are acceptable. [2]Study treatment initiation scheme. [3]For simplification, most visits between Day 1 and end of main observation period (EOMOP) are not displayed. [4]If double-blind treatment (selexipag/placebo) is discontinued before Week 26, the Week 26 assessments should be done either at Week 26 or before start of rescue therapy (prostacyclin, prostacyclin analog, or prostacyclin receptor agonist), whichever is first. [5]The EOMOP is the data cutoff for the main efficacy and safety analyses, followed by data cleaning and unblinding of the treatment group allocation. The EOMOP visit is planned 26±1 weeks after enrollment of the last subject. The EOMOP visit is not required if within ±2 weeks of a patient's Week 26 visit or Month 12, 18, 24, 30, etc. visit. [6]All 3 study treatments are provided until the EOT visit, which is planned approximately 4 months after the EOMOP visit. In the event of premature discontinuation of all 3 study treatments, the EOT visit should be performed within 1 week but the subject should be followed up according to the schedule of assessments until end of study. [7]EOS is defined as the last data collection for a subject. The EOS visit for all subjects (regardless of whether they are receiving 3, 2, 1, or no study treatment) is planned approximately 5 months after the EOMOP visit. For all randomized patients, follow-up for disease progression (including death) will continue until EOS. For purposes of this study, baseline refers the last available assessment/measurement obtained before or on Day 1 (before randomization).

Primary analysis set for efficacy: The FAS includes all randomized subjects. Subjects are evaluated according to the treatment they have been randomized to (treatment policy estimand with missing Week 26 assessments imputed with LOCF for all types of intercurrent events).

Primary efficacy variable: Ratio of Week 26 to baseline PVR (Week 26 divided by baseline PVR). (PVR is log-transformed and change from baseline to Week 26 in log PVR is analyzed using an ANCOVA model with factors for treatment and randomization stratification variables region and WHO FC and baseline log PVR as covariate. Ratio of geometric means [triple over dual therapy] is obtained by exponentiation).

Key secondary efficacy variables (in testing order):
Change from baseline to Week 26 in 6MWD (analyzed using same model as for primary endpoint, but without log-transformation),
Change from baseline to Week 26 in NT-proBNP (analyzed using same model as for primary endpoint),
Time to first disease progression event up to EOMOP+7 days (analyzed using a log-rank test for treatment group difference stratified for the randomization stratification variables region and WHO FC),
Absence of WHO FC worsening from baseline to Week 26 (analyzed using a logistic regression model with factors for treatment and randomization stratification variables region and WHO FC).
Changes from baseline to Week 26 in RHC variables other than PVR (mPAP, cardiac index, total pulmonary resistance, mRAP, venous oxygen saturation).

Testing strategy: The Safety Set includes all subjects who received at least one dose of any of the 3 study treatments. The FAS includes all randomized subjects. The Modified FAS includes all subjects from the FAS who received at least one dose of each of the 3 study treatments. The Per-protocol Set includes all subjects from the FAS who received at least one dose of double-blind study treatment and who have no major protocol deviation.

Statistical analysis tests were conducted at the two-sided 0.05 significance level. The multiplicity, regarding testing multiple endpoints (the primary and the key secondary), was controlled by a fixed sequence testing procedure, i.e., the first key secondary hypothesis was tested only after the null hypothesis for the primary endpoint was rejected. A planned interim analysis looking at futility only was conducted (after 33% of subjects completed primary endpoint assessment or discontinued).

Inclusion Criteria included:
1. Signed informed consent prior to any study-mandated procedure.
2. Male or female≥18 and ≤75 years of age at screening.
3. Initial PAH diagnosis<6 months prior to Day 1.
4. RHC performed between Day −28 and Day 1 (RHC data obtained at the study site within this time frame, but before the study, i.e., before signed informed consent, are acceptable), meeting all the following criteria:
Mean pulmonary artery pressure (mPAP)≥25 mmHg.
Pulmonary artery wedge pressure or left ventricular end-diastolic pressure≤15 mmHg.
PVR≥480 dyn·sec/cm$^5$ (≥6 Wood Units).
Negative vasoreactivity test mandatory in idiopathic, heritable, and drug/toxin induced PAH (at this or a previous RHC).
5. Symptomatic PAH belonging to one of the following subgroups:
Idiopathic.
Heritable.
Drug or toxin induced.
Associated with one of connective tissue disease, HIV infection, or congenital heart disease with simple systemic-to-pulmonary shunt (atrial septal defect, ventricular septal defect, patent ductus arteriosus)≥1 year after surgical repair.
6. 6MWD≥50 m at screening.
7. Women of childbearing potential must:
Have a negative serum pregnancy test at the screening visit and a negative urine pregnancy test at the Day 1 visit, and
Agree to perform monthly pregnancy tests up to EOS, and
Agree to use reliable contraception from screening up to 1 month following discontinuation of the last study treatment.
Reliable contraception must be started at least 11 days prior to Day 1.

Exclusion Criteria included:
1. Any PAH-specific drug therapy (e.g., any ERA, PDE-5i, soluble guanylate cyclase stimulator, prostacyclin, prostacyclin analog, or prostacyclin receptor agonist) at any time prior to Day 1 (administration for vasoreactivity testing is permitted; previous PAH-specific drugs used intermittently for the treatment of digital ulcers or Raynaud's phenomenon are permitted if stopped>6 months prior to Day 1).
2. Cardio-pulmonary rehabilitation program based on exercise (planned, or started≤12 weeks prior to Day 1).
3. Body mass index (BMI)>40 kg/m$^2$ at screening.
4. Presence of three or more of the following risk factors for heart failure with preserved ejection fraction at screening:
BMI>30 kg/m$^2$.
Diabetes mellitus of any type.
Essential hypertension.
Coronary artery disease, i.e., any of the following:
History of stable angina or
More than 50% stenosis in a coronary artery (by coronary angiography) or
History of myocardial infarction or
History of or planned coronary artery bypass grafting and/or coronary artery stenting.

5. Acute myocardial infarction≤12 weeks prior to screening.

6. Cerebrovascular events (e.g., transient ischemic attack, stroke)≤12 weeks prior to screening.

7. Known permanent atrial fibrillation.

8. Systolic blood pressure<90 mmHg at screening or Day 1.

9. Ongoing or planned treatment with organic nitrates and/or doxazosin.

10. Presence of one or more of the following signs of relevant lung disease at any time up to screening:
   DLCO<40% of predicted unless computed tomography reveals no or mild interstitial lung disease.
   FVC<60% of predicted.
   FEV1<60% of predicted.
   Pulmonary function tests may be performed either with or without the use of bronchodilators, as per local clinical practice.

11. Known or suspected pulmonary veno-occlusive disease.

12. Documented severe hepatic impairment (with or without cirrhosis) according to National Cancer Institute organ dysfunction working group criteria, defined as total bilirubin>3× upper limit of the ULN accompanied by AST>ULN (assessed at screening); and/or Child-Pugh Class C.

13. Serum AST and/or ALT>3×ULN (assessed at screening).

14. Severe renal impairment (estimated creatinine clearance≤30 mL/min/1.73 m$^2$) assessed at screening.

15. Ongoing or planned dialysis.

16. Hemoglobin<100 g/L assessed at screening.

17. Known or suspected uncontrolled thyroid disease (hypo- or hyperthyroidism).

18. Loss of vision in one or both eyes because of non-arteritic ischemic optic neuropathy.

19. Treatment with strong inducers of cytochrome P450 3A4 (CYP3A4) (e.g., carbamazepine, rifampin, rifampicin, rifabutin, rifapentin, phenobarbital, phenytoin, and St. John's wort)≤28 days prior to Day 1.

20. Treatment with strong inhibitors of CYP3A4 (e.g., ketoconazole, itraconazole, voriconazole, clarithromycin, telithromycin, nefazodone, ritonavir, and saquinavir) and/or strong inhibitors of CYP2C8 (e.g., gemfibrozil)≤28 days prior to Day 1.

21. Treatment with another investigational drug (planned, or taken≤12 weeks prior to Day 1).

22. Hypersensitivity to any of the 3 study treatments or any excipient of their formulations (lactose, magnesium stearate, microcrystalline cellulose, hydroxypropyl cellulose, povidone, corn starch, sodium starch glycolate type A, polyvinyl alcohol, polysorbate 80, titanium dioxide, talc, xanthan gum, lecithin from soya, croscarmellose sodium, hypromellose, sodium laurylsulfate, triacetin, iron oxide yellow, iron oxide red, iron oxide black, d-mannitol, propylene glycol, carnauba wax).

23. Pregnancy, breastfeeding, or intention to become pregnant during the study.

24. Concomitant life-threatening disease with a life expectancy<12 months.

25. Alcohol abuse.

26. Any factor or condition likely to affect protocol

Forbidden concomitant therapy included:

1. Any PAH-specific drug (e.g., ERA, PDE-5i [also if used for erectile dysfunction], soluble guanylate cyclase stimulator, prostacyclin, prostacyclin analog, or prostacyclin receptor agonist) other than the 3 study treatments up to EOT, except if used as rescue therapy.
   If another PAH-specific drug is started (and the corresponding study treatment is stopped), subjects remain in the study, irrespective of whether they are receiving 3, 2, 1, or no study treatments.

2. Organic nitrates (other medications with vasodilatory effects must be used with caution).

3. Doxazosin.

4. Strong inducers of CYP3A4 (e.g., carbamazepine, rifampin, rifampicin, rifabutin, rifapentin, phenobarbital, phenytoin, and St. John's wort) during treatment with macitentan and/or tadalafil.

5. Strong inhibitors of CYP3A4 (e.g., ketoconazole, itraconazole, voriconazole, clarithromycin, telithromycin, nefazodone, ritonavir, and saquinavir) during treatment with macitentan and/or tadalafil.

6. Strong inhibitors of CYP2C8 (e.g., gemfibrozil) during treatment with selexipag/placebo.

7. Any investigational drug other than the 3 study treatments.

8. Cardio-pulmonary rehabilitation programs based on exercise between Screening and the Week 26 visit.

The following safety endpoints will be used:
Treatment-emergent AEs.
AEs leading to premature discontinuation of any of the 3 study treatments.
Treatment-emergent SAEs.
Treatment-emergent deaths.
Treatment-emergent marked laboratory abnormalities.
Change from baseline in laboratory variables.
Change from baseline in vital signs.

The safety endpoints will be analyzed for the following time periods:
From Day 1 until EOMOP.
From Day 1 until start of double-blind treatment (selexipag/placebo).
From start until discontinuation of macitentan study treatment (or until EOMOP, whichever is first)+30 days safety follow up.
From start until discontinuation of tadalafil study treatment (or until EOMOP, whichever is first)+30 days safety follow up.
From start until discontinuation of double-blind treatment (or until EOMOP, whichever is first)+30 days safety follow up.
From EOMOP until EOT plus 30 days safety follow-up.
The 30 days safety follow-up.

Primary Objectives: To compare the effect on PVR at Week 26 of an initial triple oral regimen (macitentan, tadalafil, selexipag) versus an initial dual oral regimen (macitentan, tadalafil, placebo) in newly diagnosed, treatment-naïve subjects with PAH. The primary endpoint was the ratio of week 26 to baseline PVR assessed by right heart catheterization (RHC).

Secondary Objectives: To compare the effect of initial triple therapy versus initial double therapy on cardio-pulmonary hemodynamics other than PVR, exercise capacity, and disease severity (e.g. NYHA FC and NT-proBNP) at week 26, and on disease progression events, safety, and tolerability up to EOMOP, defined below.

The comparator group will receive the following:
Macitentan oral tablet, 10 mg once daily.
Tadalafil oral tablet, 20 mg one or two tablets once daily.
Matching placebo to selexipag oral tablet, 200 μg, one to eight tablets twice daily (in the morning and in the evening).

The 3 study treatments are administered as follows:

Day 1: Start of open-label macitentan 10 mg once daily and open-label tadalafil 20 mg once daily.

Day 8±3: Tadalafil dose increase to 40 mg once daily (in subjects with mild or moderate renal impairment, defined as creatinine clearance>30 and ≤80 mL/min/1.73 m², tadalafil up-titration to 40 mg once daily should be based on individual tolerability.

Day 15±3: Start of double-blind selexipag or placebo, see details below. Double-blind treatment should be started even in subjects who had to previously discontinue one or both of the other study treatments.

The starting dose of double-blind selexipag or placebo on Day 15±3 is 200 µg twice daily (in the morning and in the evening). The dose is up-titrated in increments of 200 µg twice daily, usually at weekly intervals (see Table 1), until either a maximum dose of 1600 µg twice daily is reached or adverse pharmacological effects that cannot be tolerated or medically managed are experienced, whichever is first. In the event of adverse effects typical of prostanoid therapy, it is recommended not to discontinue double-blind treatment because these effects are usually transient or manageable with symptomatic treatment. If a dose that cannot be tolerated is reached, the dose should be reduced to the previous dose level.

TABLE 1

Double-blind up-titration scheme up to the Week 12 visit

| Duration (Study Days, all ± 3) | Dose regimen[1, 2] | |
|---|---|---|
| Day 15 to Day 21 | 200 µg twice daily | (1 tablet twice daily) |
| Day 22 to Day 28 | 400 µg twice daily | (2 tablets twice daily) |
| Day 29 to Day 35 | 600 µg twice daily | (3 tablets twice daily) |
| Day 36 to Day 42 | 800 µg twice daily | (4 tablets twice daily) |
| Day 43 to Day 49 | 1000 g twice daily | (5 tablets twice daily) |
| Day 50 to Day 56 | 1200 µg twice daily | (6 tablets twice daily) |
| Day 57 to Day 63 | 1400 µg twice daily | (7 tablets twice daily) |
| Day 64 to Week 12 visit | 1600 µg twice daily | (8 tablets twice daily) |

[1]Or maximum tolerated dose.
The indicated doses are target doses if previous dose level was tolerated or if tolerability issues were addressed by down-titration.
[2]When titrating up or down, it is recommended to take the first new dose in the evening.

For all 3 study treatments, tablets are to be taken orally, with or without food. Tolerability may be improved when taken with food. The tablets should not be split, crushed or chewed, and are to be swallowed with some water. If a dose has been missed, the subject must take it as soon as possible (unless the next dose is within the next 6 hours), and then take the next dose at the next scheduled time.

Exploratory Efficacy Endpoints

1. Changes in NT-proBNP, 6MWD, and WHO FC from baseline to all regular collection timepoints up to EOMOP.

2. Unsatisfactory clinical response defined as % of subjects meeting at least one of the following three conditions, analyzed at every scheduled visit from Week 26 up to EOMOP:
   a. WHO FC III or IV.
   b. 6MWD≤440 m AND NT-proBNP≥3×ULN.
   c. Clinical worsening event as defined under secondary efficacy endpoint 5, at any time up to the respective visit.

3. Number of treatment goals (score 0=no or 1=yes per goal, i.e., total score 0-5, with 5 representing the best treatment outcome) met at Week 26:
   a. WHO FC I or II.
   b. Cardiac index>3 L/min/m².
   c. mRAP<8 mmHg.
   d. 6MWD>440 m.
   e. NT-proBNP<3×ULN.

4. Number of treatment goals as defined in exploratory efficacy endpoint 3 but using 2.5 L/min/m² as an alternative cutoff for cardiac index.

5. Number of treatment goals as defined in exploratory efficacy endpoint 3 but using<1800 pg/mL as an alternative cutoff for NT-proBNP.

Laboratory Tests

The following are summarized as 'general' laboratory tests: Hematology, clinical chemistry including liver and hemoglobin tests, coagulation tests, and NT-proBNP.

Hematology: Hemoglobin, Hematocrit, Erythrocyte count (reticulocyte count), Leukocyte count with differential counts, and Platelet count Clinical chemistry: The Cockcroft-Gault formula is used for estimation of the creatinine clearance: Estimated creatine clearance rate=(140−age)×(weight in kg)×(1.23 for men and 1.04 for women), divided by serum creatinine in µmol/L.

Aminotransferases (AST/ALT), alkaline phosphatase, total and direct bilirubin, lactate dehydrogenase Creatinine, urea Uric acid (serum urate)

Glucose

Sodium, potassium, chloride, calcium

Protein, albumin

Coagulation tests: International Normalized Ratio, Prothrombin time, and Activated partial thromboplastin time Biomarkers of myocardial stress and of right ventricular function and structure: NT-proBNP and circulating biomarkers involved in right ventricular function and structure.

Schedule of Visits

Monthly (±1 week) central laboratory testing of liver aminotransferases, total and direct bilirubin, and hemoglobin is mandatory throughout the study. For monthly testing, blood drawing is performed either at the study site, at a satellite laboratory close to where the subject lives, or by a phlebotomy service at the subject's home.

The screening period includes recording check of eligibility (inclusion and exclusion criteria), demographics, medical history, RHC, physical examination, vital signs (BP, HR), WHO FC, 6MWD, Borg dyspnea index, central laboratory tests (general, serum pregnancy test, and biomarkers); eligibility of subjects at Screening may alternatively be determined using local laboratory tests as long as the central laboratory kit is used in parallel, contraceptive methods used, previous therapies, and AEs, SAEs.

The Day 1 (randomization) visit includes recording vital signs (BP, HR), WHO FC, 6MWD, Borg dyspnea index, central laboratory tests (general), urine pregnancy test, contraceptive methods used, concomitant therapies, and AEs, SAEs. At the end of this visit, subjects are randomized to one of the two treatment groups. Macitentan and tadalafil study treatments are dispensed to the subjects. Treatment is initiated.

Day 8 (±3 days) visit includes recording AEs and SAEs. At the end of this visit, the dose of tadalafil is increased.

Day 15 (±3 days) visit includes recording physical examination, vital signs (BP, HR), contraceptive methods used, concomitant therapies, and AEs, SAEs. At the end of this visit, double-blind selexipag/placebo is dispensed to the subjects. The subjects initiate treatment and up-titration (on top of ongoing study treatment with macitentan and tadalafil)

Week 12 (±1 week) visit includes recording physical examination, vital signs (BP, HR), WHO FC, 6MWD, Borg dyspnea index, central laboratory tests (general, serum pregnancy test), contraceptive methods used, concomitant therapies, and AEs, SAEs.

Week 26 (±1 week) visit includes recording RHC, physical examination, vital signs (BP, HR), WHO FC, 6MWD, Borg dyspnea index, central laboratory tests (general, serum pregnancy test, and biomarkers), contraceptive methods used, concomitant therapies, and AEs, SAEs.

Month 12, 18, 24, 30, etc. (±2 weeks) visits include recording physical examination, vital signs (BP, HR), WHO FC, 6MWD, Borg dyspnea index, central laboratory tests (general, serum pregnancy test), contraceptive methods used, concomitant therapies, and AEs, SAEs.

The EOMOP visit includes recording physical examination, vital signs (BP, HR), WHO FC, 6MWD, Borg dyspnea index, central laboratory tests (general, serum pregnancy test), contraceptive methods used, concomitant therapies, and AEs, SAEs.

The EOT visit includes recording physical examination, vital signs (BP, HR), WHO FC, 6MWD, Borg dyspnea index, central laboratory tests (general, serum pregnancy test), contraceptive methods used, concomitant therapies, and AEs, SAEs.

All subjects undergo a 30 days safety follow-up prior to EOS.

The EOS visit is performed at the end of the safety follow-up, i.e., 30-35 days after EOT. The EOS visit includes recording pregnancy test (serum or urine), contraceptive methods used, and AEs, SAEs.

Subject and Treatment Information

A total of 291 subjects were screened across 67 sites in 16 countries. Of those, 247 subjects were randomized in a 1:1 ratio, 123 to triple therapy (selexipag double-blind and open-label macitentan and tadalafil) and 124 to double therapy (placebo double-blind and open-label macitentan and tadalafil). The majority of the subjects were white (85.0%) and 75.7% were female. See, Table 5. The mean age was 51.9 years, ranging from 21 to 75 years.

TABLE 5

Demographic characteristics Analysis Set: Full Analysis Set

|  | Triple th. N = 123 | Double th. N = 124 | Total N = 247 |
| --- | --- | --- | --- |
| Sex |  |  |  |
| Male | 30 (24.4) | 30 (24.2) | 60 (24.3) |
| Female | 93 (75.6) | 94 (75.8) | 187 (75.7) |
| Age (years) |  |  |  |
| n | 123 | 124 | 247 |
| Mean | 52.2 | 51.6 | 51.9 |
| Standard Deviation | 13.48 | 13.92 | 13.67 |
| Standard Error of the Mean | 1.22 | 1.25 | 0.87 |
| Median | 54.0 | 51.0 | 53.0 |
| Q1, Q3 | 41.0, 63.0 | 40.5, 63.0 | 41.0, 63.0 |
| Min, Max | 21, 75 | 21, 75 | 21, 75 |
| Age [n (%)] |  |  |  |
| <18 | 0 | 0 | 0 |
| 18-64 | 96 (78.0) | 98 (79.0) | 194 (78.5) |
| ≥65 | 27 (22.0) | 26 (21.0) | 53 (21.5) |

TABLE 5-continued

Demographic characteristics Analysis Set: Full Analysis Set

|  | Triple th. N = 123 | Double th. N = 124 | Total N = 247 |
| --- | --- | --- | --- |
| BMI (kg/m$^2$) |  |  |  |
| n | 123 | 124 | 247 |
| Mean | 28.24 | 27.24 | 27.74 |
| Standard Deviation | 5.165 | 5.559 | 5.379 |
| Standard Error of the Mean | 0.466 | 0.499 | 0.342 |
| Median | 28.18 | 27.29 | 27.51 |
| Q1, Q3 | 24.82, 31.18 | 23.13, 30.22 | 23.99, 30.63 |
| Min, Max | 17.7, 39.9 | 16.3, 39.9 | 16.3, 39.9 |
| Race [n (%)] |  |  |  |
| Black or African American | 5 (4.1) | 5 (4.0) | 10 (4.0) |
| American Indian or Alaska Native | 1 (0.8) | 0 | 1 (0.4) |
| Native Hawaiian or other Pacific Islander | 0 | 0 | 0 |
| Asian | 7 (5.7) | 3 (2.4) | 10 (4.0) |
| White | 102 (82.9) | 108 (87.1) | 210 (85.0) |
| Other | 3 (2.4) | 3 (2.4) | 6 (2.4) |
| Not applicable | 0 | 0 | 0 |
| Missing | 5 (4.1) | 5 (4.0) | 10 (4.0) |

Recalculated; Output: t-dem-fas (summary of demographics; Analysis Set: Full Analysis Set) (modified from original)

Subjects were predominantly in WHO FC III/IV (79.8%) at randomization. See, Table 6. The treatment arms were generally balanced in terms of demographics and baseline disease characteristics.

TABLE 6

Baseline disease characteristics including values from right-heart catheterization Analysis Set: Full Analysis Set

|  | Triple th. N = 123 | Double th. N = 124 | Total N = 247 |
| --- | --- | --- | --- |
| Etiology of PAH [n (%)] |  |  |  |
| Idiopathic PAH | 53 (43.1) | 62 (50.0) | 115 (46.6) |
| Heritable PAH | 9 (7.3) | 7 (5.6) | 16 (6.5) |
| Drug or toxin induced PAH | 14 (11.4) | 6 (4.8) | 20 (8.1) |
| PAH associated with | 47 (38.2) | 49 (39.5) | 96 (38.9) |
| Connective tissue disease | 43 (35.0) | 42 (33.9) | 85 (34.4) |
| HIV infection | 3 (2.4) | 5 (4.0) | 8 (3.2) |
| Congenital heart disease | 1 (0.8) | 2 (1.6) | 3 (1.2) |
| WHO FC (as per IXRS) [n (%)] |  |  |  |
| Class I-II | 25 (20.3) | 25 (20.2) | 50 (20.2) |
| Class III-IV | 98 (79.7) | 99 (79.8) | 197 (79.8) |
| Time since initial diagnosis of PAH (days) |  |  |  |
| n | 123 | 124 | 247 |
| Mean | 23.9 | 19.8 | 21.9 |
| Standard Deviation | 32.54 | 26.71 | 29.77 |
| Standard Error of the Mean | 2.93 | 2.40 | 1.89 |
| Median | 14.0 | 12.5 | 13.0 |
| Q1, Q3 | 6.0, 27.0 | 6.0, 25.0 | 6.0, 26.0 |
| Min, Max | 1, 190 | 1, 204 | 1, 204 |
| Six-minute walk distance (m) |  |  |  |
| n | 123 | 121 | 244 |
| Mean | 345.32 | 347.24 | 346.27 |
| Standard Deviation | 121.000 | 116.878 | 118.733 |

TABLE 6-continued

Baseline disease characteristics including values from right-heart catheterization Analysis Set: Full Analysis Set

| | Triple th. N = 123 | Double th. N = 124 | Total N = 247 |
|---|---|---|---|
| Standard Error of the Mean | 10.910 | 10.625 | 7.601 |
| Median | 354.00 | 366.00 | 360.00 |
| Q1, Q3 | 267.00, 415.00 | 255.00, 432.00 | 258.50, 425.00 |
| Min, Max | 51.0, 735.0 | 67.0, 573.0 | 51.0, 735.0 |
| Pulmonary vascular resistance (derived), as used in analysis (dyn*sec/cm$^5$) | | | |
| n | 123 | 124 | 247 |
| Mean | 940.3 | 980.2 | 960.3 |
| Standard Deviation | 401.33 | 348.42 | 375.46 |
| Standard Error of the Mean | 36.19 | 31.29 | 23.89 |
| Median | 880.0 | 932.7 | 897.6 |
| Q1, Q3 | 673.7, 1131.0 | 712.6, 1220.5 | 685.7, 1186.2 |
| Min, Max | 326, 3000 | 376, 2240 | 326, 3000 |
| Mean pulmonary arterial pressure (mmHg) | | | |
| n | 123 | 124 | 247 |
| Mean | 51.8 | 52.4 | 52.1 |
| Standard Deviation | 9.81 | 11.38 | 10.61 |
| Standard Error of the Mean | 0.88 | 1.02 | 0.68 |
| Median | 52.0 | 52.0 | 52.0 |
| Q1, Q3 | 45.0, 60.0 | 44.0, 59.0 | 44.0, 59.0 |
| Min, Max | 32, 76 | 26, 101 | 26, 101 |
| Cardiac index (L/min/m$^2$) | | | |
| n | 123 | 124 | 247 |
| Mean | 2.21 | 2.11 | 2.16 |
| Standard Deviation | 0.659 | 0.559 | 0.611 |
| Standard Error of the Mean | 0.059 | 0.050 | 0.039 |
| Median | 2.15 | 2.01 | 2.09 |
| Q1, Q3 | 1.73, 2.56 | 1.69, 2.45 | 1.70, 2.48 |
| Min, Max | 0.9, 5.3 | 1.1, 3.7 | 0.9, 5.3 |

Output: t-bas-fas (summary of disease baseline characteristics; Analysis Set: Full Analysis Set) (modified from original), t-bas-o-fas (summary of other baseline characteristics; Analysis Set: Full Analysis Set) (modified from original), t-bas-rhc-fas (summary of baseline values of efficacy endpoints from right-heart catheterization; Analysis Set: Full Analysis Set) (modified from original)

Of the 247 randomized subjects (FAS), 1 subject in double therapy did not receive any study medication and is therefore not included in the safety analysis set. Four subjects randomized to triple therapy and included in the safety set did not receive selexipag treatment and are therefore included in the double therapy group for the safety analyses (N=119 for the triple therapy group, and N=127 for the double therapy group).

Premature Discontinuation

Overall, 24% of subjects prematurely discontinued double-blind treatment before EOMOP (i.e. selexipag/placebo). See, Tables 3 and 4. The most frequent reason for double-blind treatment withdrawal was physician decision due to an adverse event (15 [12.6%] subjects in triple therapy and 12 [9.4%] subjects in double therapy), lack of efficacy/treatment failure (3 [2.5%] subjects in triple therapy and 10 [7.9%] subjects in double therapy) and death (0 subject in triple therapy and 7 [5.5%] subjects in double therapy).

TABLE 3

Reasons for premature study discontinuation up to EOMOP Analysis Set: Full Analysis Set

| | Triple th. N = 123 n (%) | Double th. N = 124 n (%) | Total N = 247 n (%) |
|---|---|---|---|
| Subjects Who Completed the EOMOP Visit | 109 (88.6) | 104 (83.9) | 213 (86.2) |
| Subjects Who Prematurely Withdrew from the Study | 14 (11.4) | 20 (16.1) | 34 (13.8) |
| Reasons for Premature Withdrawal from the Study | | | |
| Death | 2 (1.6) | 9 (7.3) | 11 (4.5) |
| Lost to follow-up | 2 (1.6) | 2 (1.6) | 4 (1.6) |
| Subject decision | 4 (3.3) | 3 (2.4) | 7 (2.8) |
| Physician decision | 6 (4.9) | 5 (4.0) | 11 (4.5) |
| Sponsor decision | 0 | 1 (0.8) | 1 (0.4) |

Output: t-pwds-fas (reasons for premature discontinuation of study up to EOMOP; Analysis Set: Full Analysis Set)

TABLE 4

Reasons for premature treatment discontinuation up to EOMOP Analysis Set: Safety Set

| | Triple th. N = 119 n (%) | Double th. N = 127 n (%) | Total N = 246 n (%) |
|---|---|---|---|
| Macitentan | | | |
| Subjects Who Prematurely Discontinued Study Treatment | 23 (19.3) | 31 (24.4) | 54 (22.0) |
| Reasons for Premature Discontinuation of Study Treatment | | | |
| Death | 1 (0.8) | 6 (4.7) | 7 (2.8) |
| Lost to follow-up | 0 | 3 (2.4) | 3 (1.2) |
| Pre-specified study treatment discontinuation criteria | 7 (5.9) | 2 (1.6) | 9 (3.7) |
| Subject decision | 3 (2.5) | 2 (1.6) | 5 (2.0) |
| Tolerability related | 1 (0.8) | 0 | 1 (0.4) |
| Other | 2 (1.7) | 2 (1.6) | 4 (1.6) |
| Physician decision | 12 (10.1) | 17 (13.4) | 29 (11.8) |
| Adverse event | 10 (8.4) | 13 (10.2) | 23 (9.3) |
| Lack of efficacy/treatment failure | 0 | 1 (0.8) | 1 (0.4) |
| Other | 2 (1.7) | 3 (2.4) | 5 (2.0) |
| Sponsor decision | 0 | 1 (0.8) | 1 (0.4) |
| Tadalafil | | | |
| Subjects Who Prematurely Discontinued Study Treatment | 16 (13.4) | 25 (19.7) | 41 (16.7) |
| Reasons for Premature Discontinuation of Study Treatment | | | |
| Death | 0 | 7 (5.5) | 7 (2.8) |
| Lost to follow-up | 0 | 3 (2.4) | 3 (1.2) |
| Pre-specified study treatment discontinuation criteria | 2 (1.7) | 0 | 2 (0.8) |
| Subject decision | 3 (2.5) | 2 (1.6) | 5 (2.0) |
| Other | 3 (2.5) | 2 (1.6) | 5 (2.0) |
| Physician decision | 11 (9.2) | 12 (9.4) | 23 (9.3) |
| Adverse event | 8 (6.7) | 8 (6.3) | 16 (6.5) |

TABLE 4-continued

Reasons for premature treatment discontinuation
up to EOMOP Analysis Set: Safety Set

|  | Triple th. N = 119 n (%) | Double th. N = 127 n (%) | Total N = 246 n (%) |
|---|---|---|---|
| Lack of efficacy/ treatment failure | 1 (0.8) | 1 (0.8) | 2 (0.8) |
| Other | 2 (1.7) | 3 (2.4) | 5 (2.0) |
| Sponsor decision | 0 | 1 (0.8) | 1 (0.4) |
| Selexipag/Placebo | | | |
| Subjects Who Prematurely Discontinued Study Treatment | 24 (20.2) | 35 (27.6) | 59 (24.0) |
| Reasons for Premature Discontinuation of Study Treatment | | | |
| Death | 0 | 7 (5.5) | 7 (2.8) |
| Lost to follow-up | 0 | 1 (0.8) | 1 (0.4) |
| Pre-specified study treatment discontinuation criteria | 0 | 0 | 0 |
| Subject decision | 3 (2.5) | 1 (0.8) | 4 (1.6) |
| Efficacy related | 0 | 1 (0.8) | 1 (0.4) |
| Other | 3 (2.5) | 0 | 3 (1.2) |
| Physician decision | 21 (17.6) | 26 (20.5) | 47 (19.1) |
| Adverse event | 15 (12.6) | 12 (9.4) | 27 (11.0) |
| Lack of efficacy/ treatment failure | 3 (2.5) | 10 (7.9) | 13 (5.3) |
| Other | 3 (2.5) | 4 (3.1) | 7 (2.8) |
| Sponsor decision | 0 | 0 | 0 |

Output: t-pwdt-s (reasons for premature discontinuation of study treatment up to EOMOP; Analysis Set: Safety Analysis Set)

Exposure Up to EOMOP

Table 2 provides a summary of the patient disposition up to EOMOP.

TABLE 2

Subject disposition up to EOMOP Analysis
Set: Screened Analysis Set

|  | Triple th. n | Double th. n | Total n |
|---|---|---|---|
| Subjects Screened |  |  | 291 |
| Subjects Randomized | 123 | 124 | 247 |
| Macitentan | | | |
| Subjects Treated | 123 | 123 | 246 |
| Subjects Completed Treatment up to EOMOP | 96 | 96 | 192 |
| Tadalafil | | | |
| Subjects Treated | 123 | 123 | 246 |
| Subjects Completed Treatment up to EOMOP | 103 | 102 | 205 |
| Selexipag/Placebo | | | |
| Subjects Treated | 119 | 120 | 239 |
| Subjects Completed Treatment up to EOMOP | 95 | 85 | 180 |

Output: t-disp-scr (subject disposition; Analysis Set: Screened Analysis Set) (modified from original)

The median duration of exposure to the double-blind treatment up to EOMOP was 477 days in triple therapy and 399 days in double therapy. See, Table 7.

TABLE 7

Exposure to double-blind study treatment (selexipag/placebo)
up to EOMOP Analysis Set: Safety Set

|  | Selexipag (N = 119) | Placebo (N = 127) |
|---|---|---|
| Duration of selexipag/placebo Study Treatment (days) | | |
| n | 119 | 120 |
| Mean | 498.5 | 455.9 |
| Standard Deviation | 289.66 | 266.98 |
| Standard Error of the Mean | 26.55 | 24.37 |
| Median | 477.0 | 399.0 |
| Q1, Q3 | 230.0, 720.0 | 249.0, 650.0 |
| Min, Max | 15, 1110 | 3, 1023 |

Exposure up to selexipag/placebo EOT or EOMOP, whichever the earliest is. Output: t-exp-s-s (exposure to double-blind study treatment (selexipag/placebo) up to EOMOP; Analysis Set: Safety Analysis Set) (modified from original)

The median individual maintenance dose of selexipag was 1200 μg b.i.d. in triple therapy. See, Table 8.

TABLE 8

Individual maintenance double-blind study treatment (selexipag/placebo)
dose up to EOMOP Analysis Set: Safety Set

|  | Selexipag (N = 119) | Placebo (N = 127) |
|---|---|---|
| Individual Total Daily Maintenance Dose of Double-Blind Treatment (b.i.d) (μg) | | |
| n | 119 | 120 |
| Mean | 1043.7 | 1356.7 |
| Standard Deviation | 496.20 | 419.03 |
| Standard Error of the Mean | 45.49 | 38.25 |
| Median | 1200.0 | 1600.0 |
| Q1, Q3 | 600.0, 1600.0 | 1200.0, 1600.0 |
| Min, Max | 0, 1600 | 0, 1600 |
| 0 μg | 2 (1.7) | 3 (2.4) |
| 200 μg | 9 (7.6) | 3 (2.4) |
| 400 μg | 13 (10.9) | 2 (1.6) |
| 600 μg | 7 (5.9) | 2 (1.6) |
| 800 μg | 16 (13.4) | 6 (4.7) |
| 1000 μg | 12 (10.1) | 12 (9.4) |
| 1200 μg | 16 (13.4) | 8 (6.3) |
| 1400 μg | 7 (5.9) | 3 (2.4) |
| 1600 μg | 37 (31.1) | 81 (63.8) |
| Missing | 0 | 7 (5.5) |
| Maximum Tolerated Total Daily Dose of Double-Blind Treatment (b.i.d) (μg) | | |
| n | 119 | 120 |
| Mean | 1040.3 | 1338.3 |
| Standard Deviation | 515.90 | 456.36 |
| Standard Error of the Mean | 47.29 | 41.66 |
| Median | 1000.0 | 1600.0 |
| Q1, Q3 | 800.0, 1600.0 | 1200.0, 1600.0 |
| Min, Max | 0, 1600 | 0, 1600 |
| 0 μg | 8 (6.7) | 7 (5.5) |
| 200 μg | 6 (5.0) | 1 (0.8) |
| 400 μg | 8 (6.7) | 2 (1.6) |
| 600 μg | 7 (5.9) | 1 (0.8) |
| 800 μg | 15 (12.6) | 7 (5.5) |
| 1000 μg | 16 (13.4) | 9 (7.1) |
| 1200 μg | 14 (11.8) | 8 (6.3) |
| 1400 μg | 8 (6.7) | 6 (4.7) |
| 1600 μg | 37 (31.1) | 79 (62.2) |
| Missing | 0 | 7 (5.5) |

Individual maintenance dose and maximum tolerated dose are computed when patient has completed titration or discontinued treatment.
Exposure up to selexipag/placebo EOT or EOMOP, whichever the earliest is.
Output: t-dos-tm-s (individual maintenance dose and maximum tolerated dose of double-blind study treatment up to EOMOP; Analysis Set: Safety Analysis Set)

Primary Efficacy Endpoint:

The primary endpoint was not met: triple therapy reduced PVR at Week 26 similarly as double therapy. The ANCOVA-adjusted geometric mean of the ratio of baseline to Week 26 was 0.46 for triple therapy (54% PVR reduction) and 0.48 for double therapy (52% PVR reduction), representing a geometric means ratio (triple over double) of 0.96 (95% CL: 0.86, 1.07, p=0.4239). See, Table 9. Missing Week 26 assessments were imputed using LOCF for 11 (8.9%) subjects in the triple therapy group and 7 (5.6%) subjects in the double therapy group. The median [Q1, Q3] baseline PVR was 880.0 [673.7, 1131.0] in the initial triple therapy group and 932.7 [712.6, 1220.5] in the initial double therapy group. At week 26 the median [Q1, Q3] PVR was 378.2 [272.7, 581.8] for the initial triple therapy group, and 443.7 [306.9, 585.5] for initial double therapy. When interpreting these data, it is important to consider that a PVR>240 dyn·sec/cm$^5$ is indicative of pulmonary hypertension.

TABLE 9

PVR ratio of Week 26 to baseline (Primary analysis) Analysis Set: Full Analysis Set

|  | Triple th. N = 123 | Double th. N = 124 |
|---|---|---|
| Number of subjects included in the analysis | 123 | 124 |
| Baseline | | |
| Mean | 940.3 | 980.2 |
| Standard Deviation | 401.33 | 348.42 |
| Standard Error of the Mean | 36.19 | 31.29 |
| Median | 880.0 | 932.7 |
| Q1, Q3 | 673.7, 1131.0 | 712.6, 1220.5 |
| Min, Max | 325.9, 3000.0 | 376.5, 2240.0 |
| Week 26 | | |
| Mean | 475.5 | 484.6 |
| Standard Deviation | 352.53 | 228.12 |
| Standard Error of the Mean | 31.79 | 20.49 |
| Median | 378.2 | 443.7 |
| Q1, Q3 | 272.7, 581.8 | 306.9, 585.5 |
| Min, Max | 100.0, 3000.0 | 114.3, 1236.4 |

TABLE 9-continued

PVR ratio of Week 26 to baseline (Primary analysis) Analysis Set: Full Analysis Set

|  | Triple th. N = 123 | Double th. N = 124 |
|---|---|---|
| Total number of subjects with imputation of missing values [n (%)] | 11 (8.9) | 7 (5.6) |
| by last observation carried forward | 11 (8.9) | 7 (5.6) |
| Change from Baseline to Week 26 | | |
| Mean | −464.8 | −495.6 |
| Standard Deviation | 309.40 | 349.27 |
| Standard Error of the Mean | 27.90 | 31.37 |
| Median | −421.2 | −454.4 |
| Q1, Q3 | −618.2, −270.5 | −696.6, −287.1 |
| Min, Max | −1718.2, 137.1 | −1696.0, 358.1 |
| Ratio of Week 26 to Baseline | | |
| Geometric Mean | 0.46 | 0.47 |
| Geometric CV [%] | 46.8 | 46.1 |
| 95% CI of Geometric Mean | 0.422, 0.494 | 0.437, 0.511 |
| Ratio of Week 26 to Baseline (Model-Adjusted) | | |
| Geometric LS Mean | 0.46 | 0.48 |
| 95% CI of Geometric LS Mean | 0.422, 0.503 | 0.441, 0.526 |
| Treatment effect: Ratio of Selexipag over Placebo (Model-Adjusted) | | |
| Geometric LS Means ratio | 0.96 | |
| 95% CI of the Geometric LS Means ratio | 0.856, 1.068 | |
| p-Value | 0.4239 | |

Ratio of Week 26 to baseline PVR is log-transformed (base e) and analyzed using an ANCOVA with factors for treatment group, region (as stratified), baseline WHO functional class (as stratified) and a continuous covariate for baseline log PVR; A selexipag/placebo ratio < 1 favors the selexipag treatment group.
Output: t-main-fas (analysis of covariance: PVR ratio of Week 26 to baseline; Analysis Set: Full Analysis Set)

Figure 3:
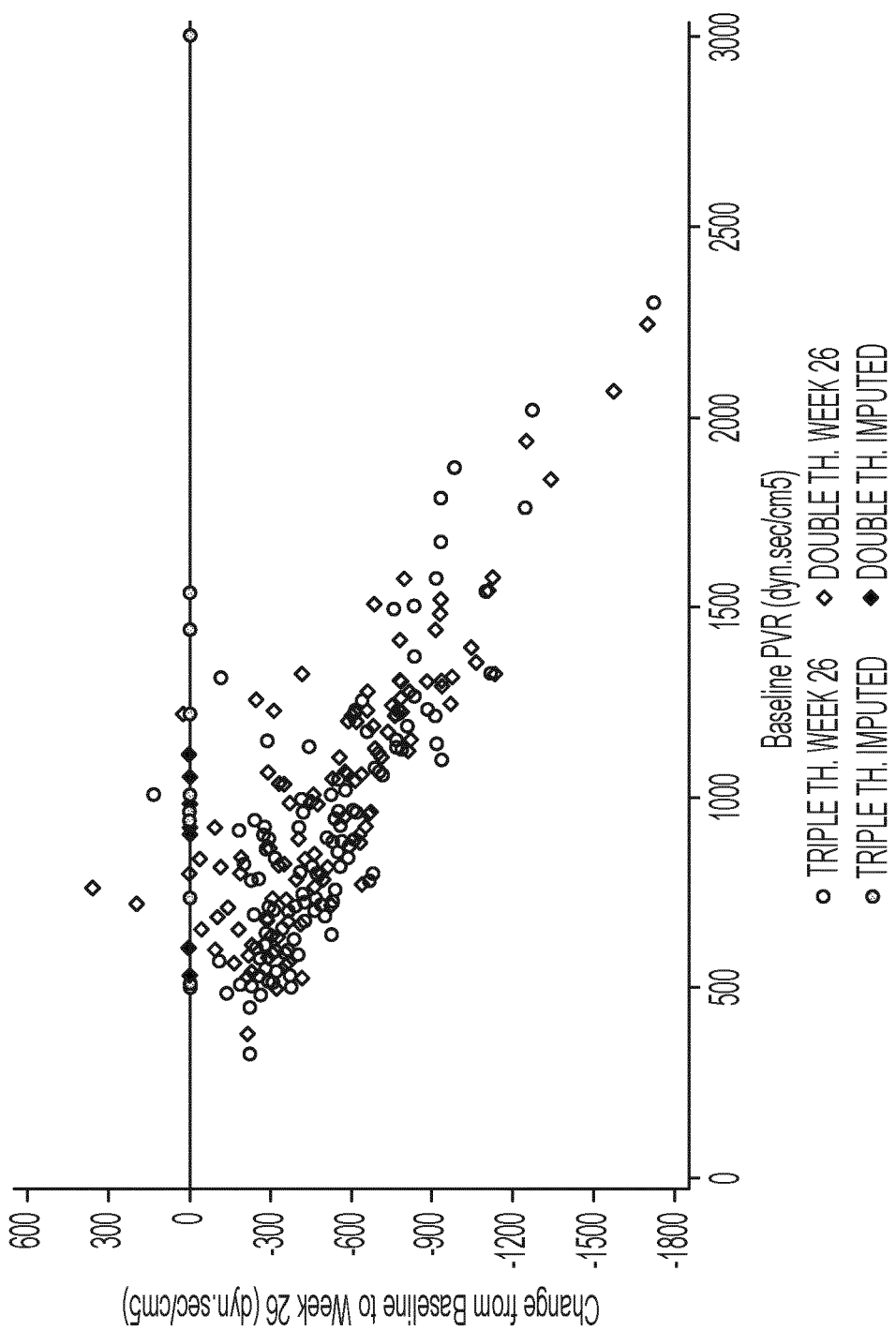
FIG. 3 is a scatter plot of the change from baseline to Week 26 in PVR (versus baseline) Analysis Set: Full Analysis Set.
Figure 4:
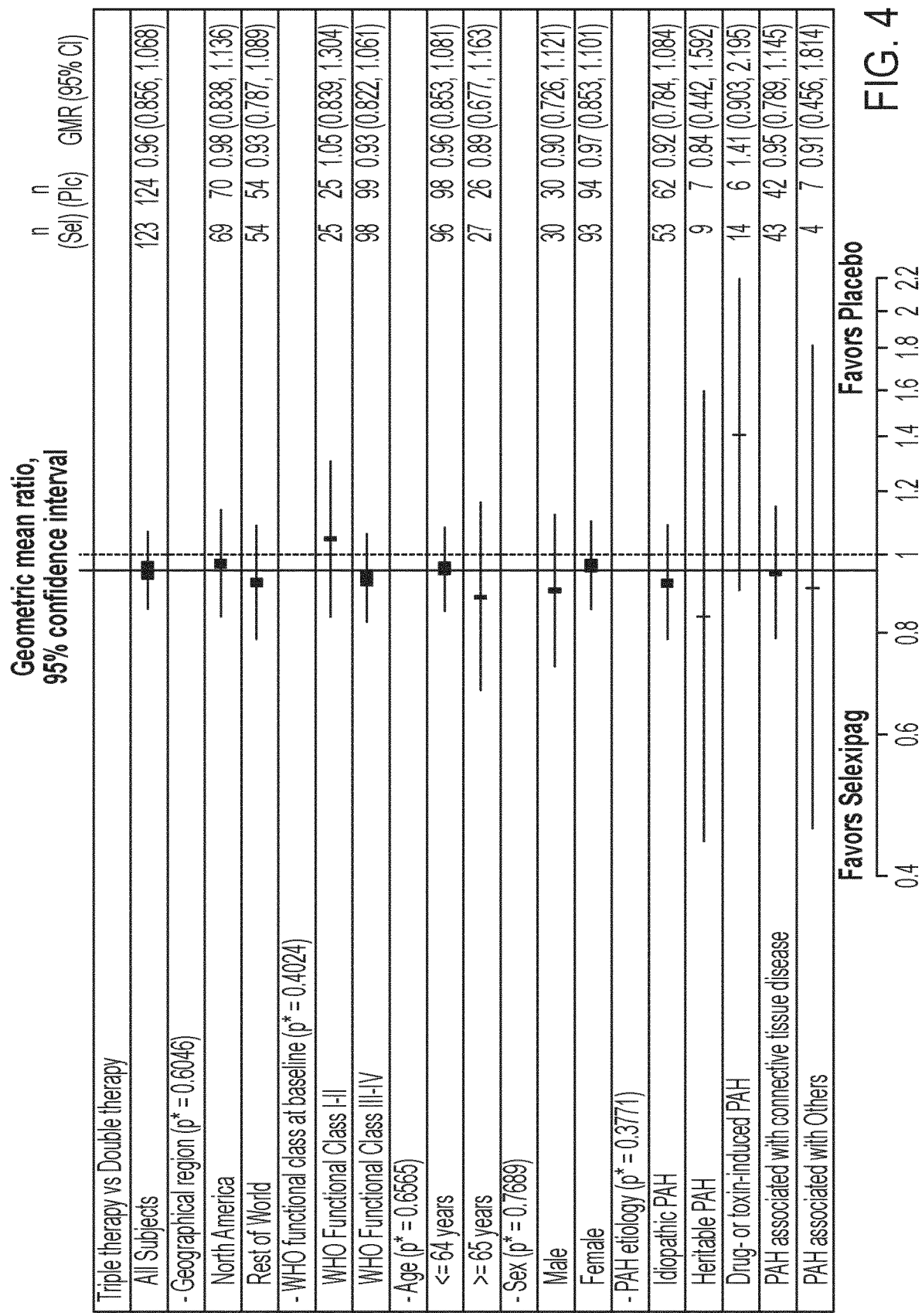
FIG. 4 is a Forest plot of ANCOVA: PVR ratio of Week 26 to baseline by subgroups Analysis Set: Full Analysis Set. In this figure, the vertical solid line references the overall treatment effect. Marker size for subgroups is based on number of subjects per group. P-values reflect treatment-by-subgroup interaction testing on extended main model, including stratification factors and baseline as covariate, with subgroup variable effect and its interaction with treatment added. *=interaction p-value; Sel=Selexipag; Plc=placebo.

The ANCOVA-adjusted change from baseline to Week 26 (sensitivity analysis) was −472.1 dyn·sec/cm$^5$ for triple therapy and −480.0 dyn·sec/cm$^5$ for double therapy, representing a treatment difference (triple minus double) of 8 dyn·sec/cm$^5$ (95% CL: −55.1, 71.0, p=0.8041). See, Table 10 and FIGS. 3 and 4.

TABLE 10

Summary of sensitivity analyses for the primary Endpoint Analysis Set: Full Analysis Set

|  | GM ratio and 95% CLs, p-value |
|---|---|
| Main analysis: FAS with LOCF imputation (N = 247) | 0.96 (0.86, 1.07), p = 0.4239 |
| Sensitivity analyses | |
| FAS observed cases (N = 229) | 0.92 (0.83, 1.02), p = 0.1026 |
| FAS imputed (LOCF) without stratification variables in model (N = 247) | 0.96 (0.86, 1.07), p = 0.4196 |
| FAS imputing deaths with largest worsening in same group (N = 247) | 0.92 (0.83, 1.02), p = 0.1008 |
| FAS imputing prostanoids rescue therapy initiation with LOCF (N = 247) | 0.95 (0.85, 1.06), p = 0.3708 |
| FAS multiple imputation (N = 247) | 0.93 (0.84, 1.02), p = 0.1217 |
| FAS imputed (LOCF): absolute change from baseline (N = 247) | 8 (−55.1, 71.0), p = 0.8041 |

GM ratios are ANCOVA-adjusted.

All sensitivity/supportive analyses are in line with the primary analysis. The treatment effect was consistent across subgroups (no significant treatment-by-subgroup interaction).

Figure 5:
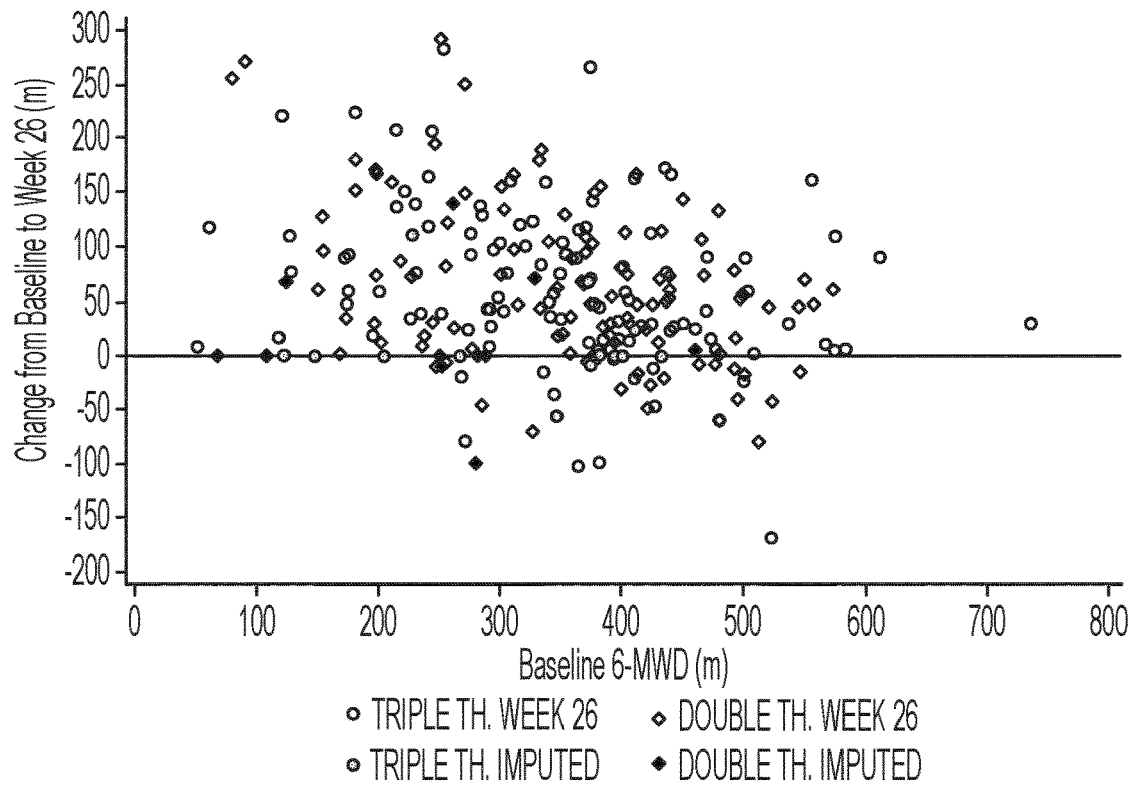
FIG. 5 is a scatter plot of change from baseline to Week 26 in 6MWD (versus baseline).

Key Secondary Efficacy Endpoints:

Change from baseline to Week 26 in 6MWD was similar in both groups (ANCOVA-adjusted mean=+55.0 m for triple therapy vs +56.4 m for double therapy, mean difference (triple minus double): −1.4 m [95% CL: −19.4, 16.5], p=0.8758). See, Table 11 and FIG. 5. The median [Q1, Q3] baseline 6MWD in meters was 354 [267, 415] in the initial triple group and 366 [255, 432] in the initial double therapy group. At week 26, the median values were 405 [334, 470] in the initial triple therapy group and 421 [338, 482] in the initial double therapy. 6MWD is used in multiparameter risk assessment of patients with PAH, and the week 26 values should be interpreted with respect to the established "low-risk" threshold of 440 m.

TABLE 11

Change from baseline to Week 26 in 6MWD
Analysis Set: Full Analysis Set

|  | Triple th. N = 123 | Double th. N = 124 |
|---|---|---|
| Number of subjects included in the analysis | 123 | 121 |
| Baseline | | |
| Mean | 345.3 | 347.2 |
| Standard Deviation | 121.00 | 116.88 |
| Standard Error of the Mean | 10.91 | 10.63 |
| Median | 354.0 | 366.0 |
| Q1, Q3 | 267.0, 415.0 | 255.0, 432.0 |
| Min, Max | 51.0, 735.0 | 67.0, 573.0 |
| Week 26 | | |
| Mean | 403.9 | 407.2 |
| Standard Deviation | 124.50 | 116.81 |
| Standard Error of the Mean | 11.23 | 10.62 |
| Median | 405.0 | 421.0 |
| Q1, Q3 | 334.0, 470.0 | 338.0, 482.0 |
| Min, Max | 60.0, 765.0 | 67.0, 634.0 |
| Total number of subjects with imputation of missing values [n (%)] | 13 (10.6) | 11 (9.1) |
| by last observation carried forward | 13 (10.6) | 11 (9.1) |
| Change from Baseline to Week 26 | | |
| Mean | 58.6 | 59.9 |
| Standard Deviation | 73.38 | 74.65 |
| Standard Error of the Mean | 6.62 | 6.79 |
| Median | 45.1 | 48.0 |
| Q1, Q3 | 9.0, 105.0 | 2.0, 104.0 |
| Min, Max | −168.0, 284.0 | −99.0, 292.0 |
| Change from Baseline to Week 26 (Model-Adjusted) | | |
| LS Mean | 54.96 | 56.39 |
| Standard Error | 7.382 | 7.584 |
| 95% CI of LS Mean | 40.419, 69.501 | 41.447, 71.327 |
| Treatment effect: Difference Selexipag minus Placebo (Model-Adjusted) | | |
| LS Mean difference | −1.43 | |
| Standard Error | 9.120 | |
| 95% CI of the LS Mean difference | −19.393, 16.538 | |
| p-Value | 0.8758 | |

Change from baseline to Week 26 in 6MWD is analyzed using an ANCOVA model with factors for treatment group, region (as stratified), baseline WHO functional class (as stratified) and baseline 6MWD as a covariate.
Output: t-mwd-main-fas.
(analysis of covariance: Change from baseline to Week 26 in six minute walk distance; Analysis Set: Full Analysis Set)

Change from baseline to Week 26 in NT-pro BNP was similar in both groups (ANCOVA-adjusted geometric mean of the ratio of baseline to Week 26=0.26 for triple therapy (74% reduction) vs 0.25 (75% reduction) for double therapy, geometric means ratio (triple over double): 1.03 [95% CL: 0.77, 1.37], p=0.8529). See, Table 12.

TABLE 12

Change from baseline to Week 26 in NT-pro
BNP (ng/L) Analysis Set: Full Analysis Set

|  | Triple th. N = 123 | Double th. N = 124 |
|---|---|---|
| Number of subjects included in the analysis | 121 | 122 |
| Baseline | | |
| Mean | 2073.1 | 1931.9 |
| Standard Deviation | 2387.02 | 2103.92 |
| Standard Error of the Mean | 217.00 | 190.48 |
| Median | 1377.0 | 1237.0 |
| Q1, Q3 | 453.0, 2783.0 | 434.0, 2699.0 |
| Min, Max | 66.0, 17441.0 | 19.0, 11201.0 |
| Week 26 | | |
| Mean | 674.5 | 696.7 |
| Standard Deviation | 1277.32 | 1351.41 |
| Standard Error of the Mean | 116.12 | 122.35 |
| Median | 220.0 | 243.5 |
| Q1, Q3 | 120.0, 550.0 | 90.0, 762.0 |
| Min, Max | 11.0, 8070.0 | 5.0, 9098.0 |
| Total number of subjects with imputation of missing values [n (%)] | 12 (9.9) | 12 (9.8) |
| by last observation carried forward | 12 (9.9) | 12 (9.8) |

TABLE 12-continued

Change from baseline to Week 26 in NT-pro
BNP (ng/L) Analysis Set: Full Analysis Set

|  | Triple th.<br>N = 123 | Double th.<br>N = 124 |
|---|---|---|
| Change from Baseline to Week 26 | | |
| Mean | −1398.6 | −1235.2 |
| Standard Deviation | 1978.38 | 1724.41 |
| Standard Error of the Mean | 179.85 | 156.12 |
| Median | −980.0 | −700.0 |
| Q1, Q3 | −1959.0, −191.0 | −1931.0, −87.0 |
| Min, Max | −12772.0, 4593.0 | −11145.0, 2274.0 |
| Ratio of Week 26 to Baseline | | |
| Geometric Mean | 0.24 | 0.24 |
| Geometric CV [%] | 169.6 | 212.1 |
| 95% CI of Geometric Mean | 0.192, 0.292 | 0.192, 0.306 |
| Ratio of Week 26 to Baseline (Model-Adjusted) | | |
| Geometric LS Mean | 0.26 | 0.25 |
| 95% CI of Geometric LS Mean | 0.206, 0.328 | 0.200, 0.320 |
| Treatment effect: Ratio of Selexipag over Placebo (Model-Adjusted) | | |
| Geometric LS Means ratio | 1.03 | |
| 95% CI of the Geometric LS Means ratio | 0.770, 1.371 | |
| p-Value | 0.8529 | |

Ratio of Week 26 to baseline NT-proBNP is log-transformed (base e) and analyzed using an ANCOVA with factors for treatment group, region (as stratified), baseline; WHO functional class (as stratified) and a continuous covariate for baseline log NT-proBNP.
A selexipag/placebo ratio < 1 favors the selexipag treatment group.
Output: t-bnp-main-fas (analysis of covariance: NT-pro BNP (ng/L) ratio of Week 26 to baseline; Analysis Set: Full Analysis Set)

Triple therapy reduced by 41% the risk of occurrence of a disease progression event (centrally adjudicated) up to EOMOP+7 days compared to double therapy (hazard ratio for triple versus double therapy 0.59, 95% CLs 0.32, 1.09, 2-sided log-rank p=0.0867). In total 16 (13.0%) subjects in triple therapy and 27 (21.8%) subjects in double therapy experienced at least one event. See, Table 13 and FIG. 6. The most frequently first-reported event was 'Hospitalization for worsening of PAH'. Among the patients with an event, the proportion with 'Hospitalization for worsening of PAH' was 62.5% in the triple therapy group, compared to 70.4% in the double therapy group. None of the patients in the triple therapy group had death as the first event as compared to 14.8% of patients in the double therapy group.

TABLE 13

Type of first disease progression up to EOMOP
+ 7 days Analysis Set: Full Analysis Set

|  | Triple th.<br>N = 123 | Double th.<br>N = 124 |
|---|---|---|
| Subjects at risk° | 123 (100) | 124 (100) |
| Subjects with progression⁻ | 16 (13.0) | 27 (21.8) |
| Death | 0 | 4 (14.8) |
| Hospitalization for worsening of PAH | 10 (62.5) | 19 (70.4) |
| Initiation of Prostacyclin for worsening of PAH | 1 (6.3) | 2 (7.4) |
| Clinical worsening of PAH | 5 (31.3) | 2 (7.4) |

All events are adjudicated by the clinical events committee. If two events occur to a subject on the same day, the most severe (from top to bottom) reason is assigned.
°Percentage relative to the overall number of patients in the treatment group.
⁻Percentage relative to number of patients at risk. Output: t-prog-fas (reason for disease progression (up to EOMOP + 7 days); Analysis Set: Full Analysis Set)

Absence of worsening in WHO FC from baseline to Week 26 was observed in 99.2% of subjects in triple therapy and in 97.5% of subjects in double therapy. See, Table 14. The odds of absence of worsening at Week 26 was similar for triple therapy as compared with double therapy (odds ratio: 3.18, 95% CLs: 0.32, 31.82, 2-sided p=0.3260). Of note, there was an improvement in WHO FC at Week 26 for 53.7% of subjects in triple therapy and in 52.4% of subjects in double therapy.

TABLE 14

Absence of worsening from baseline to Week 26 in WHO functional class
Analysis Set: Full Analysis Set

| WHO FC at baseline | Triple th. N = 123 | | Double th. N = 124 | | Between-Treatment Groups Odds Ratio 95% CI | |
|---|---|---|---|---|---|---|
| | M | n (%) | M | n (%) | OR | P-value |
| Excluding Baseline FC IV (main) | 122 | 121 (99.2) | 119 | 116 (97.5) | 3.175 | 0.317, 31.824 0.3260 |
| Total number of subjects with imputation of missing values [n (%)] | | 10 (8.2) | | 7 (5.9) | | |
| by last observation carried forward | | 10 (8.2) | | 7 (5.9) | | |
| Including Baseline FC IV (sensitivity) | 123 | 122 (99.2) | 124 | 119 (96.0) | 5.255 | 0.599, 46.086 0.1342 |
| Total number of subjects with imputation of missing values [n (%)] | | 10 (8.1) | | 7 (5.6) | | |
| by last observation carried forward | | 10 (8.1) | | 7 (5.6) | | | n is the number of responders within the treatment group; M is the total number of subjects analyzed within the treatment group; The p-value is obtained from a likelihood-ratio test of treatment group difference; Logistic regression model is: Absence of worsening from baseline = treatment arm, region, WHO functional class at baseline as factors; Output: t-abw-fas\(logistic regression: Absence of worsening from baseline to Week 26 in WHO functional class; Analysis Set: Full Analysis Set) (modified from original)

Safety

Overall, 119 (100%) subjects in the triple therapy group and 123 (96.9%) subjects in the double therapy group experienced at least one treatment-emergent adverse event (TEAE) up to EOMOP. See, Table 15. The most common TEAEs were headache (68.9%), diarrhoea (53.8%), nausea (47.9%), oedema peripheral (37.0%), pain in extremity (30.3%), pain in jaw (29.4%) for the triple therapy group, and headache (60.6%), oedema peripheral (36.2%), diarrhoea (31.5%) and nausea (25.2%) for the double therapy group. See, Table 15. There was no difference between the treatment groups in peripheral edema, a common adverse drug reaction of ERAs and a symptom of the disease. However, the incidence of peripheral edema (around 36%) in both treatment groups was higher than expected. This observation may reflect the challenge of adjusting diuretics in newly diagnosed (and typically diuretic naïve) patients, while initiating two or three PAH drugs within a short period of time.

Fifty-one [42.9%] subjects in triple therapy and 40 [31.5%] subjects in double therapy experienced at least one serious TEAs up to EOMOP.

TABLE 15

Most frequent (at least 5% in any treatment group)
TEAEs up to EOMOP by PT Analysis Set: Safety Set

| Preferred Term | Triple th. N = 119 n (%) | Double th. N = 127 n (%) |
|---|---|---|
| Subjects with at least one AE | 119 (100) | 123 (96.9) |
| Headache | 82 (68.9) | 77 (60.6) |
| Diarrhoea | 64 (53.8) | 40 (31.5) |
| Nausea | 57 (47.9) | 32 (25.2) |
| Oedema peripheral | 44 (37.0) | 46 (36.2) |
| Pain in extremity | 36 (30.3) | 20 (15.7) |
| Pain in jaw | 35 (29.4) | 14 (11.0) |
| Vomiting | 30 (25.2) | 15 (11.8) |
| Dyspepsia | 27 (22.7) | 16 (12.6) |
| Fatigue | 24 (20.2) | 21 (16.5) |
| Dyspnoea | 21 (17.6) | 23 (18.1) |
| Myalgia | 21 (17.6) | 19 (15.0) |
| Nasal congestion | 21 (17.6) | 23 (18.1) |
| Flushing | 20 (16.8) | 21 (16.5) |
| Arthralgia | 19 (16.0) | 19 (15.0) |
| Nasopharyngitis | 19 (16.0) | 21 (16.5) |
| Cough | 17 (14.3) | 17 (13.4) |
| Dizziness | 17 (14.3) | 26 (20.5) |
| Anaemia | 16 (13.4) | 11 (8.7) |
| Hypokalaemia | 14 (11.8) | 13 (10.2) |
| Palpitations | 14 (11.8) | 11 (8.7) |
| Upper respiratory tract infection | 14 (11.8) | 20 (15.7) |
| Back pain | 13 (10.9) | 19 (15.0) |
| Decreased appetite | 13 (10.9) | 4 (3.1) |
| Epistaxis | 13 (10.9) | 13 (10.2) |
| Non-cardiac chest pain | 12 (10.1) | 6 (4.7) |
| Pulmonary arterial hypertension | 12 (10.1) | 8 (6.3) |
| Gastrooesophageal reflux disease | 11 (9.2) | 18 (14.2) |
| Hypotension | 11 (9.2) | 8 (6.3) |
| Pain | 11 (9.2) | 9 (7.1) |
| Peripheral swelling | 11 (9.2) | 4 (3.1) |
| Pyrexia | 11 (9.2) | 11 (8.7) |
| Aspartate aminotransferase increased | 10 (8.4) | 4 (3.1) |
| Urinary tract infection | 10 (8.4) | 11 (8.7) |
| Pneumonia | 9 (7.6) | 6 (4.7) |
| Abdominal pain upper | 8 (6.7) | 7 (5.5) |
| Alanine aminotransferase increased | 8 (6.7) | 4 (3.1) |
| Constipation | 8 (6.7) | 9 (7.1) |
| Haemoglobin decreased | 8 (6.7) | 6 (4.7) |
| Iron deficiency anaemia | 8 (6.7) | 2 (1.6) |
| Muscle spasms | 8 (6.7) | 7 (5.5) |
| Musculoskeletal pain | 8 (6.7) | 1 (0.8) |
| Oropharyngeal pain | 8 (6.7) | 2 (1.6) |
| Paraesthesia | 8 (6.7) | 1 (0.8) |
| Swelling face | 8 (6.7) | 2 (1.6) |
| Anxiety | 7 (5.9) | 5 (3.9) |
| Chest discomfort | 7 (5.9) | 9 (7.1) |

TABLE 15-continued

Most frequent (at least 5% in any treatment group)
TEAEs up to EOMOP by PT Analysis Set: Safety Set

| Preferred Term | Triple th.<br>N = 119<br>n (%) | Double th.<br>N = 127<br>n (%) |
|---|---|---|
| Chills | 7 (5.9) | 2 (1.6) |
| Influenza | 7 (5.9) | 7 (5.5) |
| Insomnia | 7 (5.9) | 5 (3.9) |
| Abdominal distension | 6 (5.0) | 3 (2.4) |
| Abdominal pain | 6 (5.0) | 6 (4.7) |
| Bronchitis | 6 (5.0) | 6 (4.7) |
| Chest pain | 6 (5.0) | 3 (2.4) |
| Hypoaesthesia | 6 (5.0) | 1 (0.8) |
| Hypoxia | 6 (5.0) | 8 (6.3) |
| Rash | 6 (5.0) | 8 (6.3) |
| Right ventricular failure | 6 (5.0) | 10 (7.9) |
| Weight increased | 5 (4.2) | 7 (5.5) |
| Fluid retention | 4 (3.4) | 7 (5.5) |

Preferred Terms are based on MedDRA version 22.0; Adverse events with onset between start of first dose of study medication and last dose of study medication + 30 days (or EOMOP, whichever the earliest is) are summarized. Output: t-teae-freq-s (incidence of the most frequent (at least 5% in any treatment group) treatment-emergent adverse events up to EOMOP, by preferred term; Analysis Set: Safety Analysis Set)

TABLE 16

TEAEs up to EOMOP by important identified or potential risk as per current EU Uptravi RMP Analysis Set: Safety Set (subjects treated with at least one dose of selexipag/placebo)

| Identified or<br>Potential Risk<br>Preferred Term | Selexipag<br>N = 119<br>n (%) | Placebo<br>N = 120<br>n (%) |
|---|---|---|
| Subjects with At Least One Identified or Potential Risk AE | 59 (49.6) | 48 (40.0) |
| Anaemia | 30 (25.2) | 16 (13.3) |
| Anaemia | 15 (12.6) | 9 (7.5) |
| Haemoglobin decreased | 8 (6.7) | 5 (4.2) |
| Iron deficiency anaemia | 8 (6.7) | 2 (1.7) |
| Microcytic anaemia | 2 (1.7) | 0 |
| Blood loss anaemia | 1 (0.8) | 0 |
| Haematocrit decreased | 1 (0.8) | 1 (0.8) |
| Red blood cell count decreased | 1 (0.8) | 0 |
| Anaemia of chronic disease | 0 | 1 (0.8) |
| Bleeding events | 26 (21.8) | 23 (19.2) |
| Epistaxis | 11 (9.2) | 10 (8.3) |
| Gastrointestinal haemorrhage | 4 (3.4) | 2 (1.7) |
| Haematoma | 2 (1.7) | 2 (1.7) |
| Metrorrhagia | 2 (1.7) | 1 (0.8) |
| Upper gastrointestinal haemorrhage | 2 (1.7) | 0 |
| Blood loss anaemia | 1 (0.8) | 0 |
| Conjunctival haemorrhage | 1 (0.8) | 1 (0.8) |
| Contusion | 1 (0.8) | 1 (0.8) |
| Gastrointestinal polyp haemorrhage | 1 (0.8) | 0 |
| Gingival bleeding | 1 (0.8) | 1 (0.8) |
| Haematochezia | 1 (0.8) | 1 (0.8) |
| Haemoptysis | 1 (0.8) | 1 (0.8) |
| Haemorrhoidal haemorrhage | 1 (0.8) | 0 |
| Hereditary haemorrhagic telangiectasia | 1 (0.8) | 0 |
| Melaena | 1 (0.8) | 0 |
| Menorrhagia | 1 (0.8) | 1 (0.8) |
| Vaginal haemorrhage | 1 (0.8) | 1 (0.8) |
| Vascular rupture | 1 (0.8) | 0 |
| Anal haemorrhage | 0 | 1 (0.8) |
| Blood blister | 0 | 1 (0.8) |
| Bone contusion | 0 | 1 (0.8) |
| Chest wall haematoma | 0 | 1 (0.8) |
| Haematemesis | 0 | 1 (0.8) |
| Haemorrhagic ovarian cyst | 0 | 1 (0.8) |
| Procedural haemorrhage | 0 | 1 (0.8) |
| Rectal haemorrhage | 0 | 1 (0.8) |
| Hypotension | 10 (8.4) | 7 (5.8) |
| Hypotension | 9 (7.6) | 6 (5.0) |
| Orthostatic hypotension | 1 (0.8) | 1 (0.8) |
| Blood pressure diastolic decreased | 0 | 1 (0.8) |
| Renal function impairment/acute renal failure | 10 (8.4) | 4 (3.3) |
| Acute kidney injury | 4 (3.4) | 1 (0.8) |
| Blood creatinine increased | 3 (2.5) | 2 (1.7) |
| Glomerular filtration rate decreased | 1 (0.8) | 0 |
| Prerenal failure | 1 (0.8) | 0 |
| Renal failure | 1 (0.8) | 0 |
| Renal impairment | 1 (0.8) | 1 (0.8) |
| Nephropathy toxic | 0 | 1 (0.8) |
| Ophthalmological effects associated to retinal vascular system | 5 (4.2) | 8 (6.7) |
| Vision blurred | 2 (1.7) | 4 (3.3) |
| Blindness | 1 (0.8) | 0 |
| Photopsia | 1 (0.8) | 0 |
| Retinal vasculitis | 1 (0.8) | 0 |
| Vitreous floaters | 1 (0.8) | 1 (0.8) |
| Visual impairment | 0 | 3 (2.5) |
| Pulmonary venoocclusive disease associated with pulmonary oedema | 2 (1.7) | 0 |
| Pulmonary oedema | 1 (0.8) | 0 |
| Pulmonary veno-occlusive disease | 1 (0.8) | 0 |
| Gastrointestinal disturbances denoting intestinal intussusception (manifested as ileus or obstruction) | 1 (0.8) | 0 |
| Small intestinal obstruction | 1 (0.8) | 0 |
| Light-dependent non-melanoma skin malignancies | 1 (0.8) | 1 (0.8) |
| Basal cell carcinoma | 1 (0.8) | 0 |
| Squamous cell carcinoma of skin | 0 | 1 (0.8) |
| Major adverse cardiovascular events (MACE) | 1 (0.8) | 5 (4.2) |
| Transient ischaemic attack | 1 (0.8) | 0 |
| Cardiac arrest | 0 | 2 (1.7) |
| Cerebral infarction | 0 | 1 (0.8) |
| Embolic stroke | 0 | 1 (0.8) |
| Hemiparesis | 0 | 1 (0.8) |
| Ischaemic stroke | 0 | 1 (0.8) |
| Sudden cardiac death | 0 | 1 (0.8) |
| Sudden death | 0 | 1 (0.8) |
| Troponin increased | 0 | 1 (0.8) |
| Medication errors | 1 (0.8) | 0 |
| Accidental overdose | 1 (0.8) | 0 |
| Hyperthyroidism | 0 | 1 (0.8) |
| Thyroid disorder | 0 | 1 (0.8) |

Potential Risk Term Search and Preferred Terms are based on MedDRA version 22.0. Treatment-emergent adverse events with onset between start of first dose of selexipag/placebo and last dose of selexipag/placebo + 30 days (or EOMOP, whichever the earliest is) are summarized. Output: t-sel-teae-rsk-s (incidence of selexipag treatment-emergent adverse events up to EOMOP by important identified or potential risk and preferred term; Analysis Set: Safety Analysis Set, subjects treated with at least one dose of selexipag/placebo)

TEAEs leading to premature discontinuation of double-blind treatment were reported for 19 (16.0%) subjects in the triple therapy group, and 17 (14.2%) subjects in the double therapy group. See, Table 17.

TABLE 17

AEs leading to discontinuation of selexipag/placebo up
to EOMOP by SOC and PT Analysis Set: Safety set (subjects
treated with at least one dose of selexipag/placebo)

| System Organ Class Preferred Term | Triple th. N = 119 n (%) | Double th. N = 127 n (%) |
|---|---|---|
| Subjects with at least one AE | 19 (16.0) | 17 (14.2) |
| Respiratory, thoracic and mediastinal disorders | 8 (6.7) | 6 (5.0) |
| Pulmonary arterial hypertension | 5 (4.2) | 6 (5.0) |
| Acute respiratory failure | 1 (0.8) | 0 |
| Dyspnoea | 1 (0.8) | 0 |
| Hypoxia | 1 (0.8) | 0 |
| Cardiac disorders | 4 (3.4) | 3 (2.5) |
| Right ventricular failure | 2 (1.7) | 2 (1.7) |
| Left ventricular failure | 1 (0.8) | 0 |
| Pericardial effusion | 1 (0.8) | 0 |
| Palpitations | 0 | 1 (0.8) |
| Hepatobiliary disorders | 2 (1.7) | 0 |
| Hepatic failure | 1 (0.8) | 0 |
| Liver disorder | 1 (0.8) | 0 |
| Nervous system disorders | 2 (1.7) | 1 (0.8) |
| Headache | 2 (1.7) | 0 |
| Dizziness | 0 | 1 (0.8) |
| Gastrointestinal disorders | 1 (0.8) | 1 (0.8) |
| Nausea | 1 (0.8) | 0 |
| Gastrointestinal haemorrhage | 0 | 1 (0.8) |
| Injury, poisoning and procedural complications | 1 (0.8) | 0 |
| Intentional overdose | 1 (0.8) | 0 |
| Neoplasms benign, malignant and unspecified (incl cysts and polyps) | 1 (0.8) | 0 |
| Squamous cell carcinoma of the tongue | 1 (0.8) | 0 |
| Psychiatric disorders | 1 (0.8) | 0 |
| Schizophrenia | 1 (0.8) | 0 |
| Skin and subcutaneous tissue disorders | 1 (0.8) | 1 (0.8) |
| Hyperhidrosis | 1 (0.8) | 0 |
| Erythema | 0 | 1 (0.8) |
| General disorders and administration site conditions | 0 | 2 (1.7) |
| Oedema | 0 | 1 (0.8) |
| Sudden cardiac death | 0 | 1 (0.8) |
| Infections and infestations | 0 | 1 (0.8) |
| Sepsis | 0 | 1 (0.8) |
| Investigations | 0 | 2 (1.7) |
| Hepatic enzyme increased | 0 | 1 (0.8) |
| Intraocular pressure test | 0 | 1 (0.8) |
| Vascular disorders | 0 | 1 (0.8) |
| Haemodynamic instability | 0 | 1 (0.8) |

System Organ Classes and Preferred Terms are based on MedDRA version 22.0. Treatment-emergent adverse events leading to discontinuation of selexipag/placebo with onset between start of first dose of study medication and last dose of study medication + 30 days (or EOMOP, whichever the earliest is) are summarized; Output: t-teae-dc-soc-s-s (incidence of treatment-emergent adverse events leading to discontinuation of selexipag/placebo up to EOMOP, by primary system organ class and preferred term; Analysis Set: Safety Analysis Set, subjects treated with at least one dose of selexipag/placebo)

Eleven subjects died during the study up to EOMOP (2 in triple therapy and 9 in double therapy). See, Table 18.

TABLE 18

Study deaths up to EOMOP by SOC Analysis Set: Safety Set

| System Organ Class Preferred Term | Triple th. N = 119 n (%) | Double th. N = 127 n (%) |
|---|---|---|
| Subjects who died | 2 (1.7) | 9 (7.1) |
| Cardiac Disorders | 1 (0.8) | 2 (1.6) |
| Right Ventricular Failure | 1 (0.8) | 1 (0.8) |
| Cardiac Arrest | 0 | 1 (0.8) |
| Respiratory, Thoracic and Mediastinal Disorders | 1 (0.8) | 2 (1.6) |
| Respiratory Failure | 1 (0.8) | 0 |
| Acute Respiratory Failure | 0 | 1 (0.8) |
| Pulmonary Veno-Occlusive Disease | 0 | 1 (0.8) |
| Gastrointestinal Disorders | 0 | 1 (0.8) |
| Gastrointestinal Haemorrhage | 0 | 1 (0.8) |
| General Disorders and Administration Site Conditions | 0 | 1 (0.8) |
| Sudden Cardiac Death | 1 (0.8) | 0 |
| Infections and Infestations | 0 | 1 (0.8) |
| Sepsis | 0 | 1 (0.8) |
| Injury, Poisoning and Procedural Complications | 0 | 1 (0.8) |
| Toxicity to Various Agents | 0 | 1 (0.8) |
| Nervous Systems Disorders | 0 | 1 (0.8) |
| Haemorrhagic Stroke | 0 | 1 (0.8) |

System Organ Classes and Preferred Terms are based on MedDRA version 22.0. All deaths between Day 1 and EOMOP are summarized. Output: t-dth-soc-s (study deaths up to EOMOP by primary system organ class and preferred term; Analysis Set: Safety Analysis Set)

Fifteen [12.8%] subjects in triple therapy and 11 [9.1%] subjects in double therapy experienced at least one treatment-emergent liver test abnormality (AST or ALT>3 ULN) up to EOMOP. See, Table 19. Two cases with increased AST/ALT>3×ULN associated with total bilirubin>2×ULN were observed in the initial triple group. MACE were reported for 1 patient in the triple therapy group and in 5 patients in the initial double therapy group.

TABLE 19

Notable treatment-emergent laboratory values for hepatic safety up to EOMOP Analysis Set: Safety Set

| Laboratory Abnormality | Triple th. N = 119 n (%) | Double th. N = 127 n (%) |
|---|---|---|
| ALT ≥ 3*ULN | 14/117 (12.0) | 7/121 (5.8) |
| AST ≥ 3*ULN | 13/117 (11.1) | 9/121 (7.4) |
| ALT or AST ≥ 3*ULN | 15/117 (12.8) | 11/121 (9.1) |

TABLE 19-continued

Notable treatment-emergent laboratory values for hepatic
safety up to EOMOP Analysis Set: Safety Set

| Laboratory Abnormality | Triple th.<br>N = 119<br>n (%) | Double th.<br>N = 127<br>n (%) |
|---|---|---|
| ALT or AST ≥ 3*ULN + < 5*ULN | 14/117 (12.0) | 10/121 (8.3) |
| ALT or AST ≥ 5*ULN + < 8*ULN | 8/117 (6.8) | 6/121 (5.0) |
| ALT or AST ≥ 8*ULN | 5/117 (4.3) | 3/121 (2.5) |
| ALT or AST ≥ 3*ULN + TBIL > 2*ULN [#] | 2/114 (1.8) | 0/121 |

[#] At the same time as ALT or AST ≥ 3*ULN. n is the number of subjects with abnormal values.
N is the total number of subjects in the treatment group. n is the number of subjects at risk with non-missing values; Abnormalities reported between first dose of study medication and last dose of study medication + 30 days (or EOMOP, whichever the earliest is) are summarized.
Frequencies present the number of subjects with defined abnormality reported at least once post baseline;
Output: t-lb-abn-spec-s (incidence of treatment-emergent notable laboratory values for hepatic safety up to EOMOP; Analysis Set: Safety Analysis Set)

SUMMARY

In a post-hoc, exploratory analysis of time to death, initial triple therapy reduced the risk of death by 77% (95% CLs: −4, 95) as compared with initial double therapy. Based on the available data, selexipag as part of the initial triple therapy regimen was well-tolerated and the safety profile was consistent with previous trials.

(i) Short-Term Efficacy

In summary, the changes from baseline to week 26 in hemodynamic and functional parameters were large and similar in the two treatment groups. These results support the efficacy of macitentan in combination with tadalafil in newly diagnosed PAH patients.

(ii) Long-Term Efficacy

Figure 6:
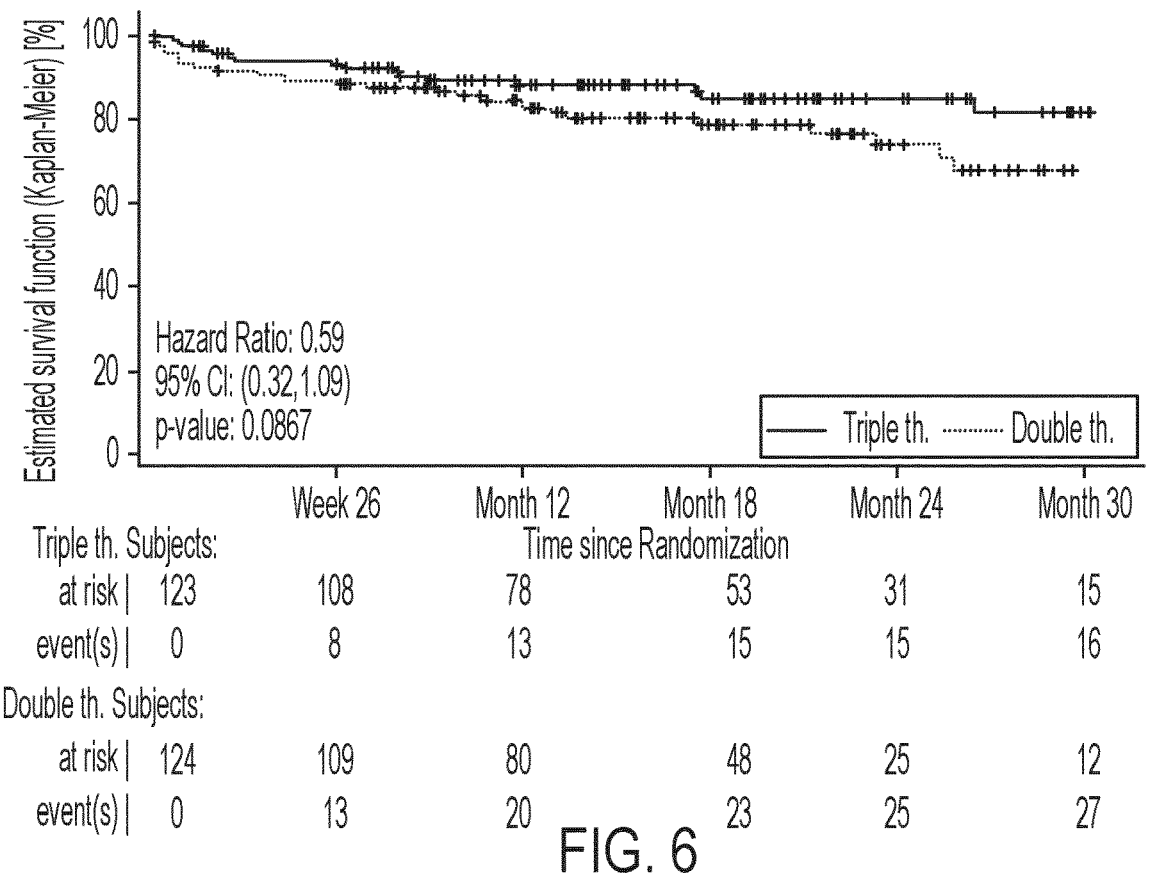
FIG. 6 is a line graph showing time from randomization to first disease progression event up to EOMOP+7 days Analysis Set: Full Analysis Set. In this figure, subjects are censored at EOMOP+7 days or end of study, whichever is earlier. Graph is cut when less than 10% of subjects are at risk in both treatment groups. p-value based on the stratified log-rank test. Hazard ratio estimate obtained from stratified Cox regression with Wald confidence limit. Analysis is stratified by WHO FC at baseline and geographical region.

The long-term efficacy of initial triple versus initial double therapy was assessed by the time to the first disease progression event up to EOMOP+7 days. Initial triple therapy reduced the risk of disease progression by 41% compared to double therapy (FIG. 6). In total 16 (13.0%) patients in the triple therapy group and 27 (21.8%) patients in the double therapy group experienced a disease progression event. These results in favor of initial triple combination were driven by fewer "hospitalization for worsening of PAH" and "all-cause death".

Further Post-Hoc Analyses

Further post-hoc analyses of the study in Example 1 were conducted.

A. Time to First Disease Progression Event

Figure 7:
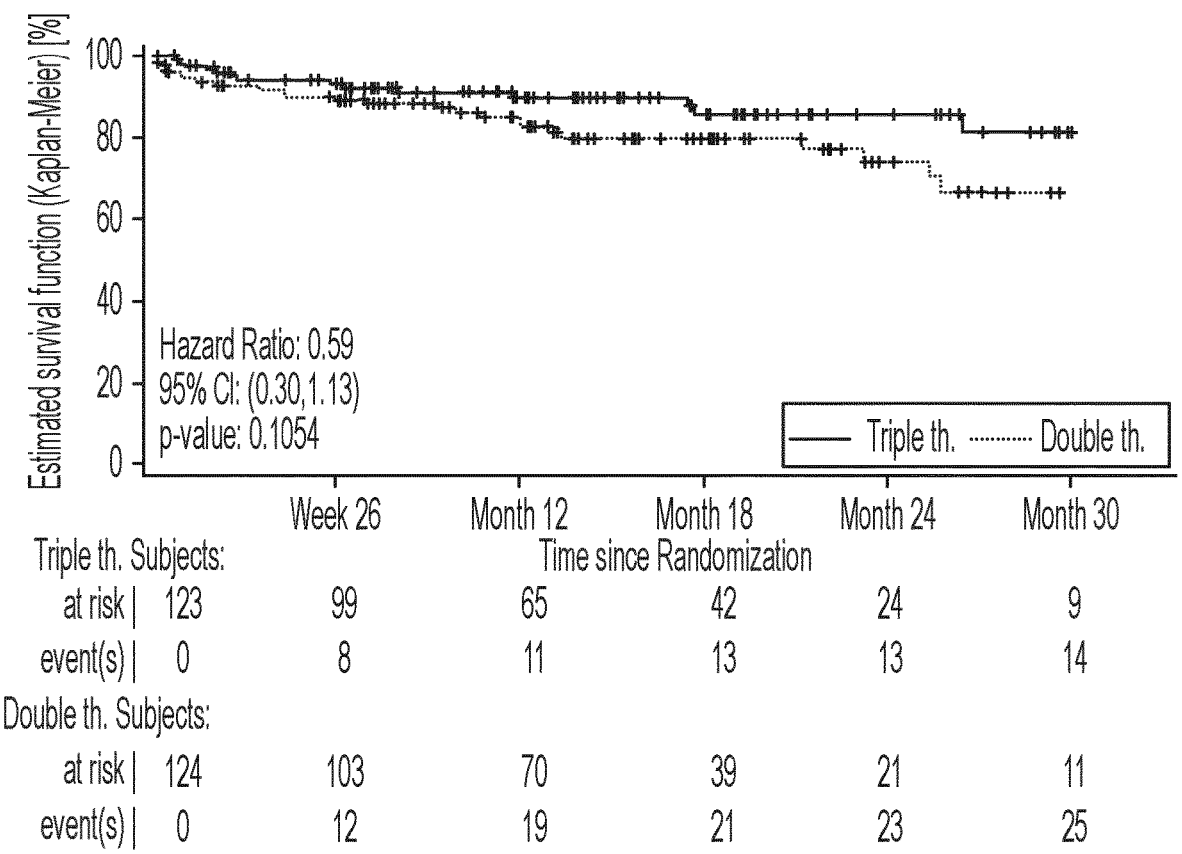
FIG. 7 is a line graph showing time to first disease progression event up to first treatment discontinuation of any of the three study medications, on treatment analysis. In this figure, subjects were censored at EOMOP+7 days or at the time of first treatment discontinuation of any of the three study medications+7 days or EOS, whichever is earlier.
Figure 8:
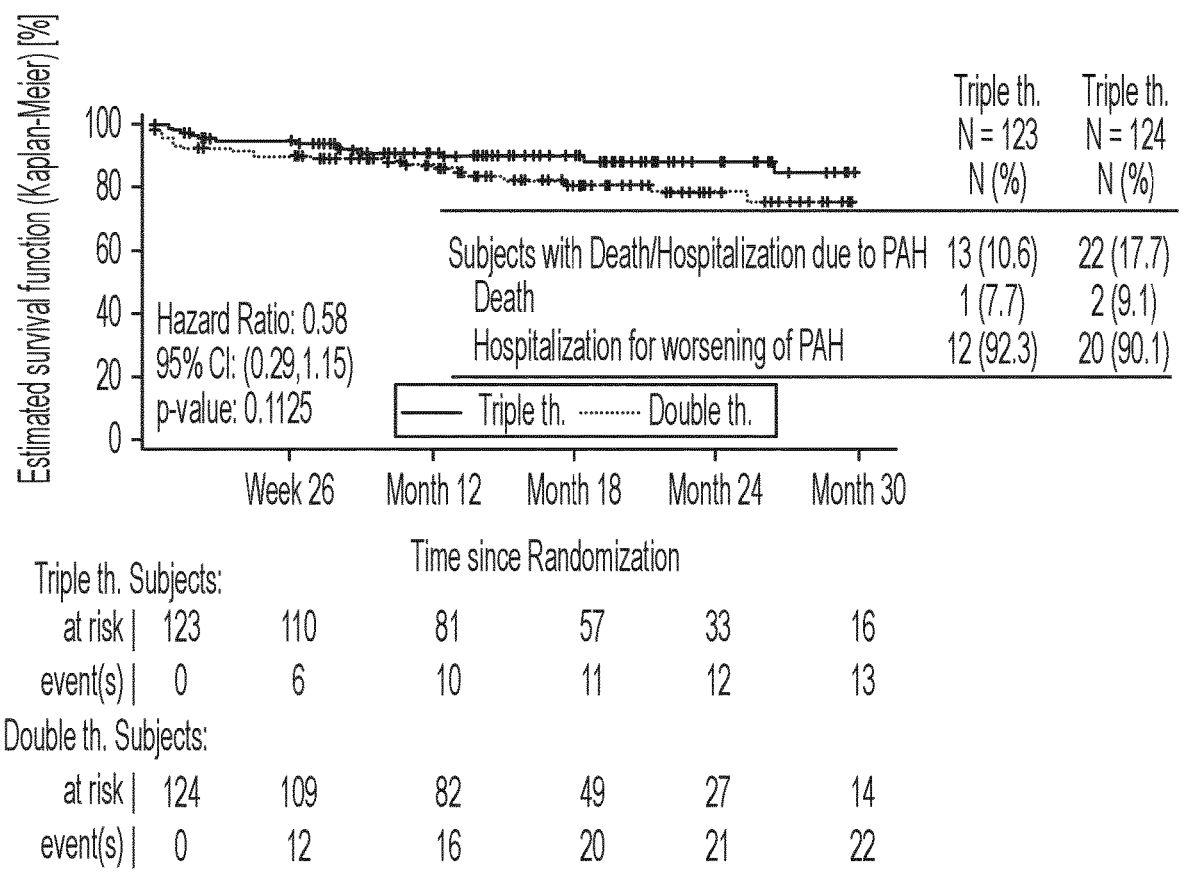
FIG. 8 is a line graph showing time to death due to PAH or hospitalization due to PAH worsening up to EOMOP, full analysis set.
Figure 8A:
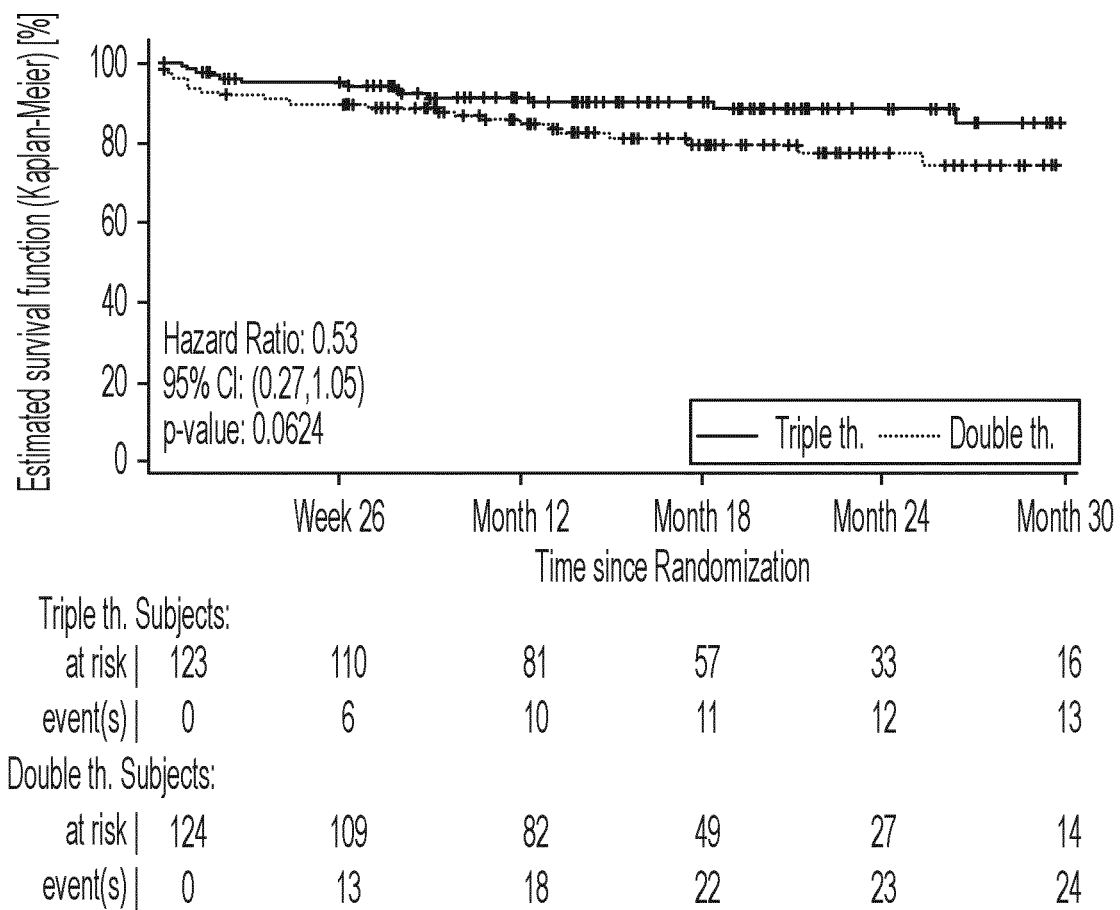
FIG. 8A is a line graph showing time to death due to PAH or hospitalization due to PAH worsening up to EOMOP+7 days, full analysis set. In this figure, subjects were censored at a minimum of EOMOP+7 days or EOS, whichever is earlier. The graph is cut when less than 10% of subjects are at risk in both treatment groups. p-value based on the stratified log-rank test. Hazard ratio estimate obtained from Cox regression with Wald confidence limits. Analysis is stratified by WHO FC at baseline and geographical region.
Figure 9:
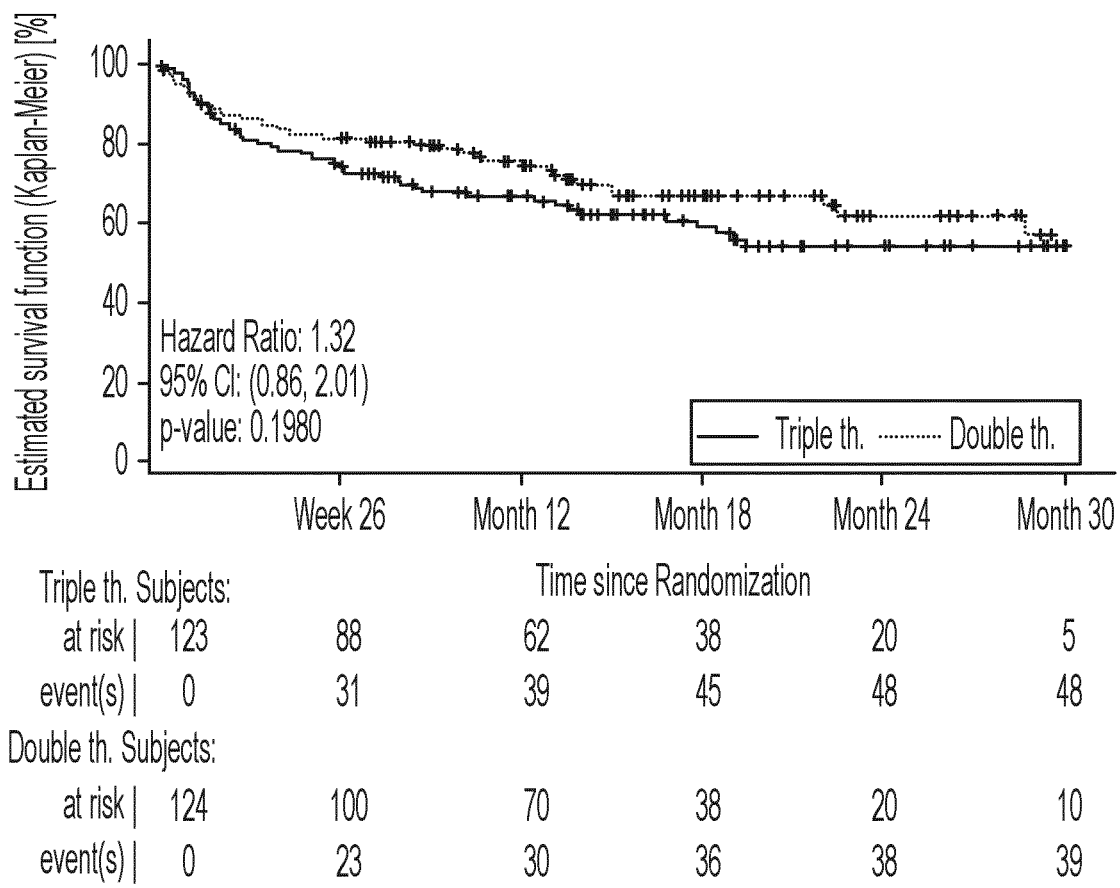
FIG. 9 is a line graph showing time to death or first hospitalization (all causes) up to EOMOP, full analysis set.
Figure 9A:
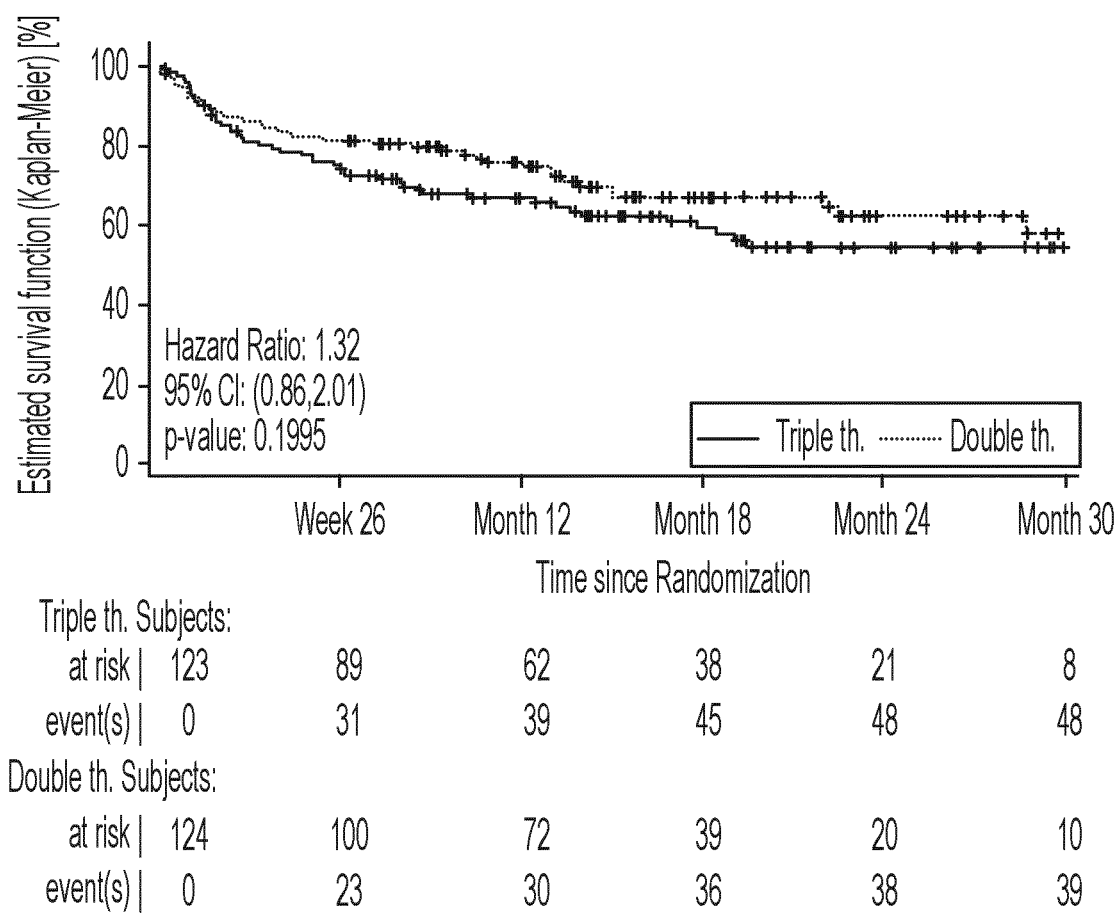
FIG. 9A is a line graph showing time to death or first hospitalization (all causes) up to EOMOP+7 days, full analysis set. In this figure, subjects were censored at a minimum of EOMOP+7 days or EOS, whichever is earlier. Graph is cut when less than 10% of subjects are at risk in both treatment groups. p-value based on the stratified log-rank test. Hazard ratio estimate obtained from Cox regression with Wald confidence limits. Analysis is stratified by WHO FC at baseline and geographical region.
Figure 10:
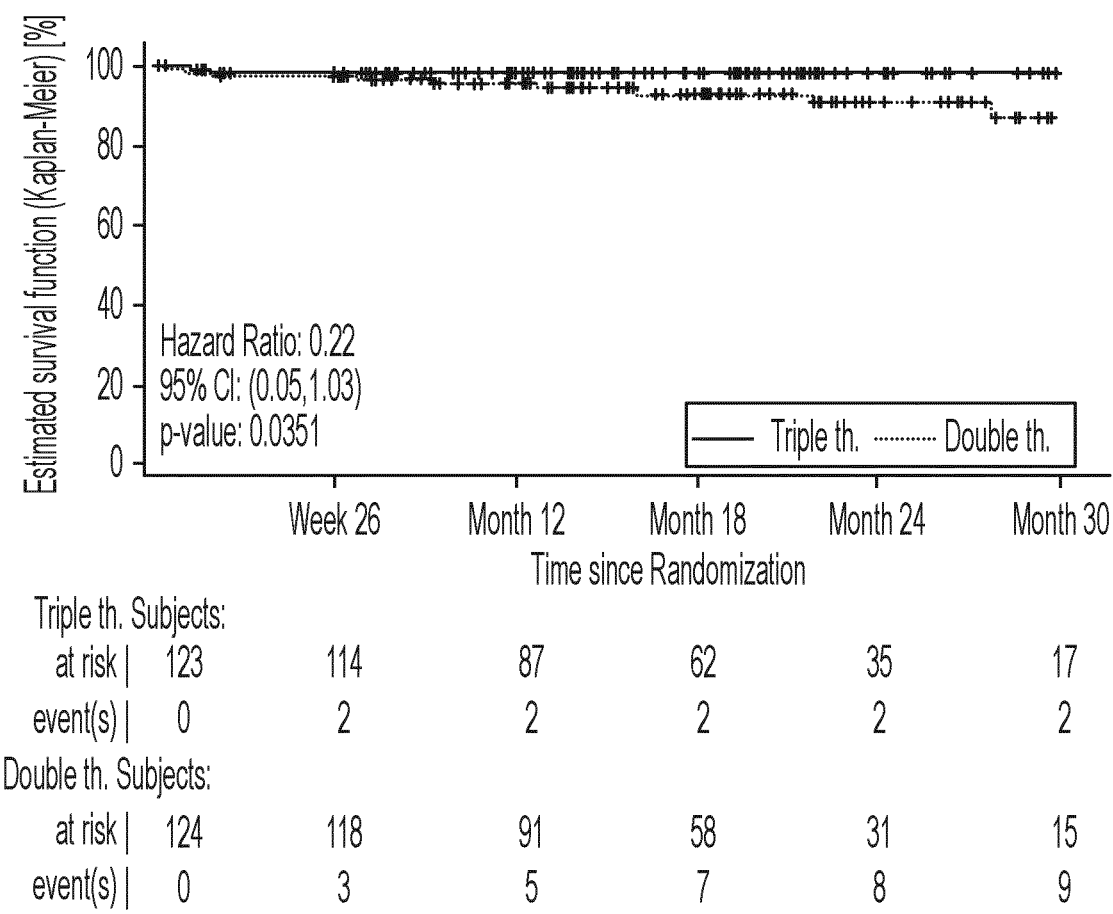
FIG. 10 is a line graph of time from randomization to death (all causes) up to EOMOP+7 days for the full analysis set.

Time to the first disease progression event for a patient was assessed. For example, the time to first disease progression event up to the first treatment discontinuation of any of the three study medications was analyzed. See, FIG. 7. The time to death due to PAH or hospitalization due to PAH worsening up to EOMOP (and EOMOP+7 days) is shown in FIGS. 8 and 8A; the time to death or first hospitalization (all causes) up to EOMOP (and EOMOP+7 days) is shown in FIGS. 9 and 9A; and the time from randomization to death (all causes) up to EOMOP is shown in FIG. 10.

B. Time to All Disease Progression Events

Figure 25:
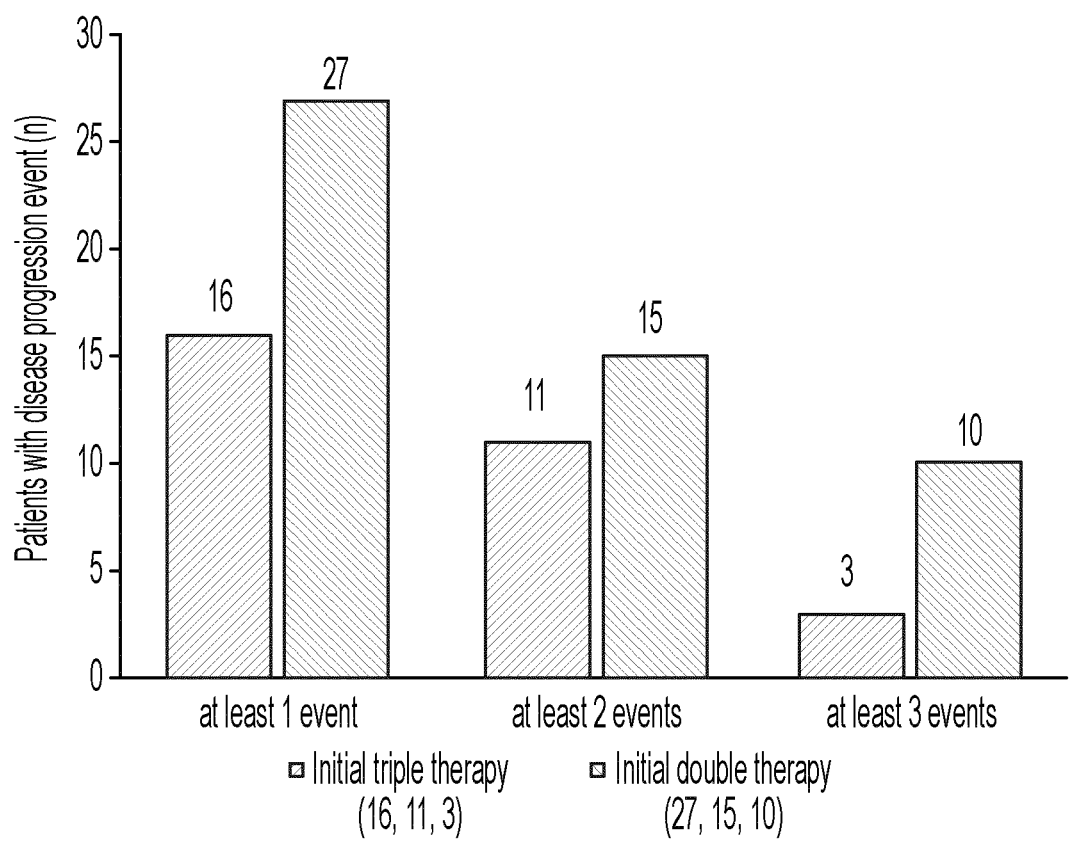
FIG. 25 is a bar graph showing disease progression events (ALL, first and subsequent ones) up to EOMOP+7 days.
Figure 26:
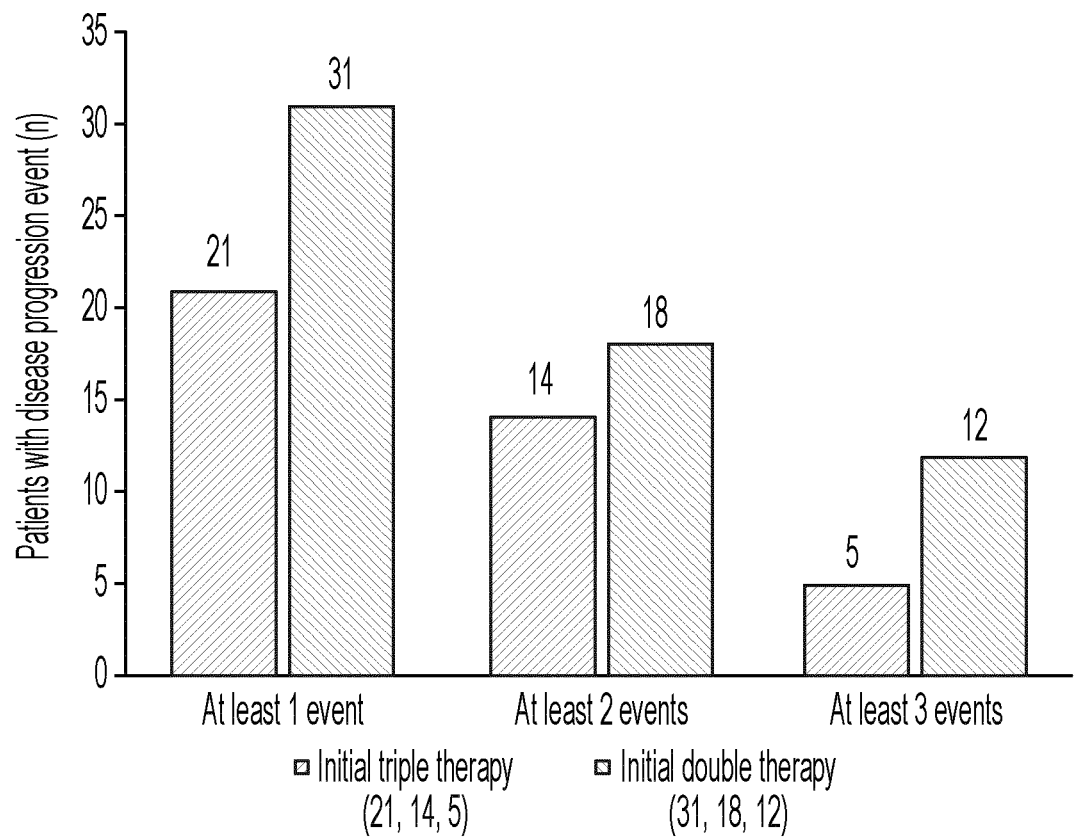
FIG. 26 is a bar graph showing disease progression events (ALL, first and subsequent ones) up to EOS.

The cumulative number of disease progression events up to EOMOP+7 days was also analyzed. See, Table 20 and FIG. 25.

TABLE 20

Summary of all disease progression events
up to EOMOP + 7 days, full analysis set

| | Initial Triple<br>Therapy<br>N = 123 | Initial Double<br>Therapy<br>N = 124 |
|---|---|---|
| Disease progression events | | |
| Number of subjects with at least 1 event | 16 | 27 |
| Number of subjects with at least 2 events | 11 | 15 |
| Number of subjects with at least 3 events | 3 | 10 |
| Total number of events confirmed by CEC | 31 | 67 |
| Total number of | | |
| Deaths | 2 | 9 |
| Hospitalization for worsening of PAH | 14 | 34 |
| Initiation of Prostacyclin for worsening of PAH | 7 | 16 |
| Clinical worsening of PAH | 8 | 8 |
| Andersen-Gill model | | |
| Hazard ratio 95% CI | 0.459 (0.237, 0.888) | |

In general, these results show that triple combination therapy decreases the reoccurrence of disease progression events.

The cumulative number of deaths due to PAH or hospitalization due to PAH worsening up to EOMOP+7 days was also analyzed. See, Table 21.

TABLE 21

Summary of all recurrent hospitalization
due to PAH up to EOMOP, full analysis set

| | Initial Triple<br>Therapy<br>N = 123 | Initial Double<br>Therapy<br>N = 124 |
|---|---|---|
| Disease progression events | | |
| Number of subjects with at least 1 hospitalization | 13 | 22 |
| Number of subjects with at least 2 hospitalizations | 2 | 10 |
| Number of subjects with at least 3 hospitalizations | 0 | 5 |
| Total number of events confirmed by CEC | 15 | 38 |

TABLE 21-continued

Summary of all recurrent hospitalization
due to PAH up to EOMOP, full analysis set

|  | Initial Triple Therapy N = 123 | Initial Double Therapy N = 124 |
|---|---|---|
| Total number of | | |
| Death (counting as hospitalization) | 1 | 4 |
| Hospitalization | 14 | 34 |
| Andersen-Gill model | | |
| Hazard ratio 95% CI | 0.387 (0.186, 0.808) | |

In general, these results show that triple combination therapy decreases the reoccurrence of hospitalization due to PAH.

C. Disease Progression Based on Hemodynamic Parameters

Figure 11:
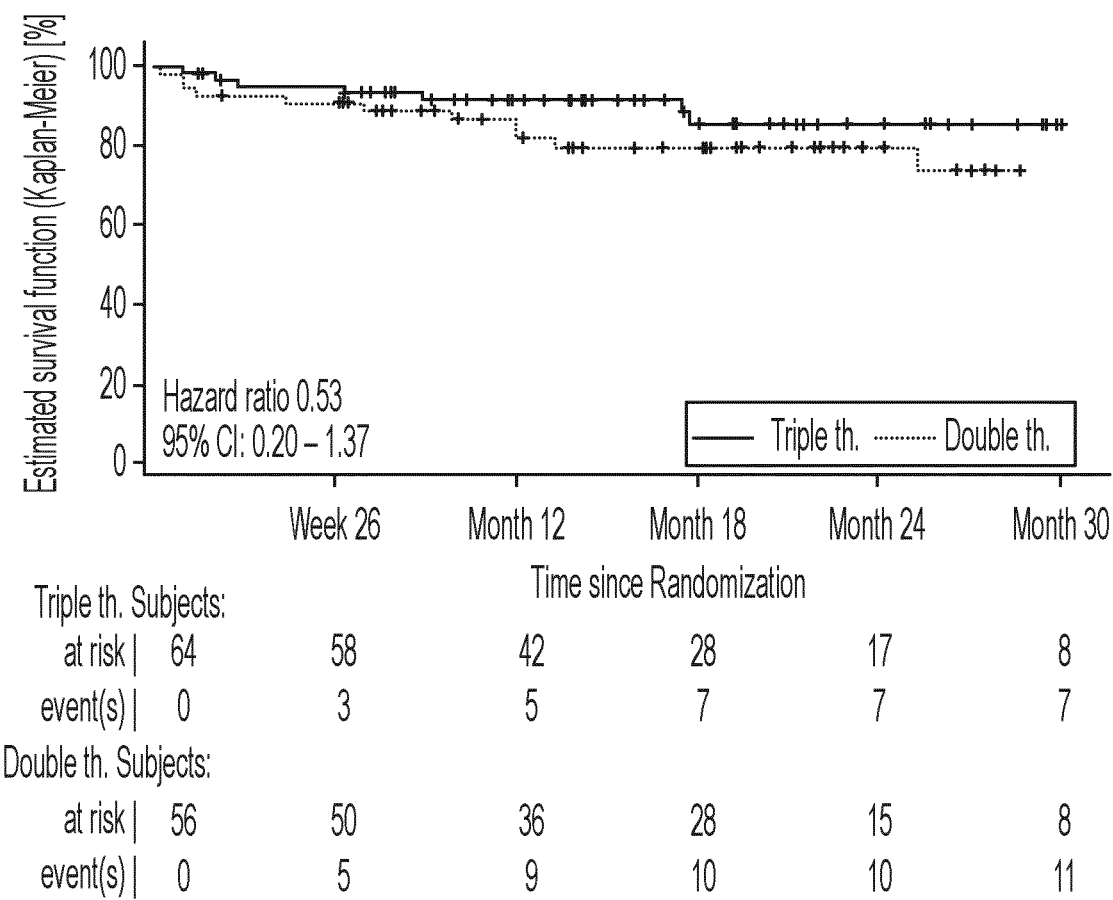
FIG. 11 is a line graph of time to disease progression by median PVR at baseline up to EOMOP+7 days for patients having a PVR<888 dyn·sec/cm$^5$.
Figure 12:
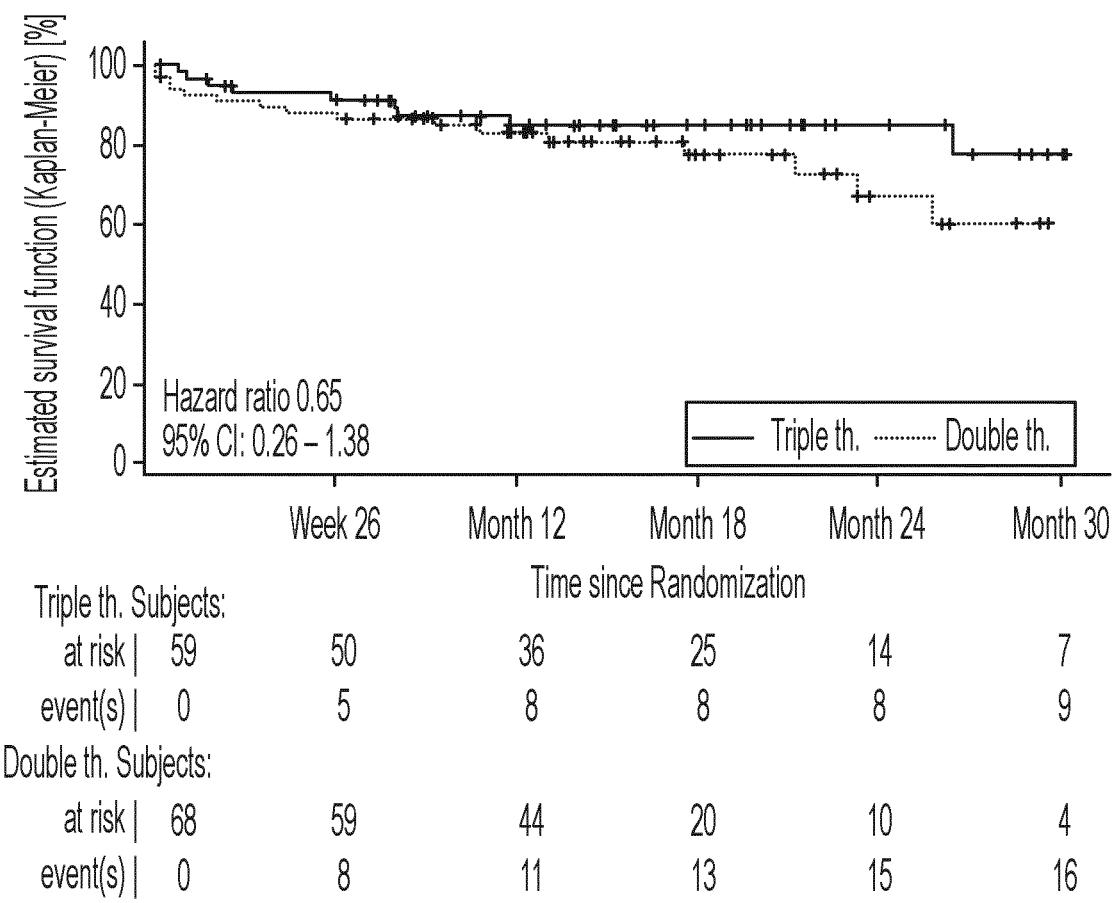
FIG. 12 is a line graph of time to disease progression by median PVR at baseline up to EOMOP+7 days for patients having a PVR≥888 dyn·sec/cm$^5$.
Figure 13:
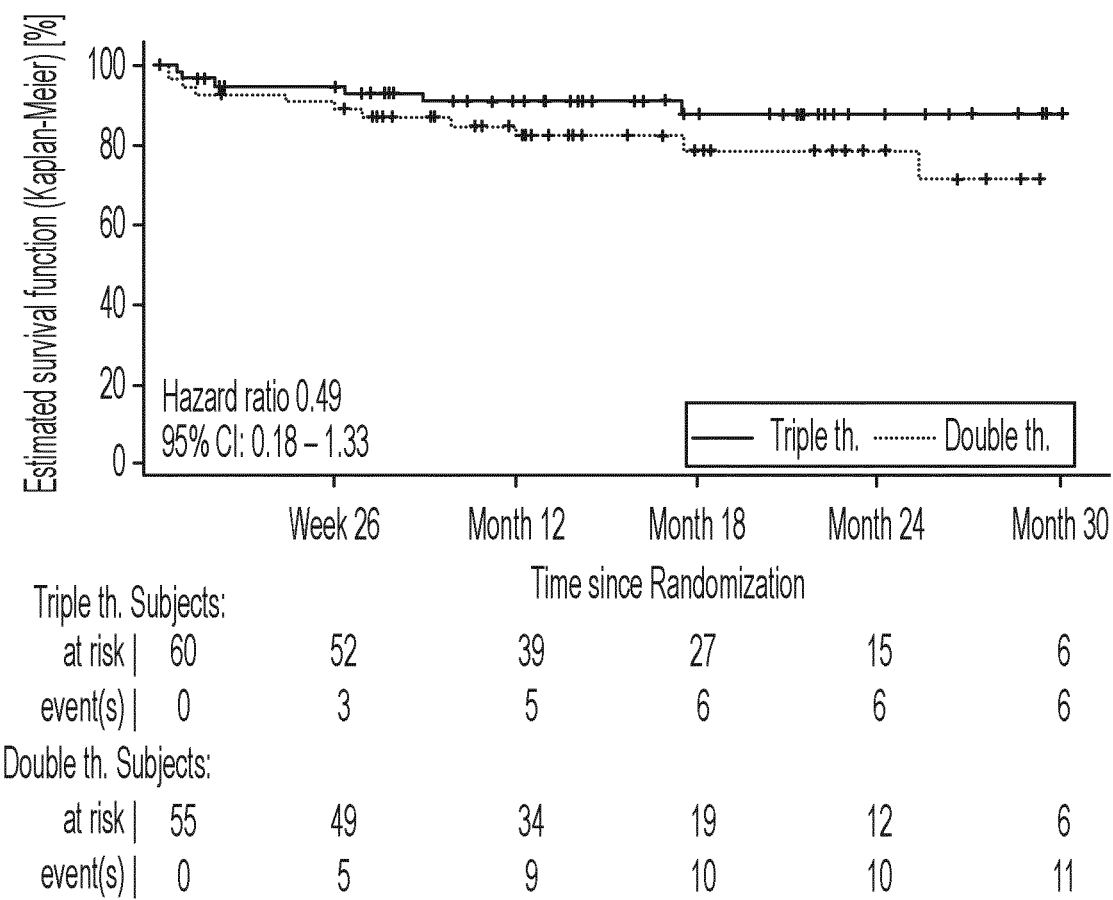
FIG. 13 is a line graph of time to disease progression by mPAP at baseline up to EOMOP+7 days for patients having an mPAP<52 mmHg.
Figure 14:
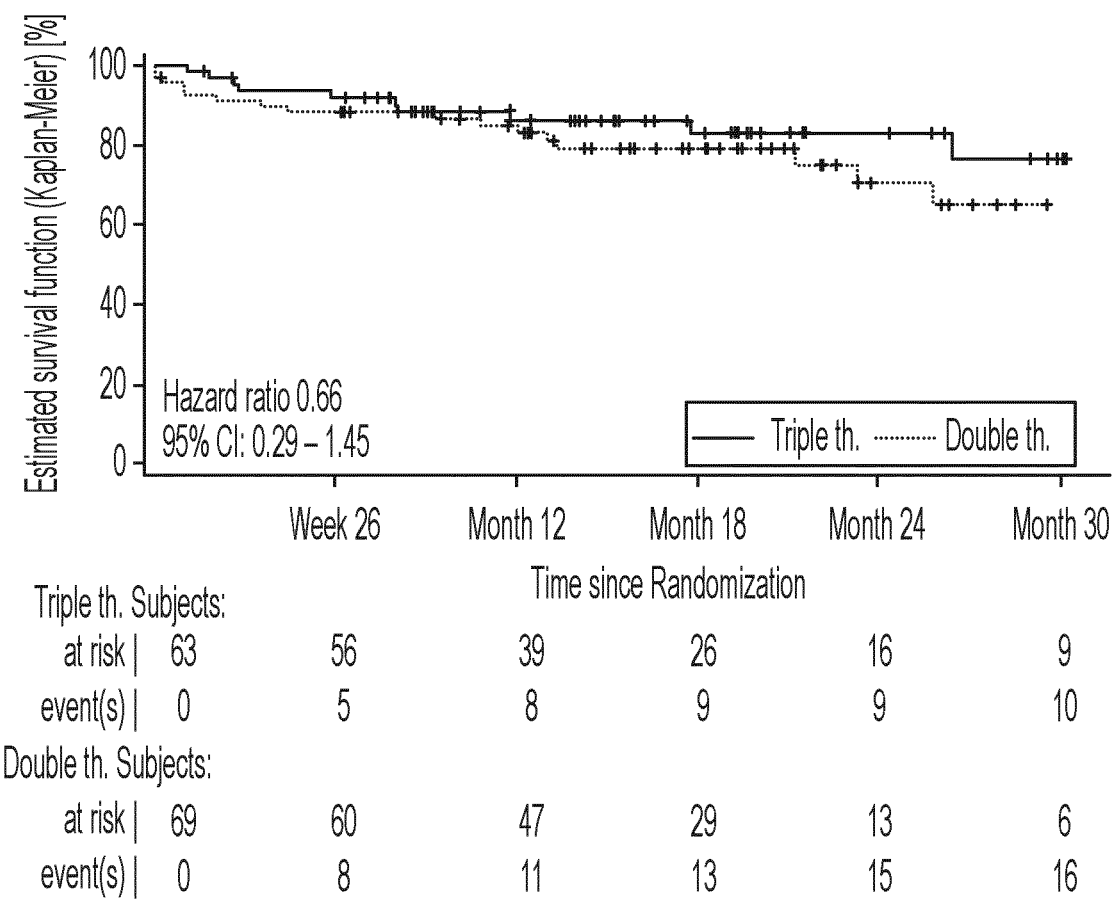
FIG. 14 is a line graph of time to disease progression by mPAP at baseline up to EOMOP+7 days for patients having an mPAP≥52 mmHg.
Figure 15:
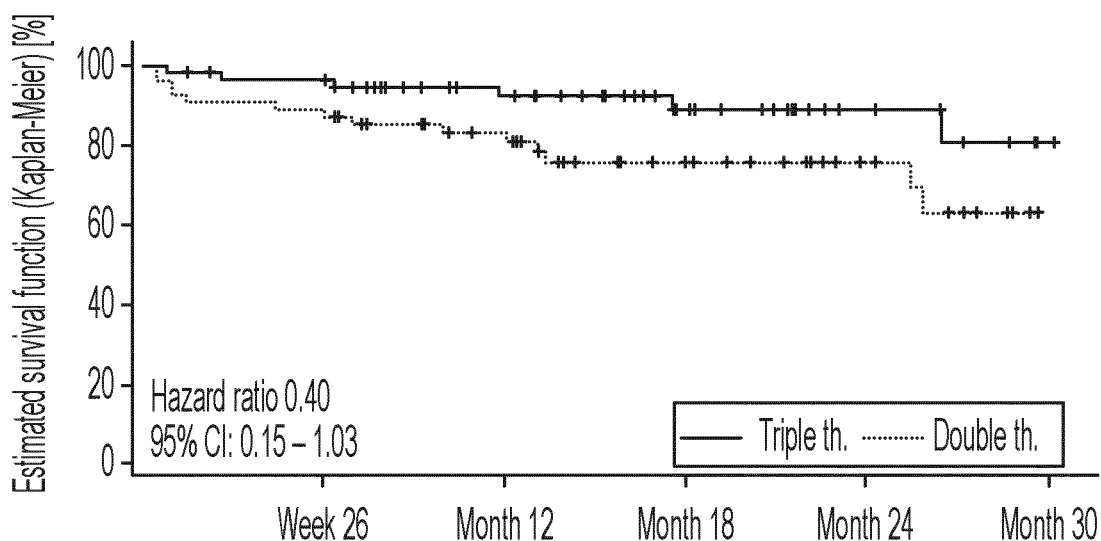
FIG. 15 is a line graph of time to disease progression by median mRAP at baseline up to EOMOP+7 days for patients having an mRAP<8 mmHg.
Figure 16:
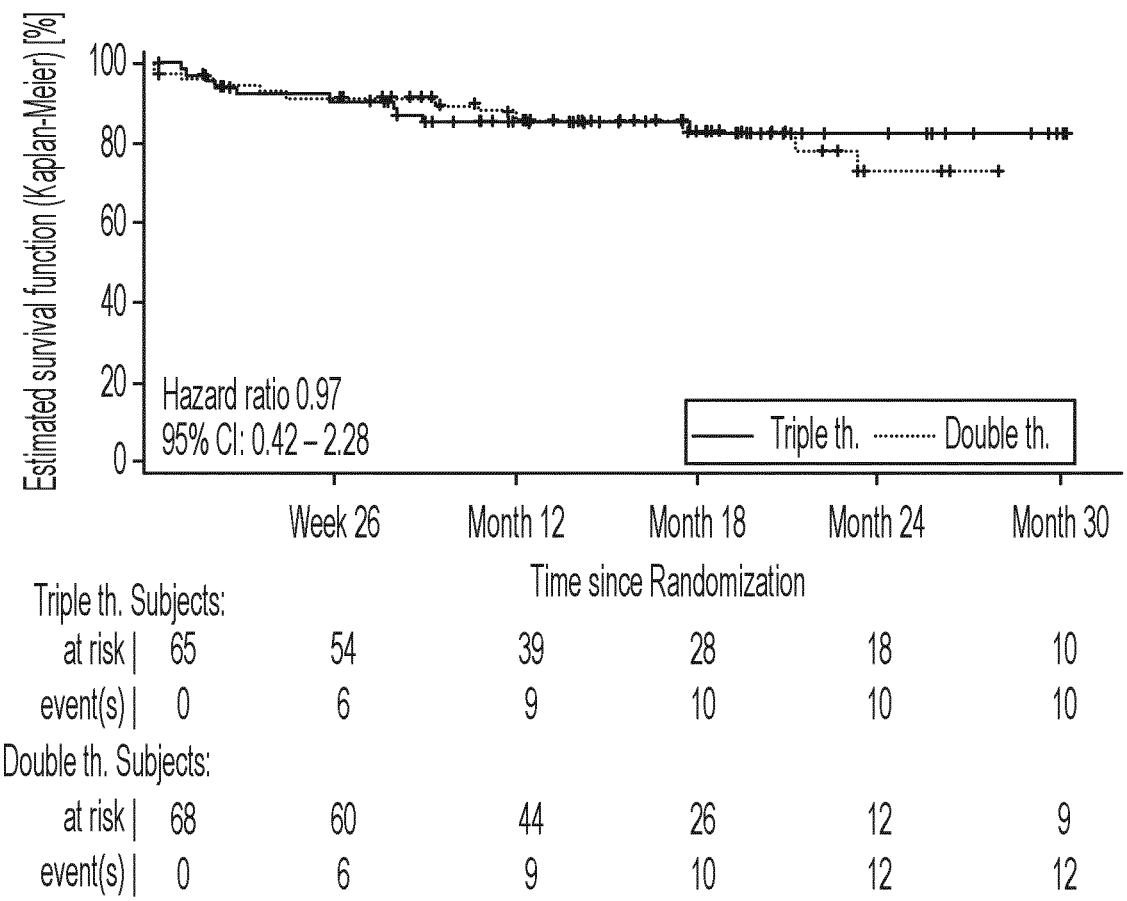
FIG. 16 is a line graph of time to disease progression by median mRAP for patients up to EOMOP+7 days having an mRAP≥8 mmHg.
Figure 17:
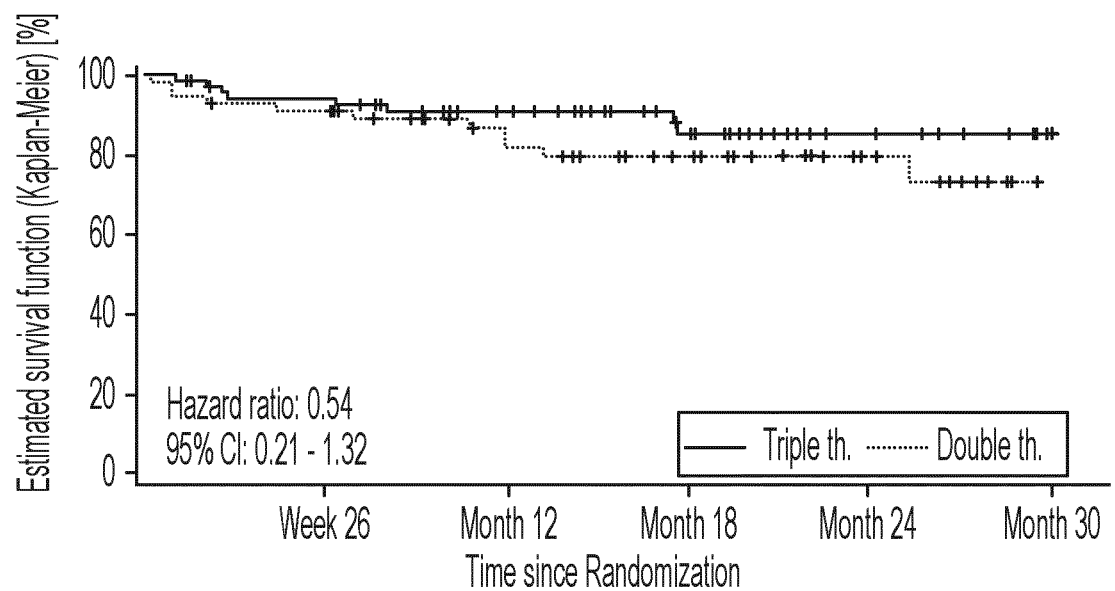
FIG. 17 is a line graph of time to disease progression by CI at baseline for patients up to EOMOP+7 days having a CI≥2.1 L/min/m$^2$.
Figure 18:
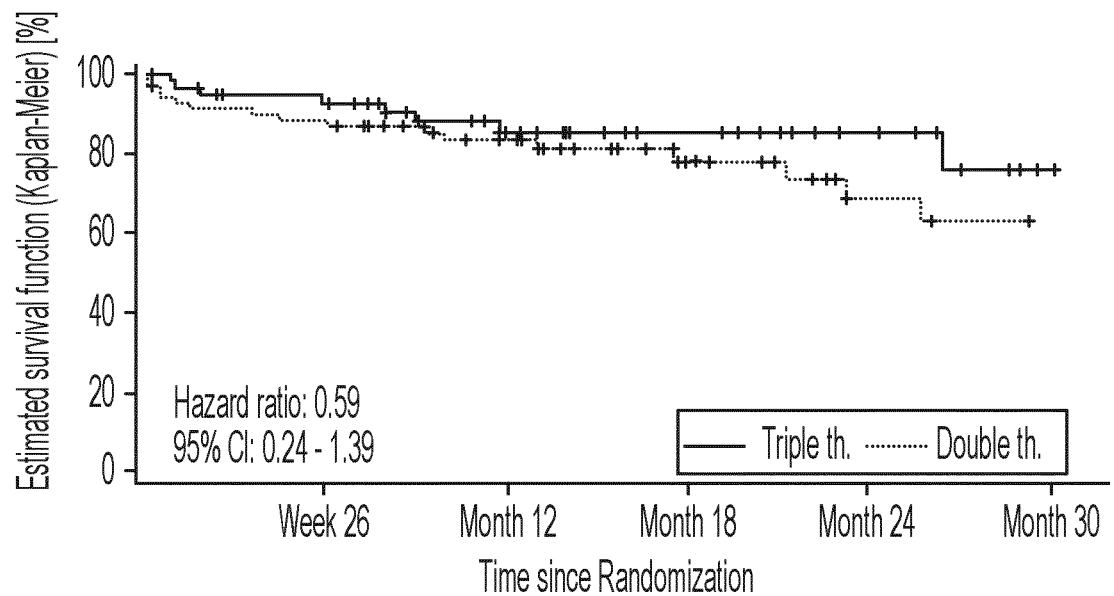
FIG. 18 is a line graph of time to disease progression by CI at baseline for patients up to EOMOP+7 days having a CI<2.1 L/min/m$^2$.
Figure 19:
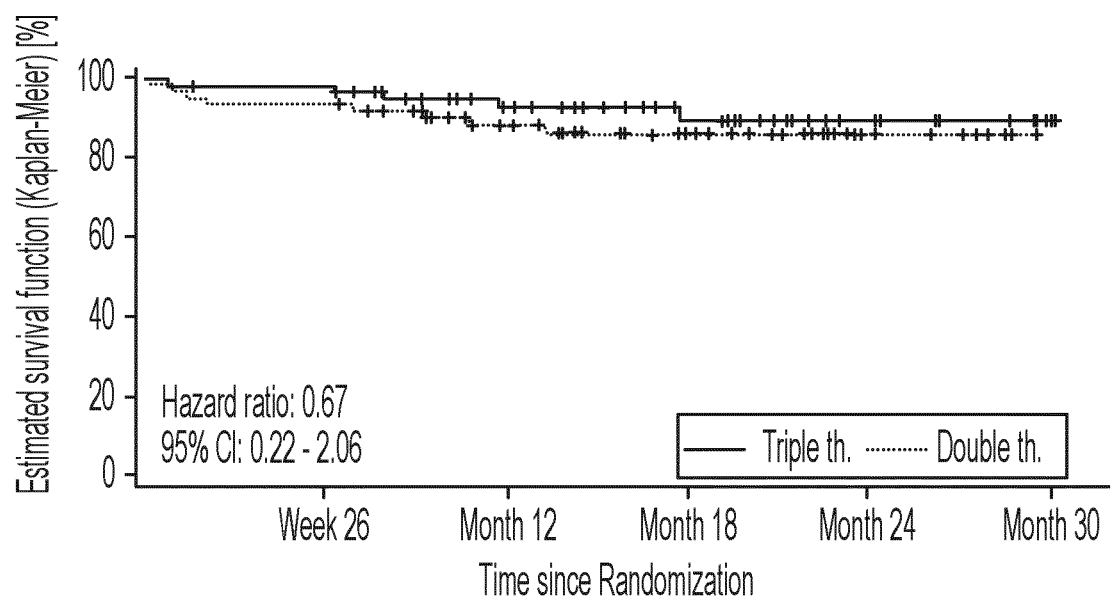
FIG. 19 is a line graph of time to disease progression by median NT-proBNP at baseline up to EOMOP+7 days for patients having a NT-proBNP<1360 µg/L.
Figure 20:
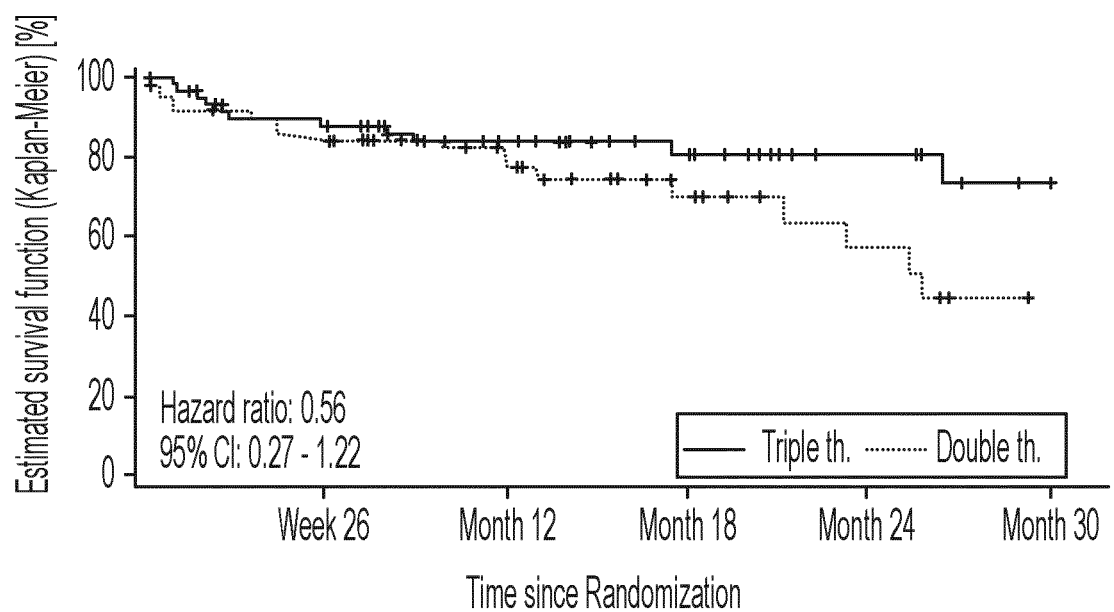
FIG. 20 is a line graph of time to disease progression by median NT-proBNP at baseline up to EOMOP+7 days for patients having a NT-proBNP≥1360 µg/L.
Figure 21:
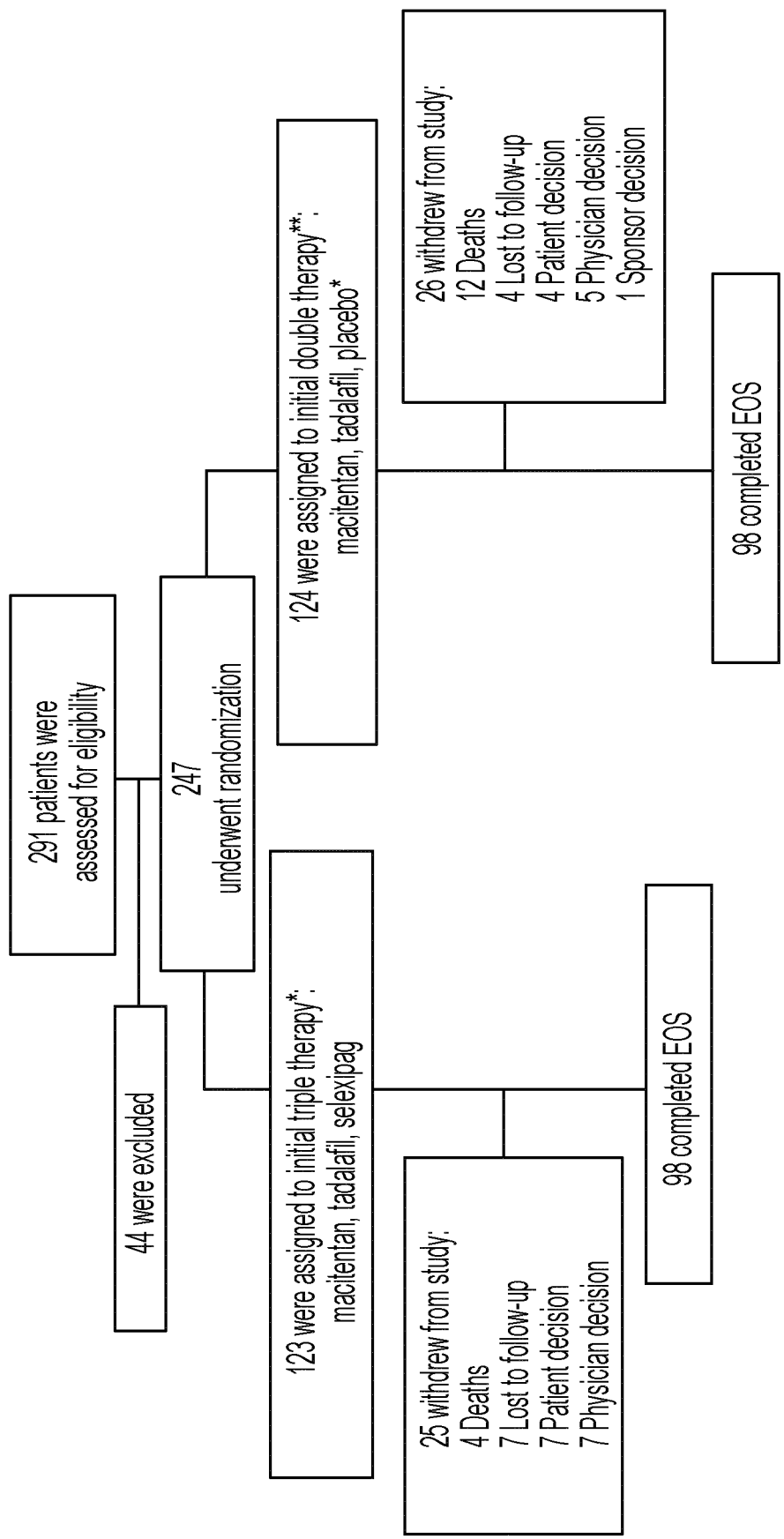
FIG. 21 is a schematic of the study design showing patient disposition up to EOS. *Four patients did not initiate selexipag and were allocated to the initial double therapy group for the safety analysis; **One patient did not receive any treatment and was excluded from the safety analysis set; †120 patients received placebo.
Figure 22:
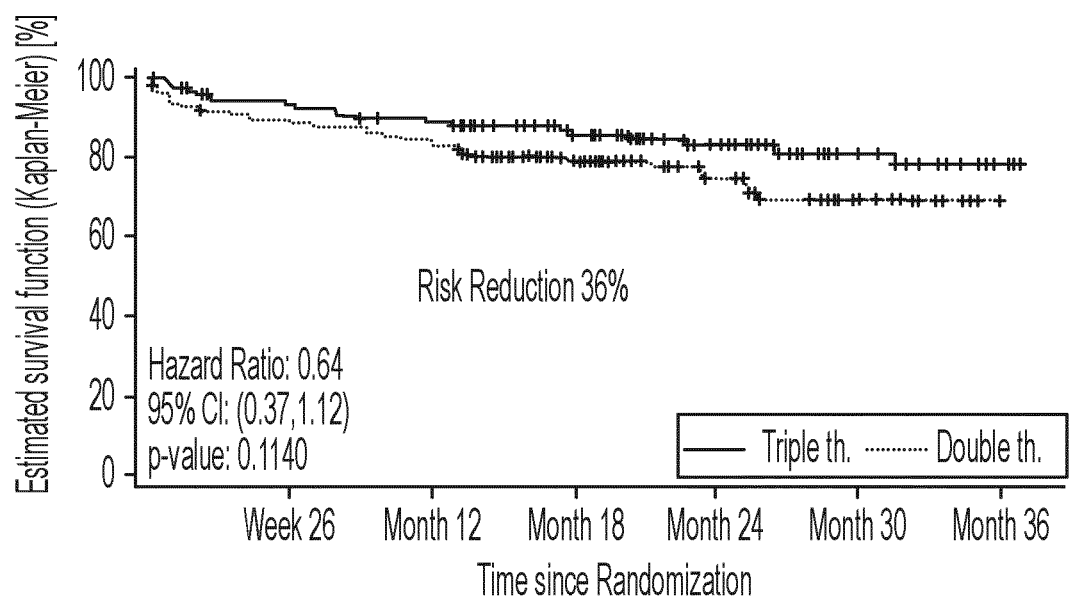
FIG. 22 is a line graph showing the time to disease progression up to EOS. In this figure, th.=therapy. Subjects are censored at EOS. Graph is cut when less than 10% of subjects are at risk in both treatment groups. p-value based on the stratified log-rank test. Hazard ratio estimate obtained from stratified Cox regression with WHO FC at baseline and geographical region. Triple therapy (N=123), double therapy (N=124).
Figure 23:
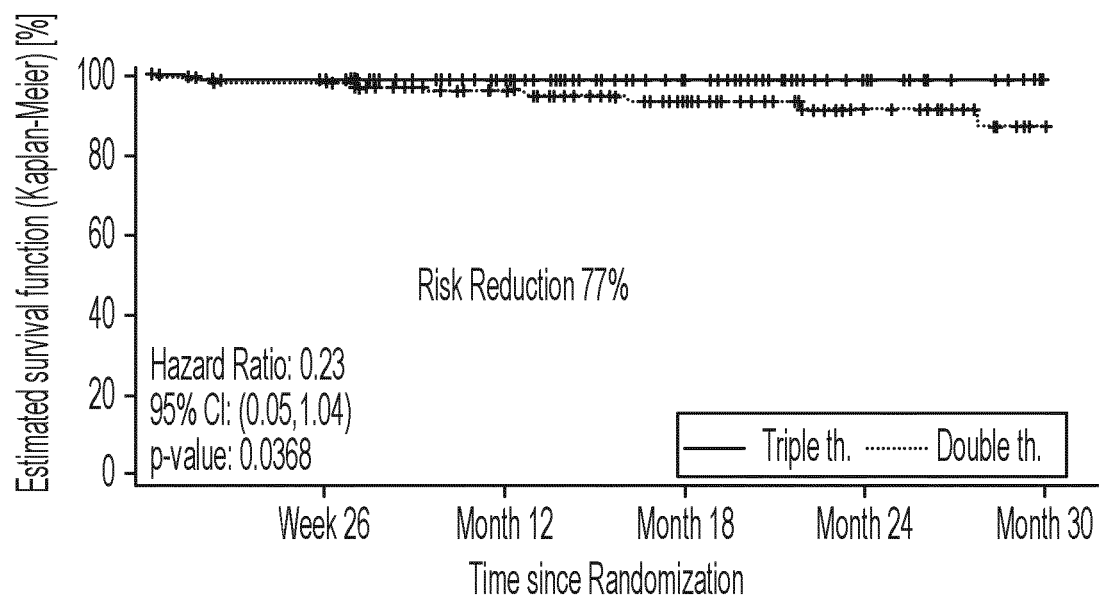
FIG. 23 is a line graph showing the time to death up to EOMOP. In this figure, th.=therapy. Subjects are censored at EOMOP or end of study, whichever is earlier. Graph is cut when less than 10% of subjects are at risk in both treatment groups. p-value based on the stratified log-rank test. Hazard ratio estimate obtained from stratified Cox regression with Wald confidence limit Analysis is stratified by WHO FC at baseline and geographical region. Triple therapy (N=123), double therapy (N=124).
Figure 24:
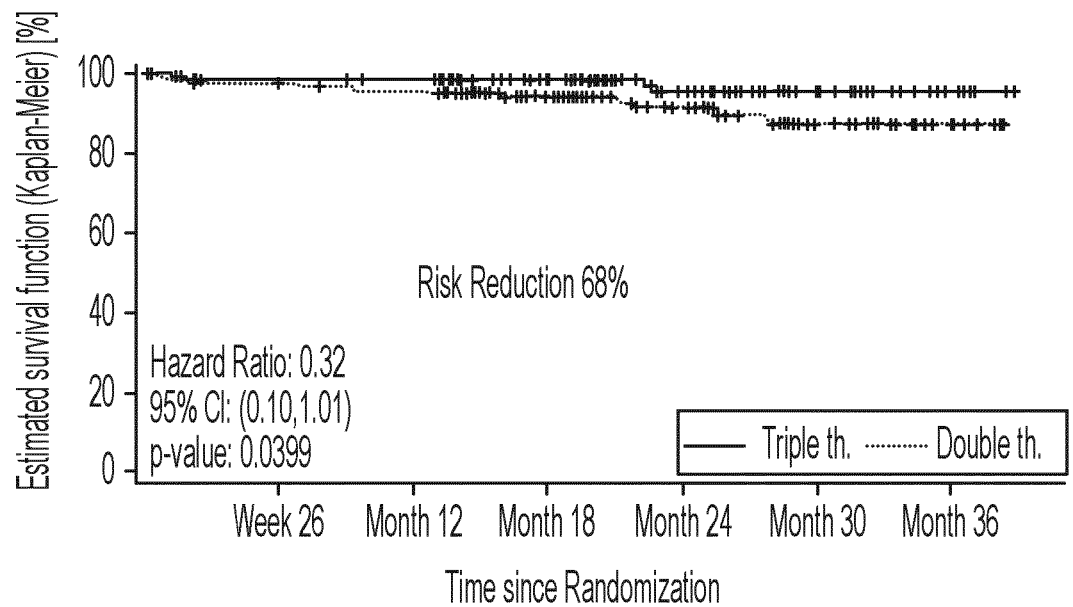
FIG. 24 is a line graph showing the time to death up to EOS. In this figure, th.=therapy. Subjects are censored at EOS. Graph is cut when less than 10% of subjects are at risk in both treatment groups. p-value based on the stratified log-rank test. Hazard ratio estimate obtained from stratified Cox regression with Wald confidence limit Analysis is stratified by WHO FC at baseline and geographical region. Triple therapy (N=123), double therapy (N=124).

Further analyses of disease progression based on patient hemodynamic parameters were performed (up to EOMOP+7 days). See FIG. 11: time to disease progression by median PVR at baseline (patient PVR<888dyn*sec/cm$^5$) and FIG. 12: time to disease progression by median PVR at baseline (patient PVR≥888dyn*sec/cm$^5$); FIG. 13: time to disease progression by mPAP at baseline (patient mPAP<52 mmHg) and FIG. 14: time to disease progression by mPAP at baseline (patient mPAP≥52 mmHg); FIG. 15: time to disease progression by median mRAP at baseline (patient mRAP<8 mmHg) and FIG. 16: time to disease progression by median mRAP (patient mRAP≥8 mmHg); FIG. 17: time to disease progression by CI at baseline (patient CI≥2.1 L/min/m$^2$) and FIG. 18: time to disease progression by CI at baseline (patient CI<2.1 L/min/m$^2$); FIG. 19: time to disease progression by median NT-proBNP at baseline (patient NT-proBNP<1360 μg/L) and FIG. 20: time to disease progression by median NT-proBNP at baseline (patient NT-proBNP≥1360 μg/L).

In general, these results show that regardless of the cardiopulmonary hemodynamic severity at baseline, a reduction in the risk of disease progression is observed with triple combination versus double combination.

Example 2

Further post-hoc analyses of the study in Example 1 were conducted, including those up to EOS. See, e.g., FIGS. 21-26.

TABLE 22

Exposure to all treatments up to EOS

| Duration of study treatment, weeks, median (range) | Initial triple therapy N = 119 | Initial double therapy N = 127 |
|---|---|---|
| Macitentan (open label) | 84.9 (5.1, 188) | 82.9 (0.6, 189.6) |
| Tadalafil (open label) | 95.7 (4.4, 188) | 90 (0.6, 189.6) |
| Selexipag (double blind) | 89.7 (2.1, 186.1) | NA |
| Placebo (double blind)* | NA | 77.6 (0.4, 171) |

*N = 120 for placebo; 4 patients randomized to initial triple therapy did not receive selexipag and are in the initial double group and 1 patient randomized to initial double therapy group did not receive any study medication and excluded.

TABLE 23

Disease Progression Recurrent Events Up to EOS

|  | Triple th. N = 123 | Double th. N = 124 |
|---|---|---|
| Number of subjects with at least 1 event | 21 | 31 |
| Number of subjects with at least 2 events | 14 | 18 |
| Number of subjects with at least 3 events | 5 | 12 |
| Total number of events confirmed by CEC | 46 | 84 |
| Total number of | | |
| Death | 4 | 12 |
| Hospitalization for worsening of PAH | 21 | 41 |
| Initiation of Prostacyclin for worsening of PAH | 9 | 18 |
| Clinical worsening of PAH | 12 | 13 |
| Cumulative time of study up to EOMOP + 7 days (years) | 244.0 | 240.0 |
| Negative binomial model | | |
| Mean annualized rate of disease progression event | 0.239 | 0.575 |
| 95% CI of the mean | 0.128, 0.449 | 0.307, 1.077 |
| Relative reduction | 0.416 | |
| 95% CI of the relative reduction | 0.173, 0.997 | | th. = therapy; CI = confidence interval. All events are adjudicated by the clinical events committee. If multiple events occurred on the same day, they are considered as separate events.

TABLE 24

Disease progression events (ALL, first and subsequent ones) up to EOMOP Initial triple vs initial double therapy: Rate reduction 61% Rate ratio: 0.39; 95% CI (0.15, 1.00)

|  | Initial triple therapy N = 123 | Initial double therapy N = 124 |
|---|---|---|
| Mean annualised rate of disease progression events* (95% CI) | 0.224 (0.112 to 0.448) | 0.577 (0.295 to 1.127) |

Negative binomial model.
*Total number of disease progression events/cumulative time on study (years).

TABLE 25

Disease progression events (ALL, first and subsequent ones) up to EOS Initial triple vs initial double therapy: Rate reduction 58% Rate ratio: 0.42; 95% CI (0.17, 1.00)

|  | Initial triple therapy N = 123 | Initial double therapy N = 124 |
|---|---|---|
| Mean annualised rate of disease progression events* (95% CI) | 0.239 (0.128 to 0.449) | 0.575 (0.307 to 1.077) |

Negative binomial model.
*Total number of disease progression events/cumulative time on study (years).

TABLE 26

AEs summary up to EOMOP or EOS

| Treatment-emergent AEs*, n(%) | Initial triple therapy N = 119 | | Initial double therapy N = 127 | |
|---|---|---|---|---|
| | EOMOP | EOS | EOMOP | EOS |
| Patients with ≥ 1 AE | 119 (100) | 119 (100) | 123 (96.9) | 124 (97.6) |
| Patients with ≥ 1 serious AE | 51 (42.9) | 58 (48.7) | 40 (31.5) | 48 (37.8) |
| Patients with ≥ 1 AE leading to discontinuation of double-blind study treatment | 19 (16.0) | 20 (16.8) | 17 (14.2)** | 18 (15.0)** |

Safety set;
*Treatment-emergent adverse events with onset between start of first dose of study medication and last dose of study medication + 30 days (or EOMOP, whichever is earliest)
**Denominator is 120.

TABLE 27

Most frequent (at least 25% in any treatment group) TEAEs up to EOS by PT

| Patients with most frequent AEs**, n (%) | Initial triple therapy N = 119 | | Initial double therapy N = 127 | |
|---|---|---|---|---|
| | EOMOP | EOS | EOMOP | EOS |
| Headache | 82 (68.9) | 83 (69.7) | 77 (60.6) | 78 (61.4) |
| Diarrhoea | 64 (53.8) | 66 (55.5) | 40 (31.5) | 41 (32.3) |
| Nausea | 57 (47.9) | 57 (47.9) | 32 (25.2) | 34 (26.8) |
| Peripheral oedema | 44 (37.0) | 45 (37.8) | 46 (36.2) | 46 (36.2) |
| Pain in extremity | 36 (30.3) | 37 (31.1) | 20 (15.7) | 24 (18.9) |
| Pain in jaw | 35 (29.4) | 35 (29.4) | 14 (11.0) | 15 (11.8) |
| Vomiting | 30 (25.2) | 30 (25.2) | 15 (11.8) | 16 (12.6) |

Safety analysis set (all patients who received at least one dose of any treatment);
**AEs occurring in at least 25% patients in either treatment arm.
AE: adverse event.

TABLE 28

Deaths

| Treatment-emergent AEs*, n(%) | Initial triple therapy N = 119 | | Initial double therapy N = 127 | |
|---|---|---|---|---|
| | EOMOP | EOS | EOMOP | EOS |
| Deaths, n (%) | 2 (1.7) | 4 (3.4) | 9 (7.1) | 12 (9.4) |

Safety set.
*Treatment-emergent adverse events with onset between start of first dose of study medication and last dose of study medication + 30 days (or EOMOP/EOS whichever is earliest)

Summary of Analysis

Exploratory analysis on time to disease progression indicated a signal for improved long-term outcome with initial triple vs initial double oral therapy (observed at EOMOP (main analysis) and EOS (supportive analysis)). Post hoc analyses, including assessment of all disease progression events, are consistent with this finding (observed at EOMOP (main analysis) and EOS (supportive analysis)).

These results show that initial triple therapy reduced the risk of death by 68% to the end of the study, as compared with initial double therapy. See, FIG. 24. These results also show that the initial triple therapy reduced the time to disease progression up to the end of the study by 36%, as compared with initial double therapy. See, FIG. 22.

Safety observations for EOS analysis are consistent with EOMOP findings.

What is claimed:

1. A method of reducing the risk of disease progression in a patient with pulmonary arterial hypertension (PAH), comprising administering to a patient in need thereof, an initial triple combination therapy of macitentan, tadalafil, and selexipag, wherein the macitentan and tadalafil are initiated on day 1 and the selexipag is initiated on day 15+/−3 days.

2. The method of claim 1, wherein the reduced risk of disease progression is relative to a patient population with PAH that receives an initial double combination therapy of the macitentan and tadalafil.

3. The method of claim 1, wherein the patient is treatment naïve for PAH.

4. The method of claim 1, wherein an initial PAH diagnosis of the patient is made within six months of the start of the initial triple combination therapy.

5. The method of claim 1, wherein the patient has a mean pulmonary arterial hypertension (mPAP) of greater than or equal to about 25 mmHg at rest, a mean pulmonary arterial wedge pressure (PAWP) of less than or equal to about 15 mmHg, and a pulmonary vascular resistance (PVR) of greater than or equal to about 240 dyn·sec/cm$^5$ at the start of the initial triple combination therapy.

6. The method of claim 1, wherein the patient has a 6-minute walk distance (6 MWD) of greater than or equal to about 50 meters at the start of the initial triple combination therapy.

7. The method of claim 1, wherein the macitentan is administered in an amount of about 10 mg once daily.

8. The method of claim 1, wherein the tadalafil is administered in an amount of from about 20 mg to about 40 mg once daily.

9. The method of claim 1, wherein the tadalafil is administered in an amount of about 40 mg once daily.

10. The method of claim 1, wherein the selexipag is administered in an amount of from about 200 µg to about 1600 µg twice daily.

11. The method of claim 1, wherein each of the macitentan, the tadalafil, and the selexipag are administered orally in the form of one or more tablets.

12. The method of claim 1, wherein the macitentan and the tadalafil are administered orally in the form of a single tablet, and the selexipag is administered orally in the form of one or more separate tablets.

13. The method of claim 2, wherein the initial triple combination therapy reduced the risk of disease progression by about 30 to 40% relative to the initial double combination therapy.

14. The method of claim 1, wherein the disease progression comprises hospitalization for worsening of PAH, clinical worsening of PAH, or death.

* * * * *